US012092970B2

(12) United States Patent
Matsuda et al.

(10) Patent No.: US 12,092,970 B2
(45) Date of Patent: Sep. 17, 2024

(54) IMAGE FORMING APPARATUS

(71) Applicant: CANON KABUSHIKI KAISHA, Tokyo (JP)

(72) Inventors: Kohei Matsuda, Kanagawa (JP); Junko Hirata, Shizuoka (JP); Kazunori Hashimoto, Shizuoka (JP); Yasushi Katsuta, Tokyo (JP); Makoto Hayashida, Shizuoka (JP); Yasunori Toriyama, Shizuoka (JP); Hiroomi Matsuzaki, Shizuoka (JP); Fumito Nonaka, Shizuoka (JP); Kazuki Matsumoto, Shizuoka (JP); Tetsuya Nishiguchi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/708,091

(22) Filed: Mar. 30, 2022

(65) Prior Publication Data

US 2022/0221807 A1 Jul. 14, 2022

Related U.S. Application Data

(63) Continuation-in-part of application No. PCT/JP2020/038221, filed on Oct. 2, 2020.

(30) Foreign Application Priority Data

Oct. 4, 2019 (JP) ................................ 2019-183382
Feb. 19, 2020 (JP) ................................ 2020-025851
Jun. 19, 2020 (JP) ................................ 2020-105813

(51) Int. Cl.
*G03G 15/043* (2006.01)
*G03G 15/00* (2006.01)
*G03G 21/18* (2006.01)

(52) U.S. Cl.
CPC ........... *G03G 15/043* (2013.01); *G03G 15/55* (2013.01); *G03G 21/1814* (2013.01); *G03G 2215/0891* (2013.01)

(58) Field of Classification Search
CPC .... G03G 15/143; G03G 15/55; G03G 15/556; G03G 2215/0888; G03G 2215/0891
See application file for complete search history.

(56) References Cited

U.S. PATENT DOCUMENTS 4,270,487 A * 6/1981 Terashima ......... G03G 15/0856 118/712
6,055,391 A * 4/2000 Jackson ................ G01B 11/16 399/13

(Continued)

FOREIGN PATENT DOCUMENTS

JP H01-319067 A 12/1989
JP H11-2948 A 1/1999

(Continued)

OTHER PUBLICATIONS

Machine translation of JP 2006-184496. (Year: 2006).*

(Continued)

*Primary Examiner* — Carla J Therrien
(74) *Attorney, Agent, or Firm* — VENABLE LLP

(57) ABSTRACT

An image forming apparatus, to which a cartridge including a developer accommodating portion for accommodating a developer is detachably mountable, includes an image bearing member, an exposure unit configured to expose the image bearing member to light to form an electrostatic latent image on the image bearing member, a light receiving sensor provided in the cartridge and configured to receive the light emitted from the exposure unit, and a controller configured to detect vibration of the cartridge from a light reception value of the light received by the light receiving sensor. In a case in which the cartridge is removed from the image (Continued)

forming apparatus, the light receiving sensor is removed from the image forming apparatus together with the cartridge.

6 Claims, 56 Drawing Sheets

(56) References Cited

U.S. PATENT DOCUMENTS

2007/0297835 A1* 12/2007 Ikeda ..................... G03G 15/55 399/301
2009/0245817 A1* 10/2009 Hamaya ............. G03G 21/1842 399/13
2015/0145938 A1* 5/2015 Nagao ................ G03G 15/0409 347/118
2016/0116860 A1* 4/2016 Hirota .................. G03G 15/086 73/662
2016/0170328 A1* 6/2016 Hosokawa ......... G03G 15/0858 399/27
2017/0115597 A1* 4/2017 Kawashima ....... G03G 15/0858
2017/0212447 A1 7/2017 Luke et al.

FOREIGN PATENT DOCUMENTS

JP 2001-183897 A 7/2001
JP 2006184496 A * 7/2006
JP 2007-283690 A 11/2007
JP 2012-013955 A 1/2012
JP 2014-106357 A 6/2014
JP 2017-096994 A 1/2017

OTHER PUBLICATIONS

Machine translation of JP 2007-283690. (Year: 2007).*
Machine translation of JP H11-002948. (Year: 1999).*
International Search Report dated Nov. 26, 2020 in related PCT Application No. PCT/JP2020/038221.

* cited by examiner (a)

(b)

(a)

(b)

(a)

(b)

IMAGE FORMING APPARATUS

FIELD OF THE INVENTION AND RELATED ART

The present invention relates to an image forming apparatus for forming an image on a recording medium, a cartridge detachably mountable to an apparatus main assembly of the image forming apparatus, and a detecting method of vibration of the cartridge.

Here, examples of the image forming apparatus includes an electrophotographic copying machine, an electrophotographic printer (such as a laser beam printer, an LED printer or the like), a facsimile machine, a word processor, and the like.

Further, the cartridge is prepared by integrally assembling constituent elements such as a photosensitive drum, a developing roller, and the like which are used as rotatable members relating to image formation, into a unit (cartridge), and is made mountable in and dismountable from the apparatus main assembly of the image forming apparatus. The apparatus main assembly of the image forming apparatus refers to an image forming apparatus portion of the image forming apparatus from which the cartridge is removed.

Conventionally, in the image forming apparatus, a developer in a developing device is consumed together with image formation, and therefore, the developer is replenished from a developer accommodating portion to the developing device. In addition, in the case where the developer in the developer accommodating portion is used up, there is a need that the developer accommodating portion is exchanged to a new developer accommodating portion. Further, the developer remaining on an image bearing member such as the photosensitive drum or an intermediary transfer belt after the image formation is removed by a cleaning means, so that the developer accommodating portion for accommodating the removed developer is increased in accommodation amount of the developer with the image formation similarly. For that reason, in the case where the developer accommodating portion is filled with the collected developer, there is a need that the collected developer is disposed of or is exchanged with a new developer accommodating portion.

When the developer in the developer accommodating portion is used up and the developer necessary to form the image becomes insufficient, an image defect occurs, so that normal image formation cannot be carried out. Further, even in the developer accommodating portion for accommodating the removed developer, in the case where the developer accommodating portion is filled with the collected developer, the developer remaining on the photosensitive drum is not sufficiently removed, so that the image defect occurs and thus the normal image formation cannot be carried out.

For that reason, conventionally, a detecting means for detecting the accommodation amount of the developer provided, and the detected accommodation amount of the developer is notified to a user. Specifically, as disclosed in Japanese Laid-Open Patent Application (JP-A) 2014-106357, a contact acceleration sensor is provided on the developer accommodating portion. JP-A 2014-106357 discloses a technique such that vibration of the developer accommodating portion is detected by the acceleration sensor and then the accommodation amount of the developer accommodated in the developer accommodating portion is detected depending on a value of a frequency component of the detected vibration.

However, in JP-A 2014-106357, the vibration of the developer accommodating portion depending on the accommodation amount of the developer and vibration of the image forming apparatus main assembly in which the developer accommodating portion is mounted are detected generally as acceleration. For that reason, vibration noise (such as the vibration of the image forming apparatus main assembly or the like) other than the vibration of the developer accommodating portion is detected, so that there was a problem that the vibration noise lowers detection accuracy of the developer accommodation amount and particularly that the detection accuracy when the developer accommodation amount in the developer accommodating portion is large is further lowered.

Further, in JP-A 2014-106357, the acceleration sensor for detecting the vibration of the developer accommodating portion is provided on the developer accommodating portion which is an object to be detected. Thus, in the contact acceleration sensor, a measurement error is liable to occur by the influence of a self-weight of the sensor, and particularly, there was a problem that the detection accuracy when the developer accommodation amount in the developer accommodating portion is small is further lowered.

SUMMARY OF THE INVENTION

A principal object of the present invention is to provide an image forming apparatus capable of accurately detecting vibration occurring in a developer accommodating portion.

According to an aspect of the present invention, there is provided an image forming apparatus to which a cartridge including a developer accommodating portion for accommodating a developer is detachably mountable, the image forming apparatus comprising: an image bearing member; an exposure unit configured to expose the image bearing member to light to form an electrostatic latent image on the image bearing member; a light receiving portion provided in the cartridge and configured to receive the light emitted from the exposure unit; and a detecting portion configured to detect vibration of the cartridge from a light reception value of the light received by the light receiving portion.

According to another aspect of the present invention, there is provided an image forming apparatus to which a cartridge including a developer accommodating portion for accommodating a developer is detachably mountable, the image forming apparatus comprising: an image bearing member; an exposure unit configured to expose the image bearing member to light; a reflection member provided in the cartridge and having a retroreflection property such that the light emitted from the exposure unit is reflected in an incident direction of the light; a light receiving portion configured to receive the light reflected by the reflection member; and a detecting portion configured to detect vibration of the cartridge from a light reception value of the light received by the light receiving portion.

Further features of the present invention will become apparent from the following description of exemplary embodiments with reference to the attached drawings.

Figure 5:
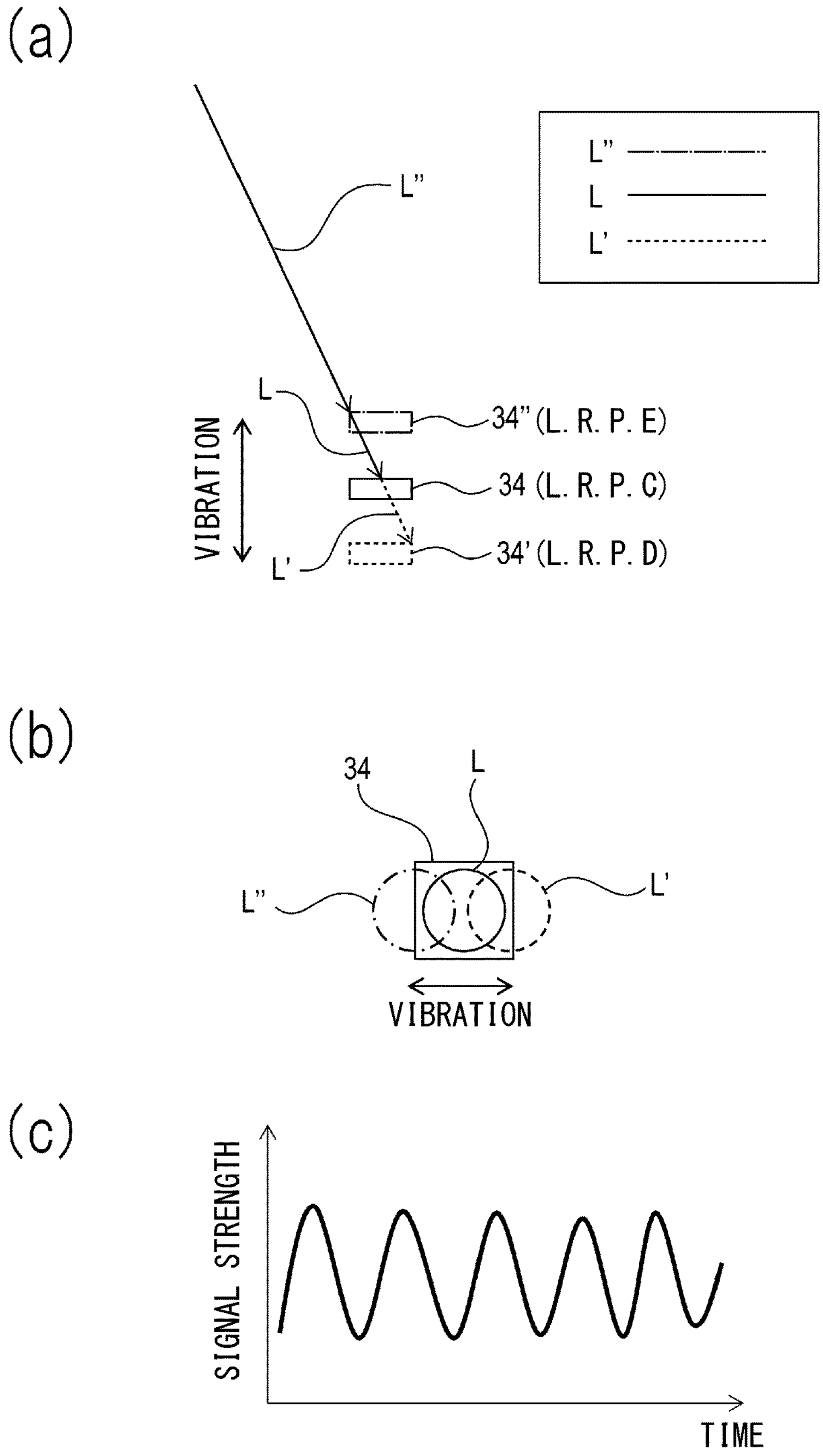

Parts (a) to (c) of FIG. 5 are schematic views for illustrating laser light incident on the light receiving sensor in the embodiment 1.

Figure 6:
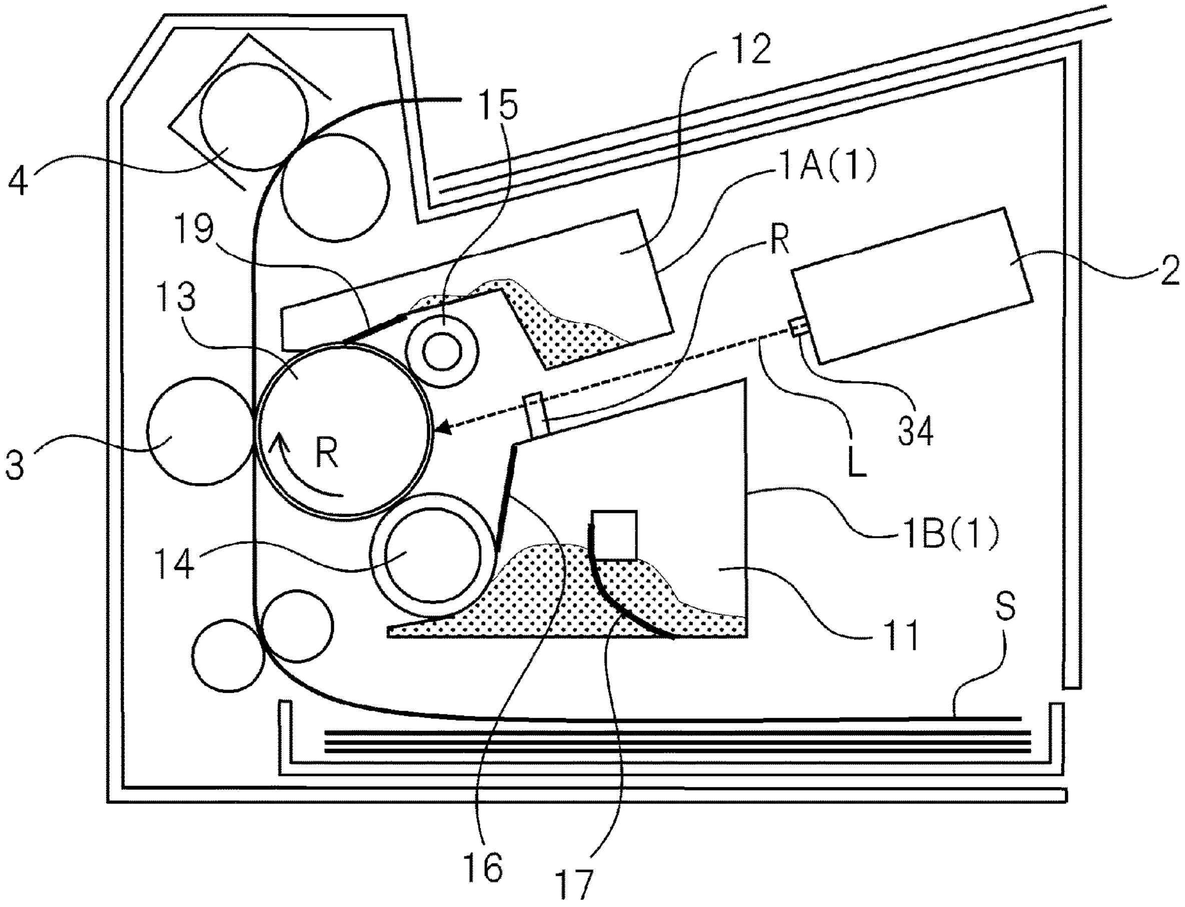

FIG. 6 is a schematic view of an image forming apparatus according to an embodiment 2.

Figure 7:
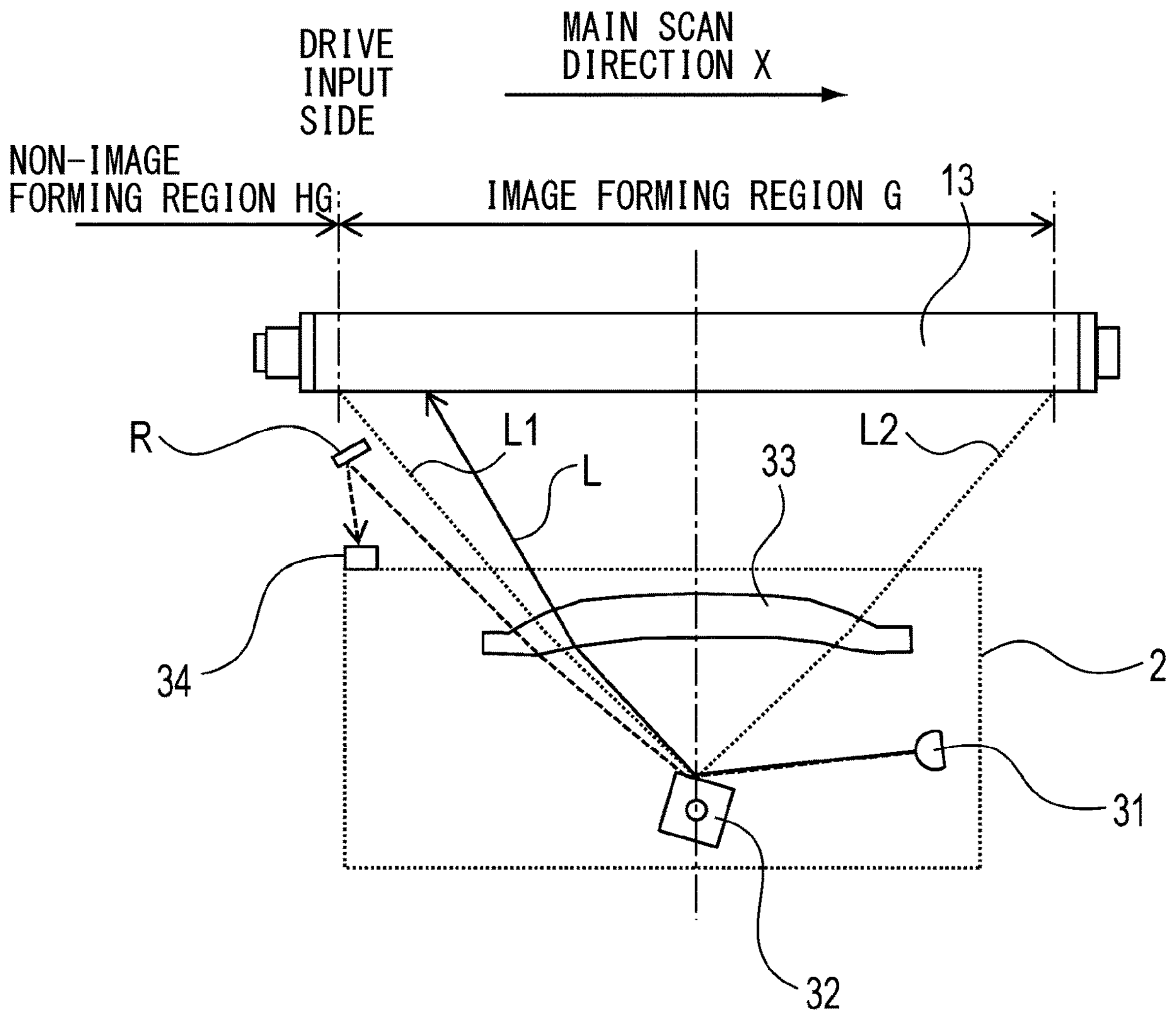

FIG. 7 is a schematic top view of an exposure unit and a light receiving sensor in the embodiment 2.

Figure 8:
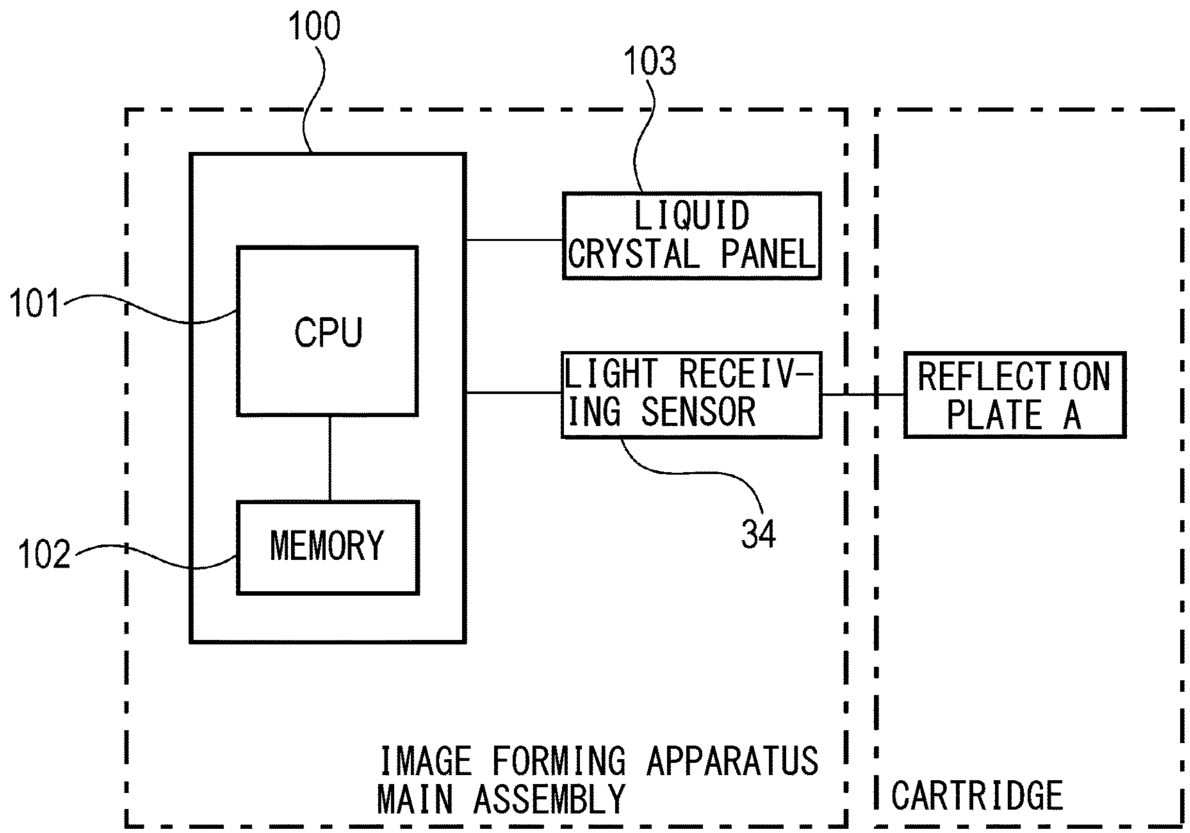

FIG. 8 is a block diagram showing a part of an electric circuit of the image forming apparatus according to the embodiment 2.

Figure 9:
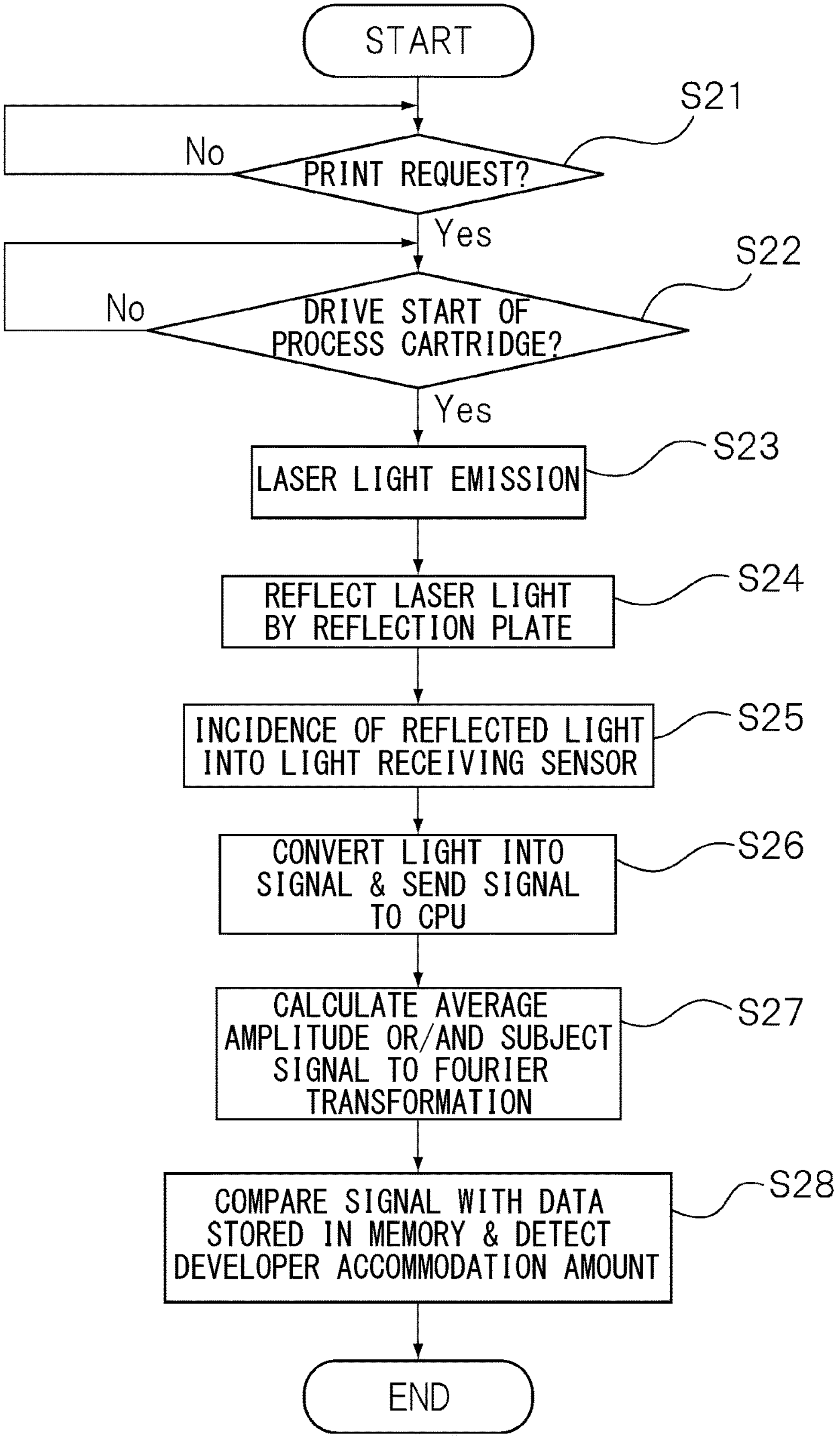

FIG. 9 is a flowchart relating to a detection process of a toner accommodation amount in the embodiment 2.

Figure 10:
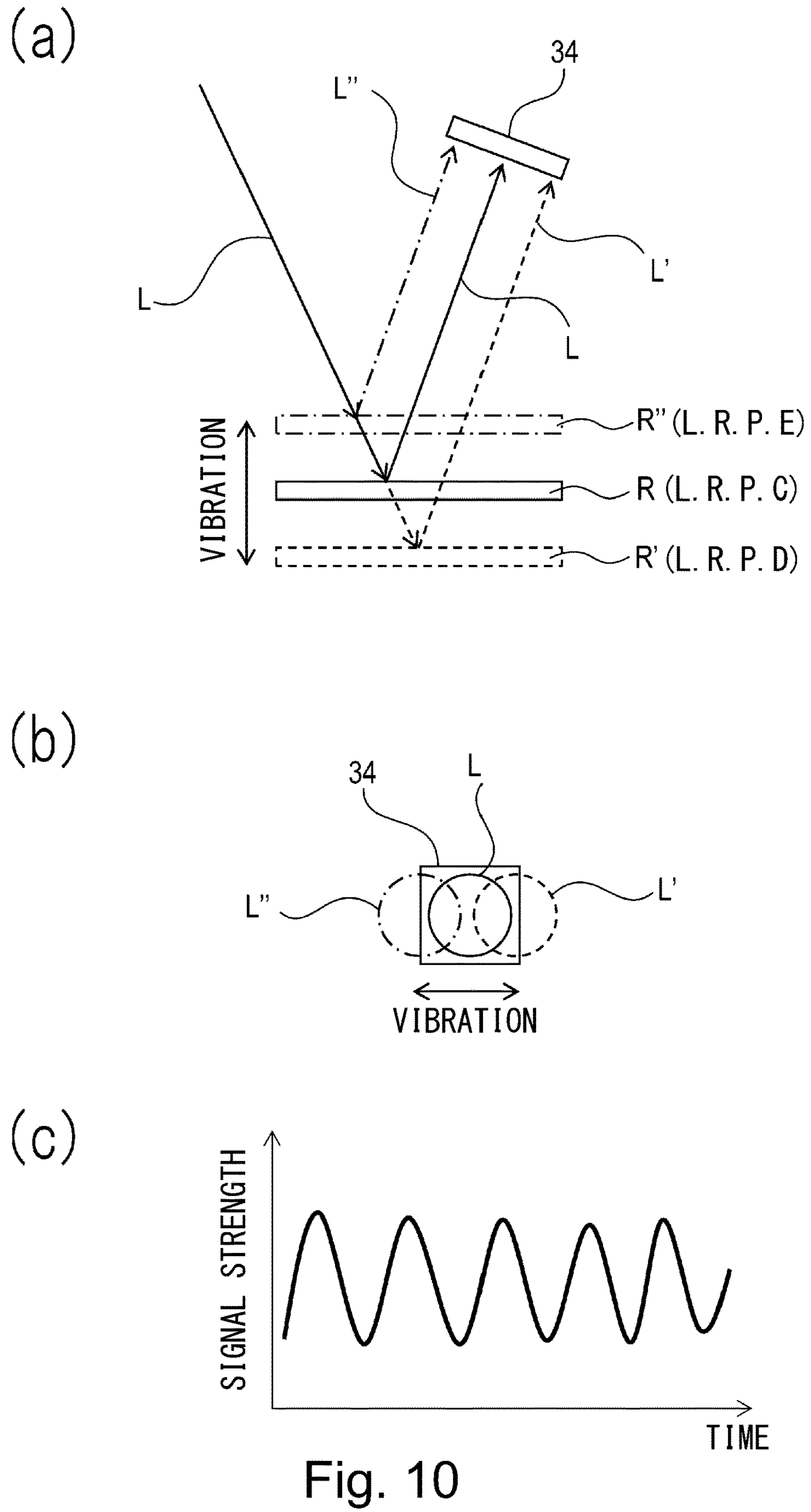

Parts (a) to (c) of FIG. 10 are schematic views for illustrating a reflection state of a reflecting plate and laser light incident on the light receiving sensor in the embodiment 2.

Figure 11:
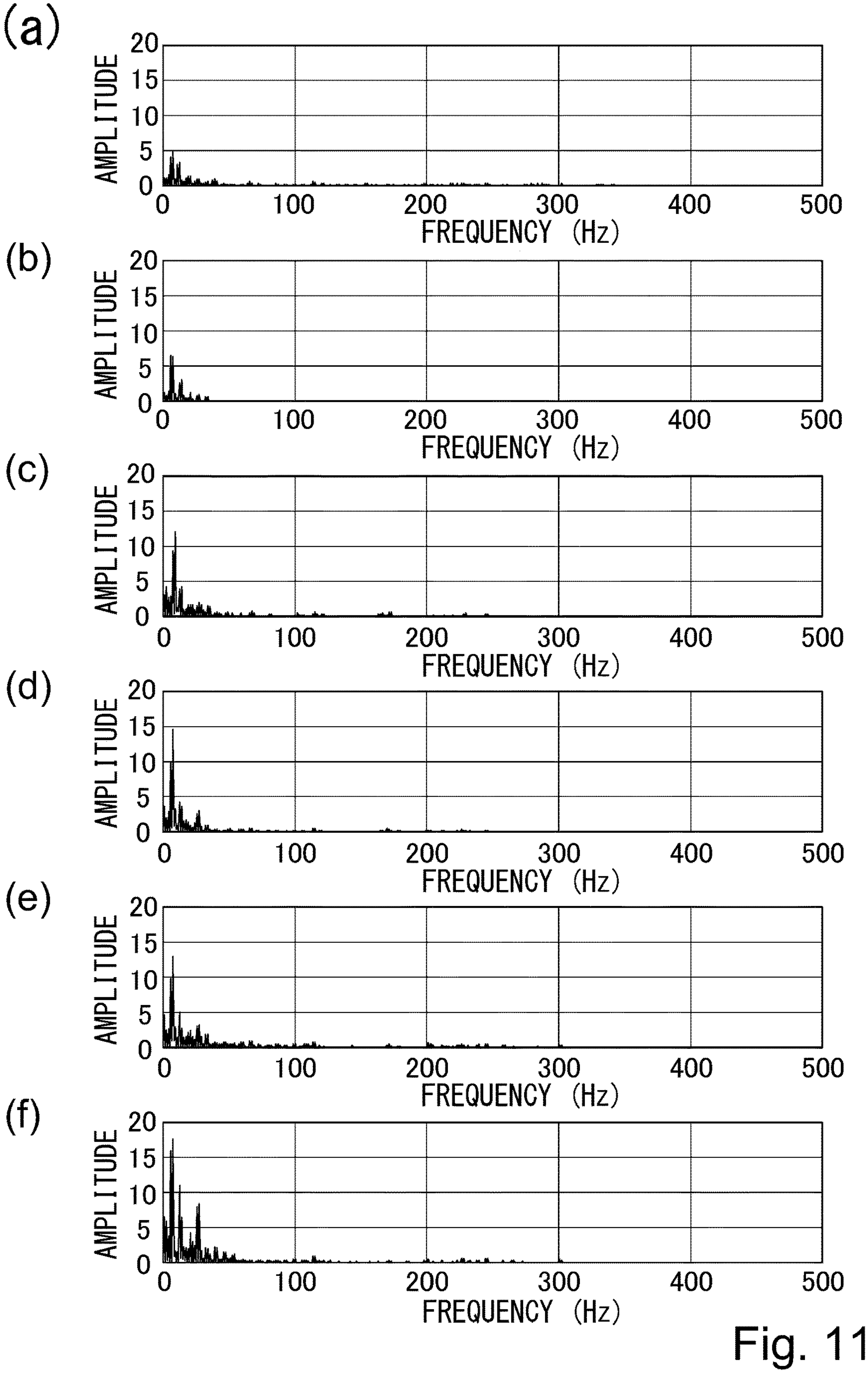

Parts (a) to (f) of FIG. 11 are graphs each for illustrating an example of a detection result of a value of a frequency component for an associated toner accommodation amount in the embodiment 2.

Figure 12:
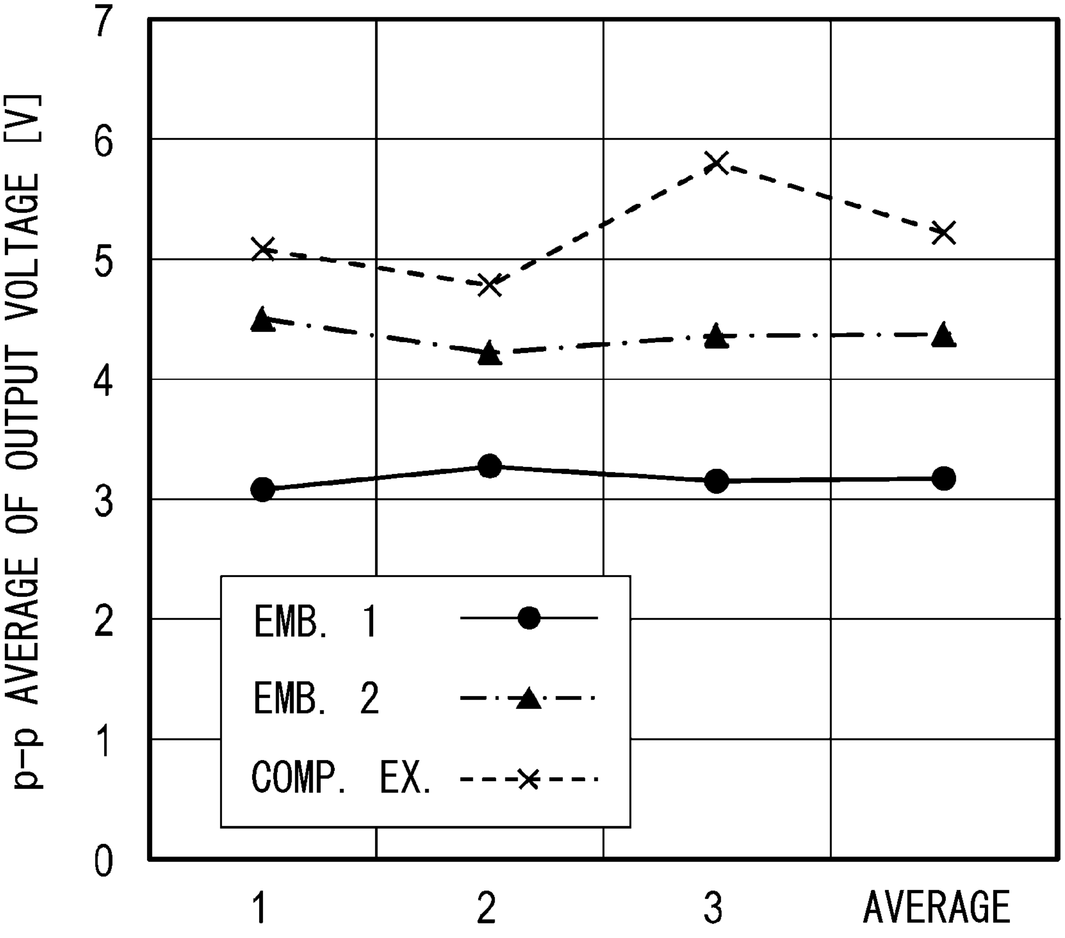

FIG. 12 is a graph showing a relationship between an amplitude of an output voltage and an average when a toner amount is 10% in the embodiment 1, the embodiment 2, and a comparison example.

Figure 13:
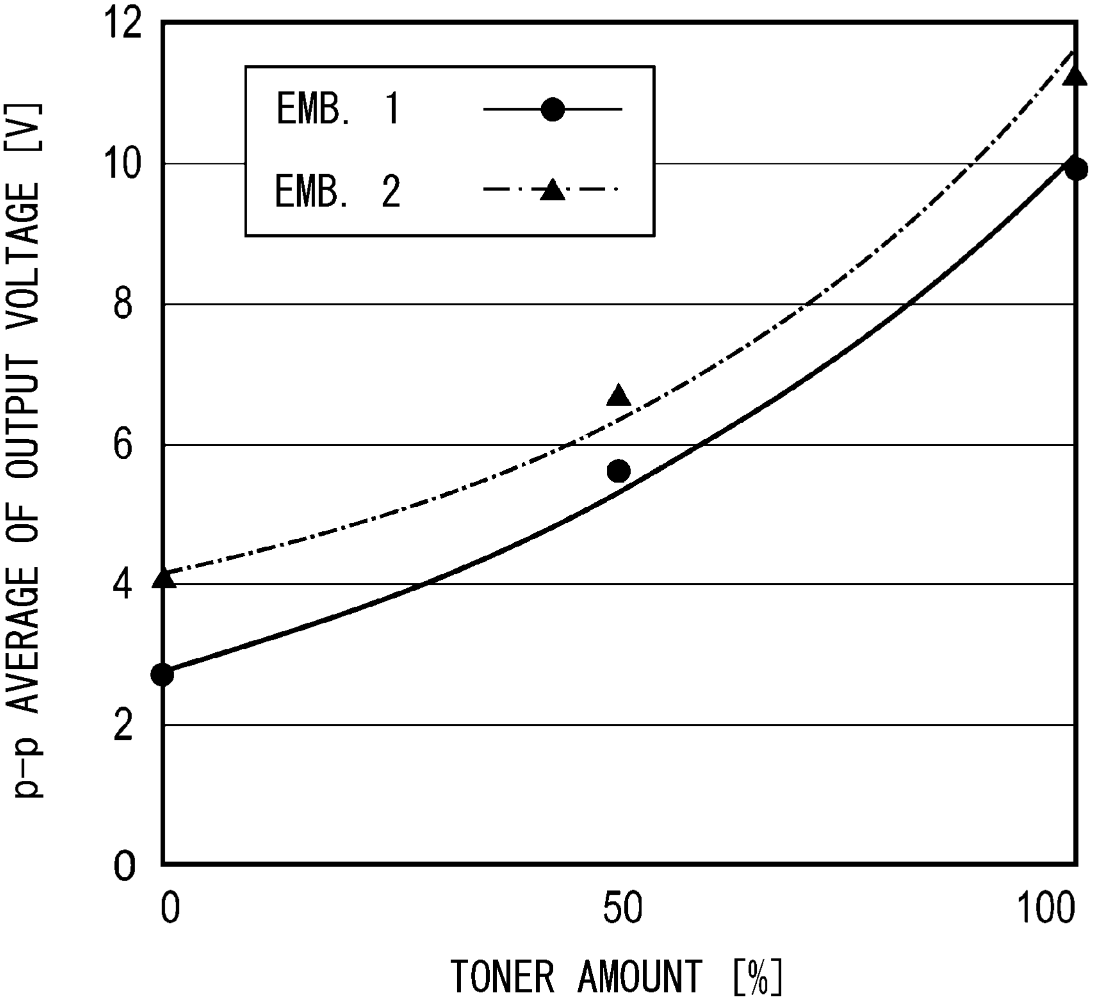

FIG. 13 is a graph showing a relationship between a toner amount and the amplitude of the output voltage in the embodiment 1 and the embodiment 2.

Figure 14:
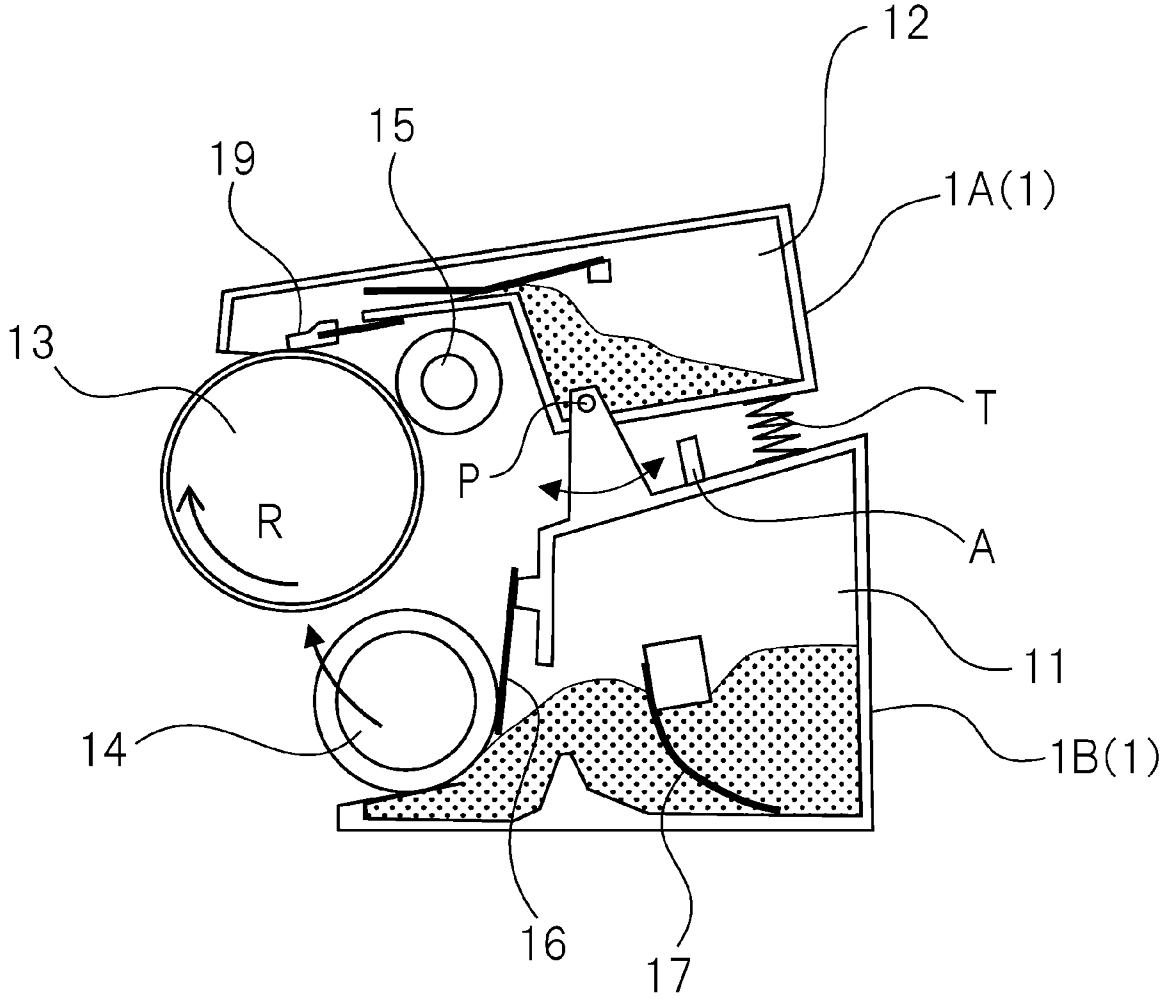

FIG. 14 is a schematic sectional view showing a structure of a process cartridge in an embodiment 3.

Figure 15:
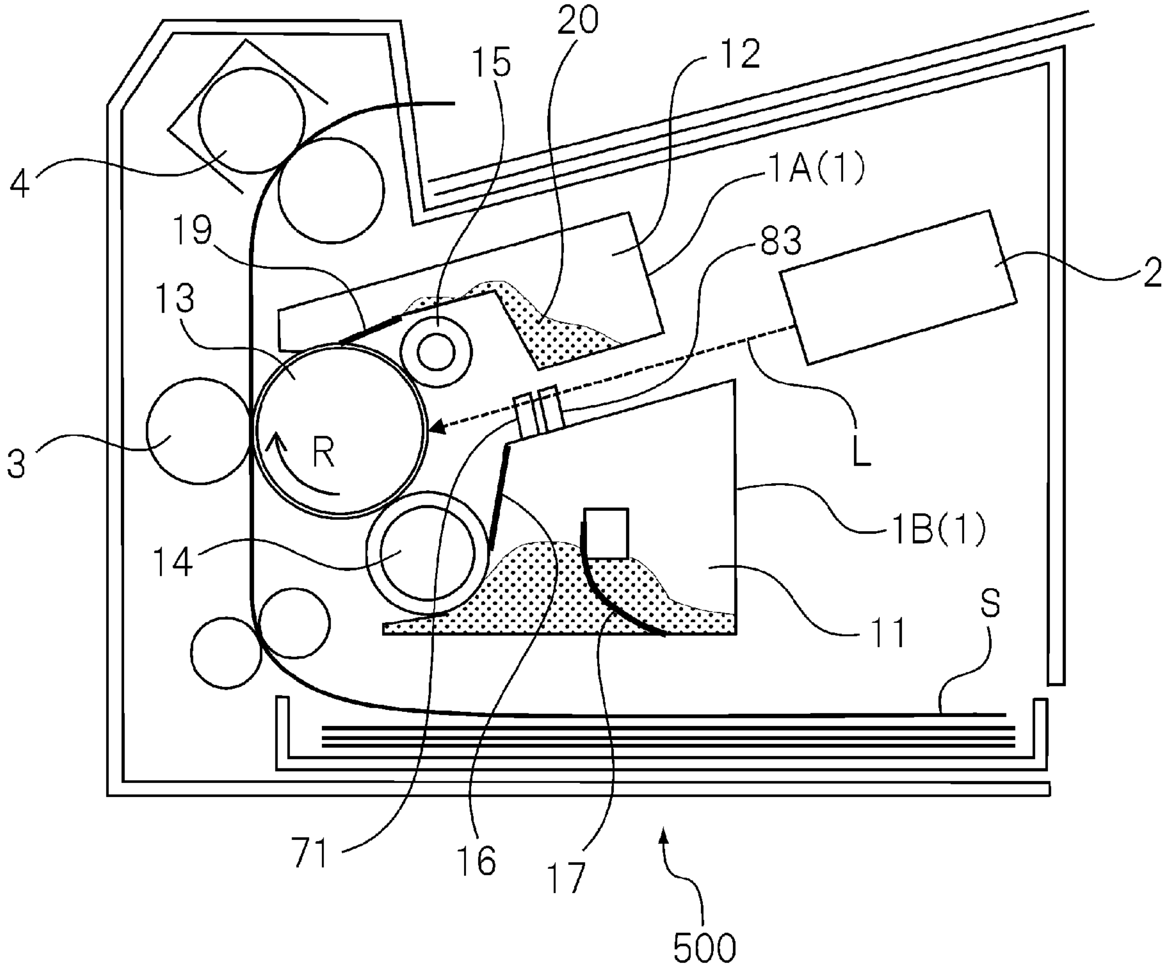

FIG. 15 is a schematic view of an image forming apparatus according to an embodiment 4.

Figure 16:
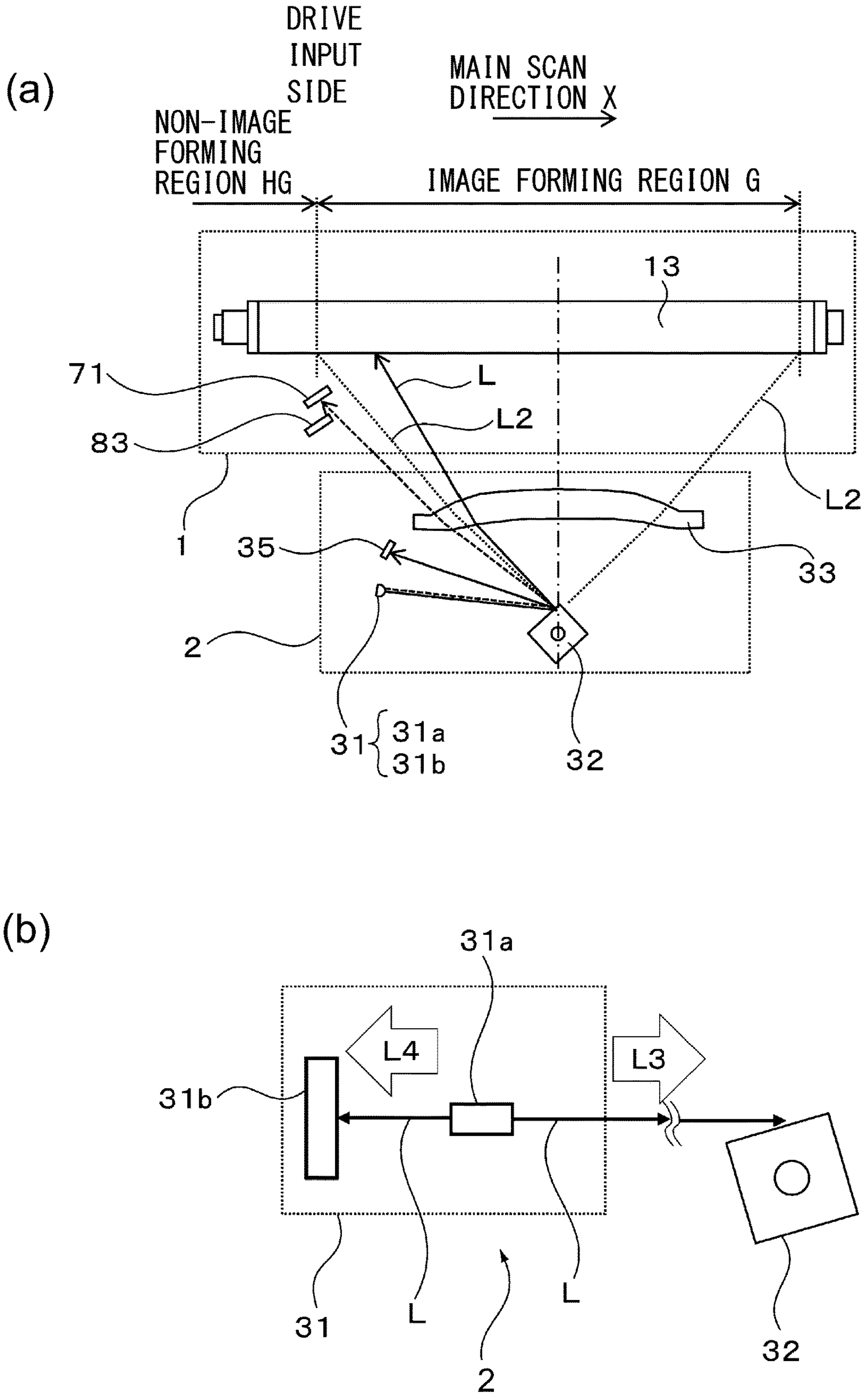

Part (a) of FIG. 16 is a schematic top view of an exposure unit and a light receiving sensor in the embodiment 4, and part (b) of FIG. 16 is a schematic sectional view showing an inner structure of a semiconductor laser in the embodiment 4.

Figure 17:
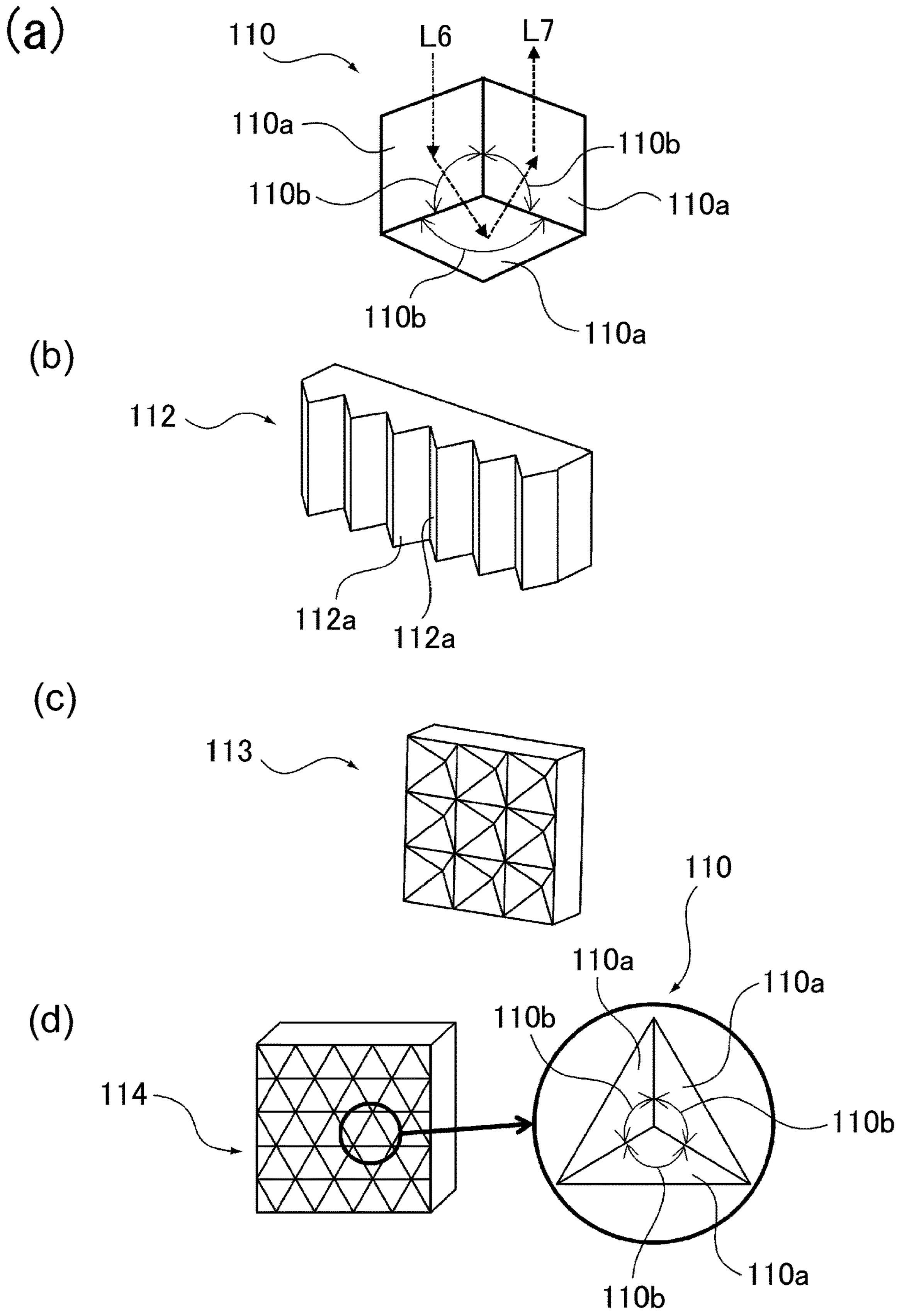

Parts (a) to (d) of FIG. 17 are schematic views each for illustrating retroreflection in the embodiment 4.

Figure 18:
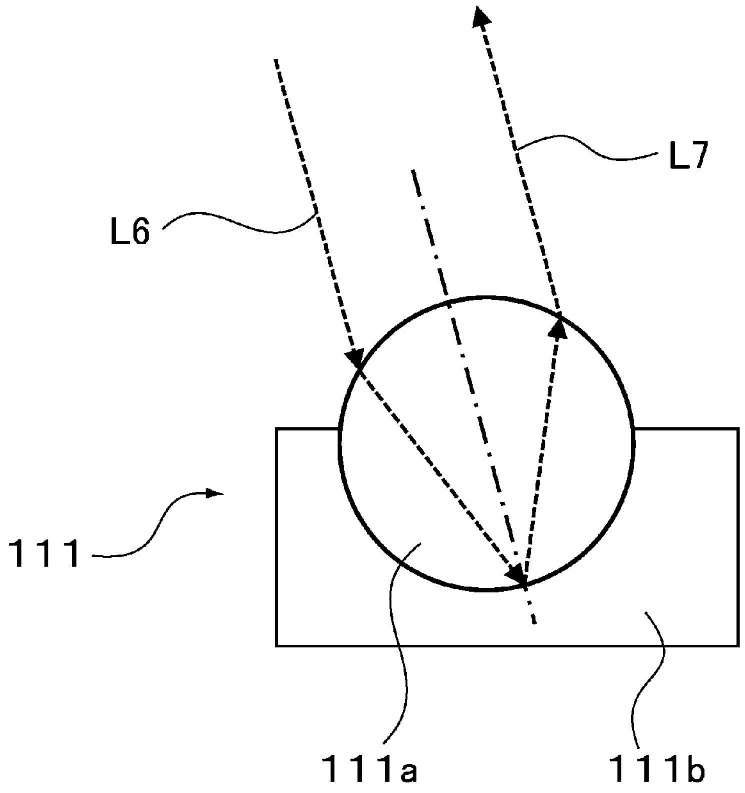
Figure 18:
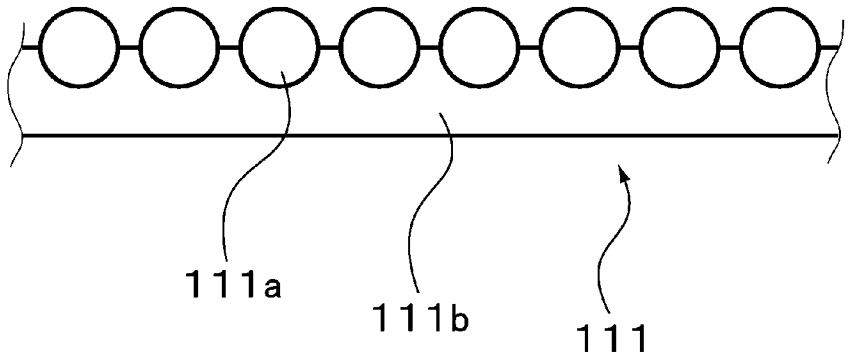

Parts (a) and (b) of FIG. 18 are schematic views for illustrating retroreflection in the embodiment 4.

Figure 19:
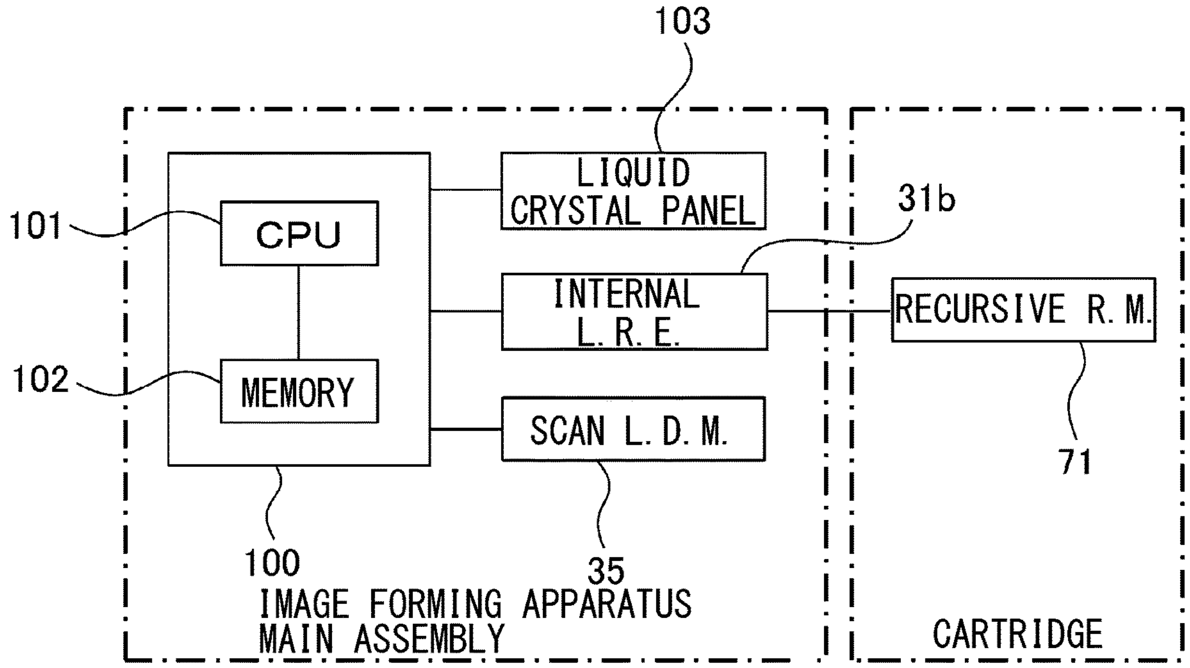

FIG. 19 is a block diagram showing a part of an electric circuit of the image forming apparatus according to the embodiment 4.

Figure 20:
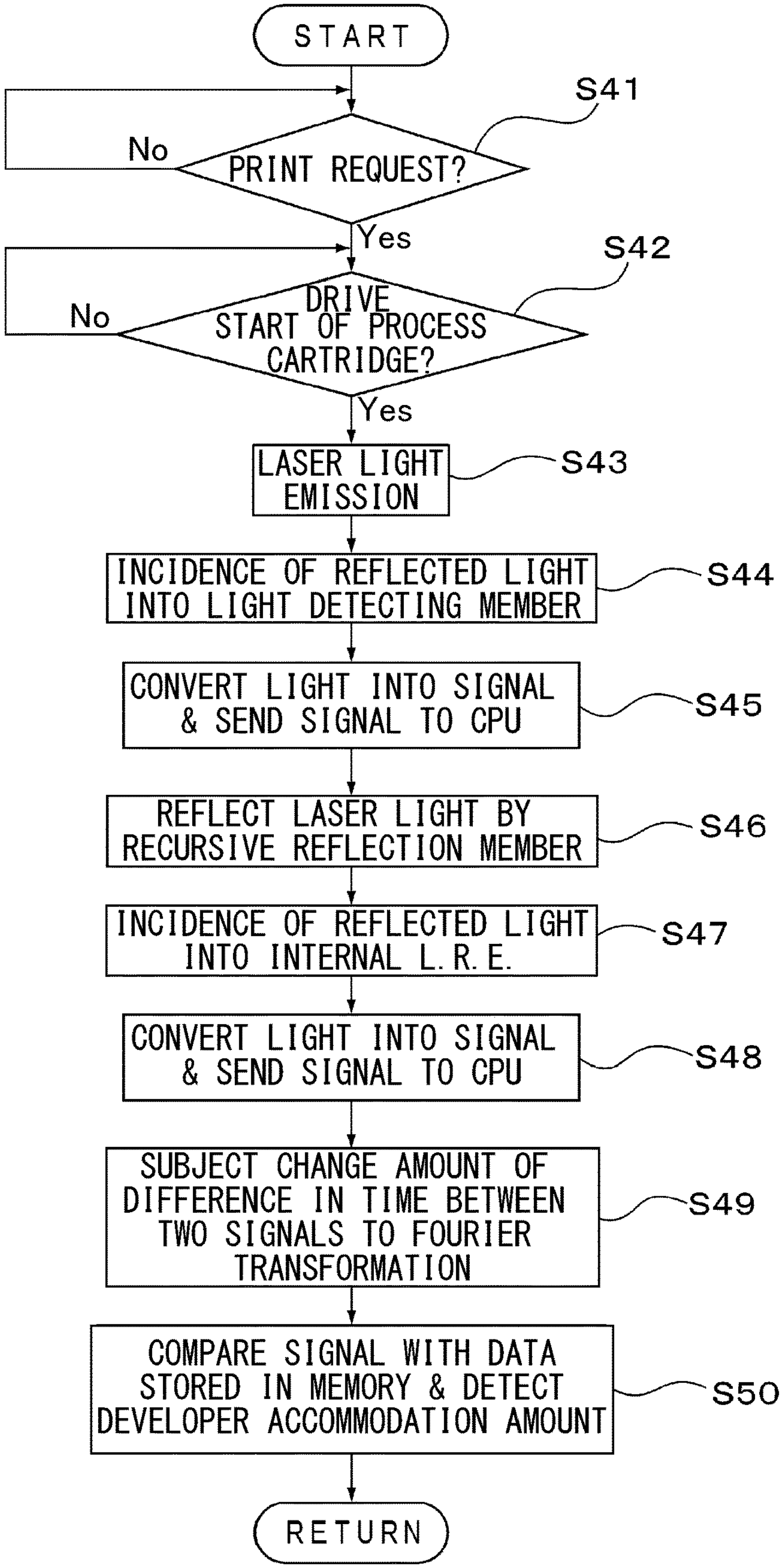

FIG. 20 is a flowchart relating to a detection process of a toner accommodation amount in the embodiment 4.

Figure 21:
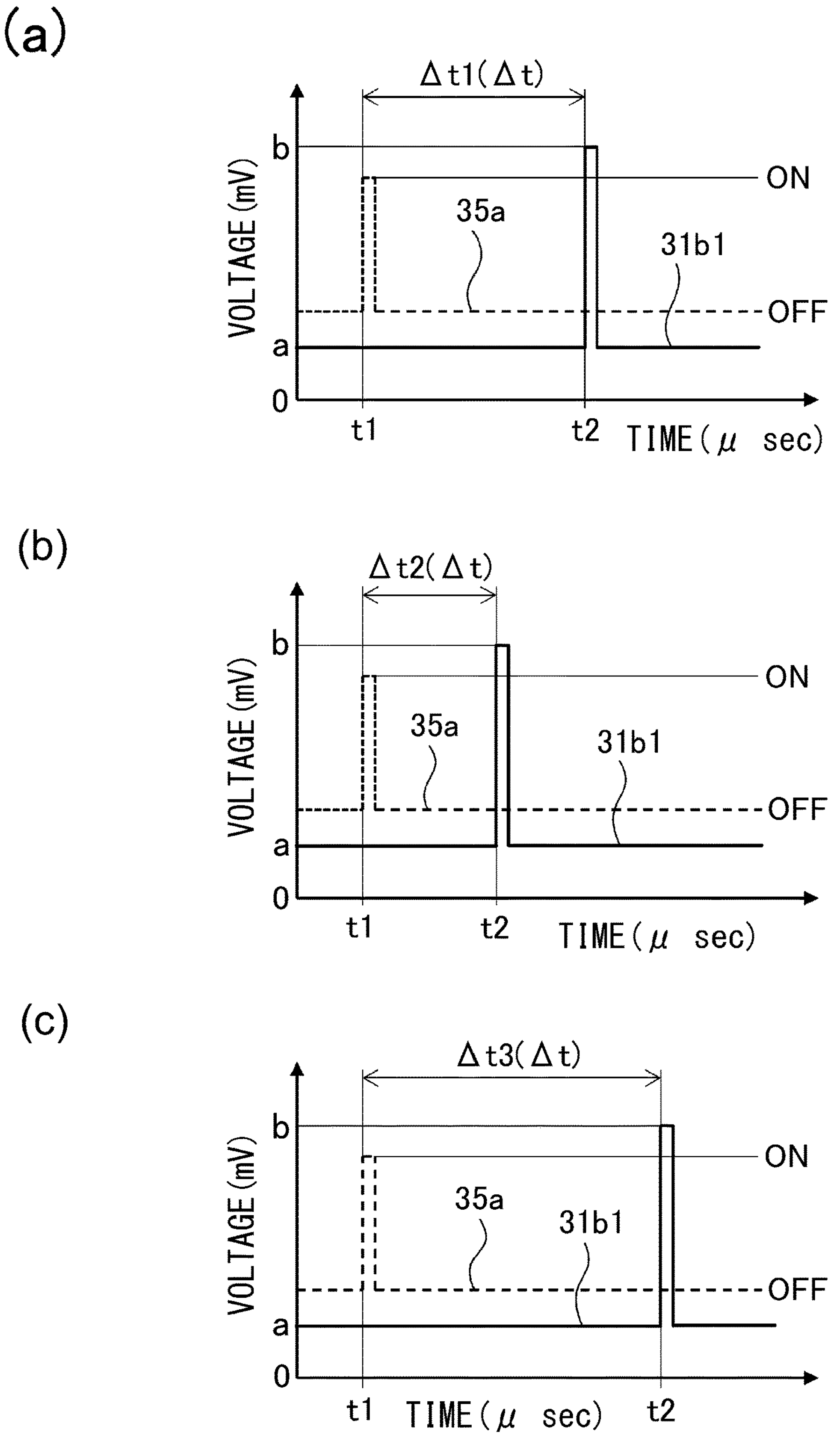

Parts (a) to (c) of FIG. 21 are graphs each for illustrating a waveform of a monitor voltage in the embodiment 4.

Figure 22:
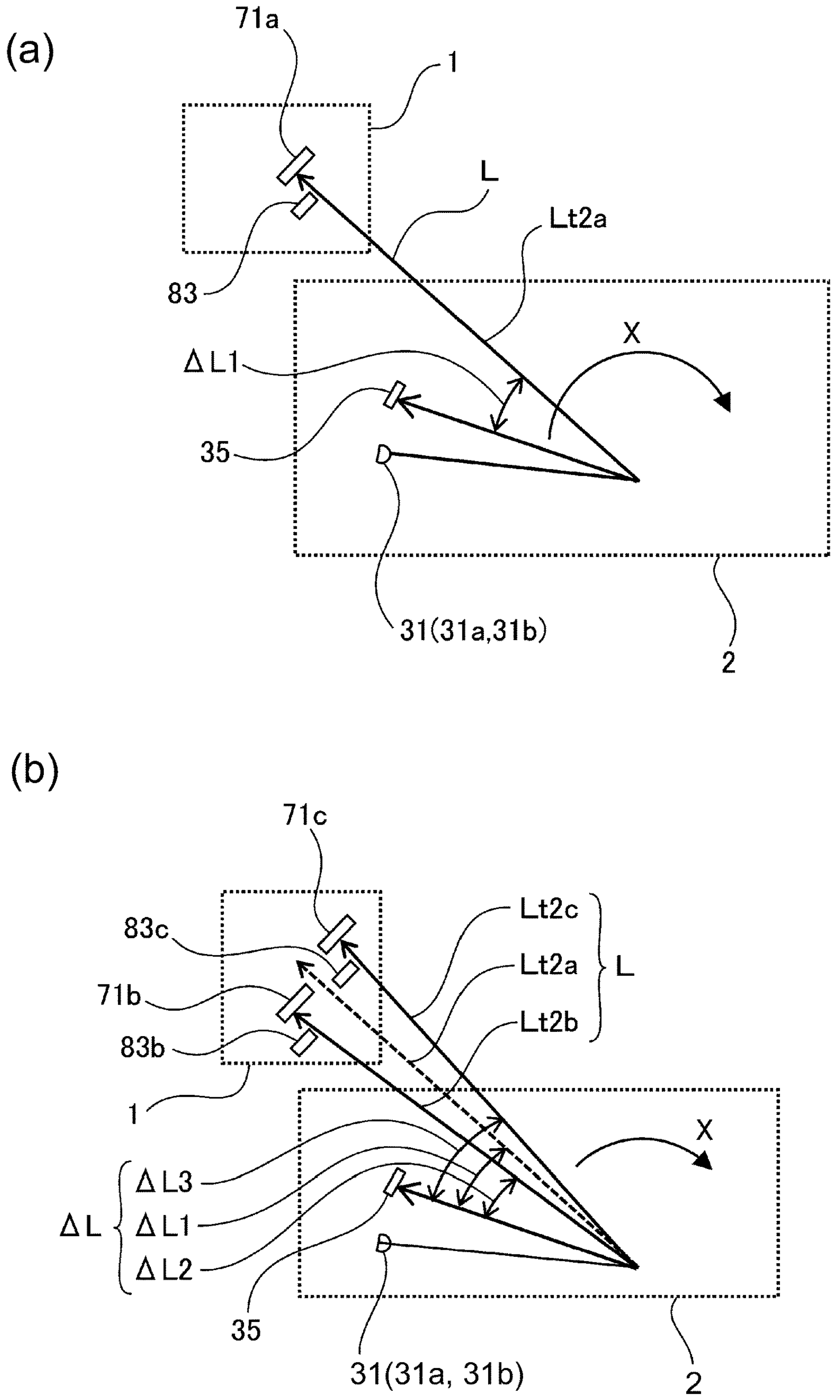

Parts (a) and (b) of FIG. 22 are schematic views each for illustrating a retroreflection member and laser light in the embodiment 4.

Figure 23:
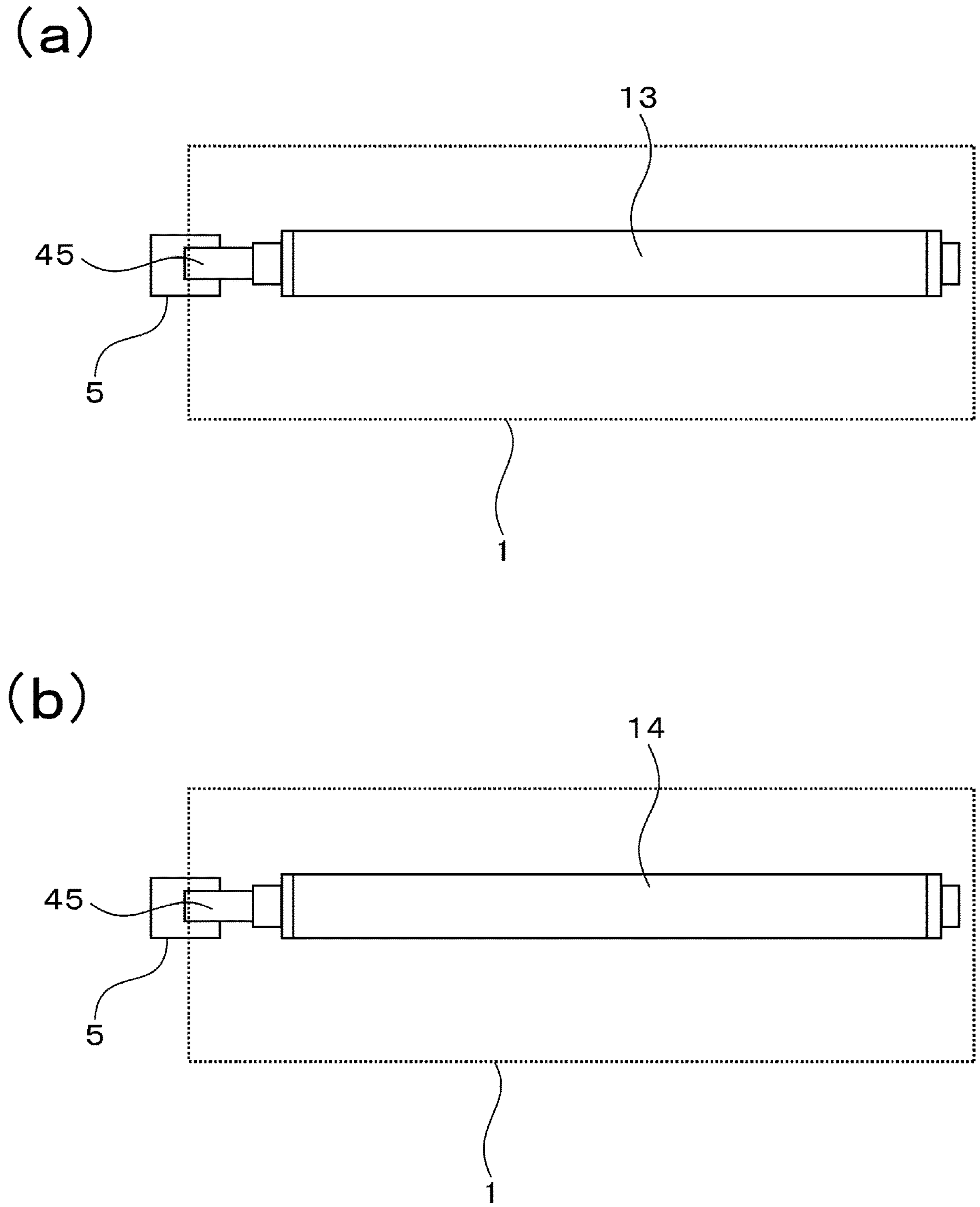

Parts (a) and (b) of FIG. 23 are schematic views each for illustrating a driving portion of an image forming apparatus main assembly and a process cartridge.

Figure 24:
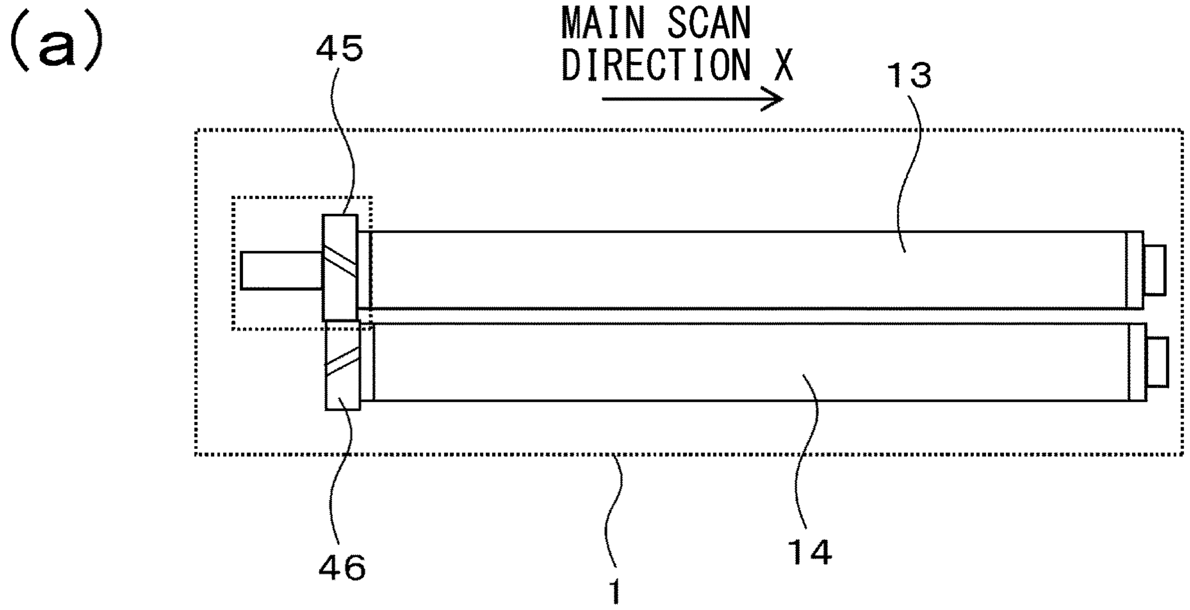
Figure 24:
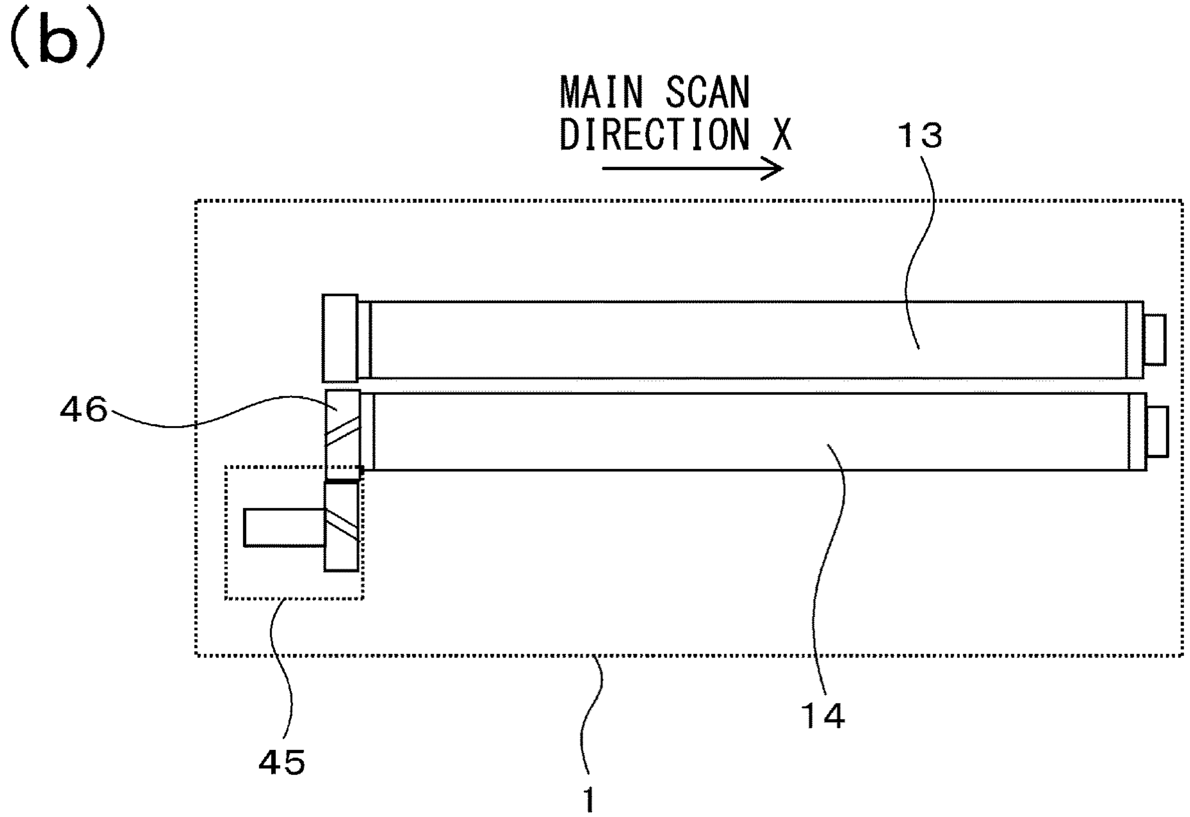

Parts (a) and (b) of FIG. 24 are schematic views each for illustrating drive transmission of an inside of a process cartridge in the embodiment 4.

Figure 25:
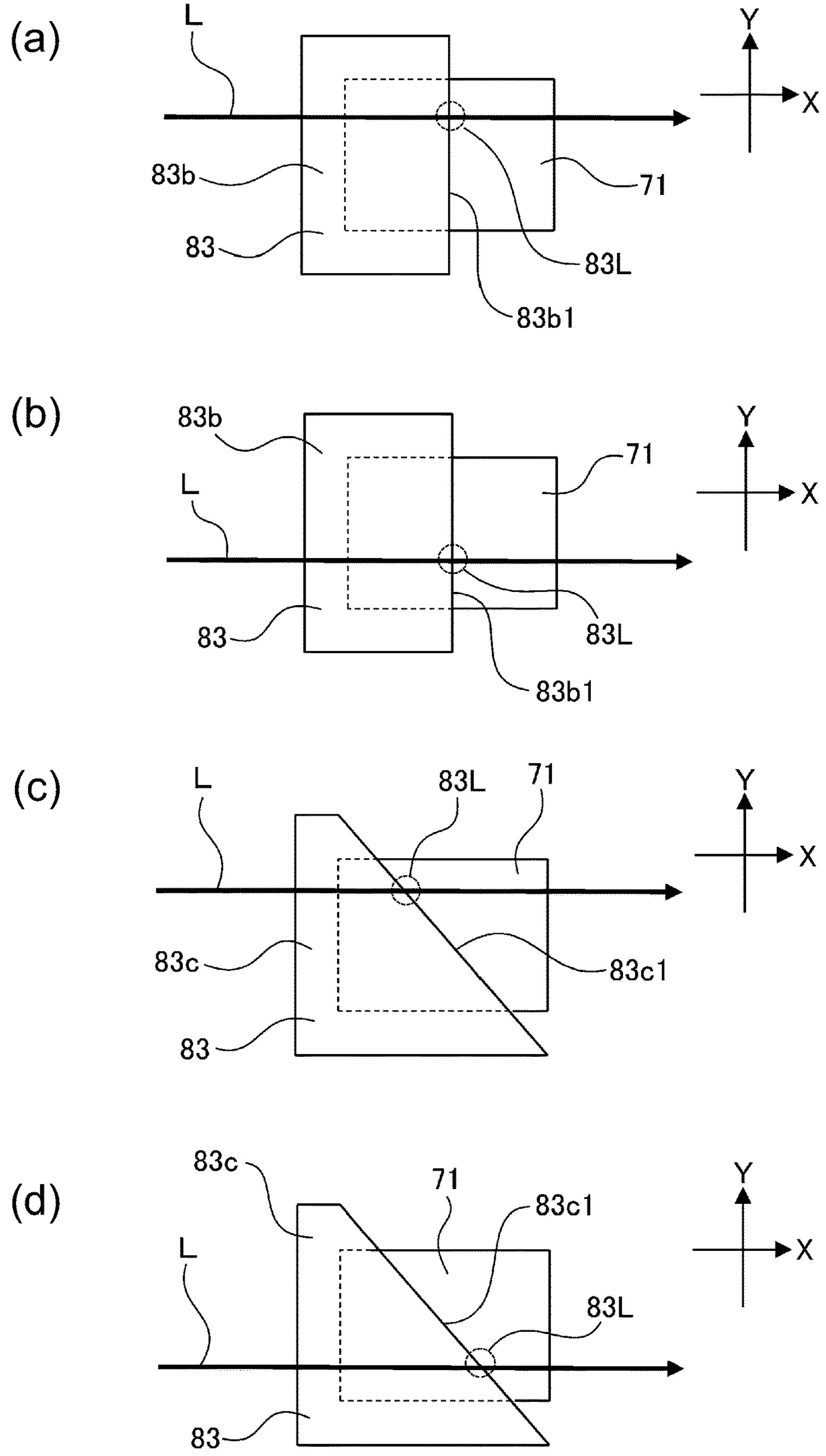

Parts (a) to (d) of FIG. 25 are schematic views each for illustrating a slit member in the embodiment 4.

Figure 26:
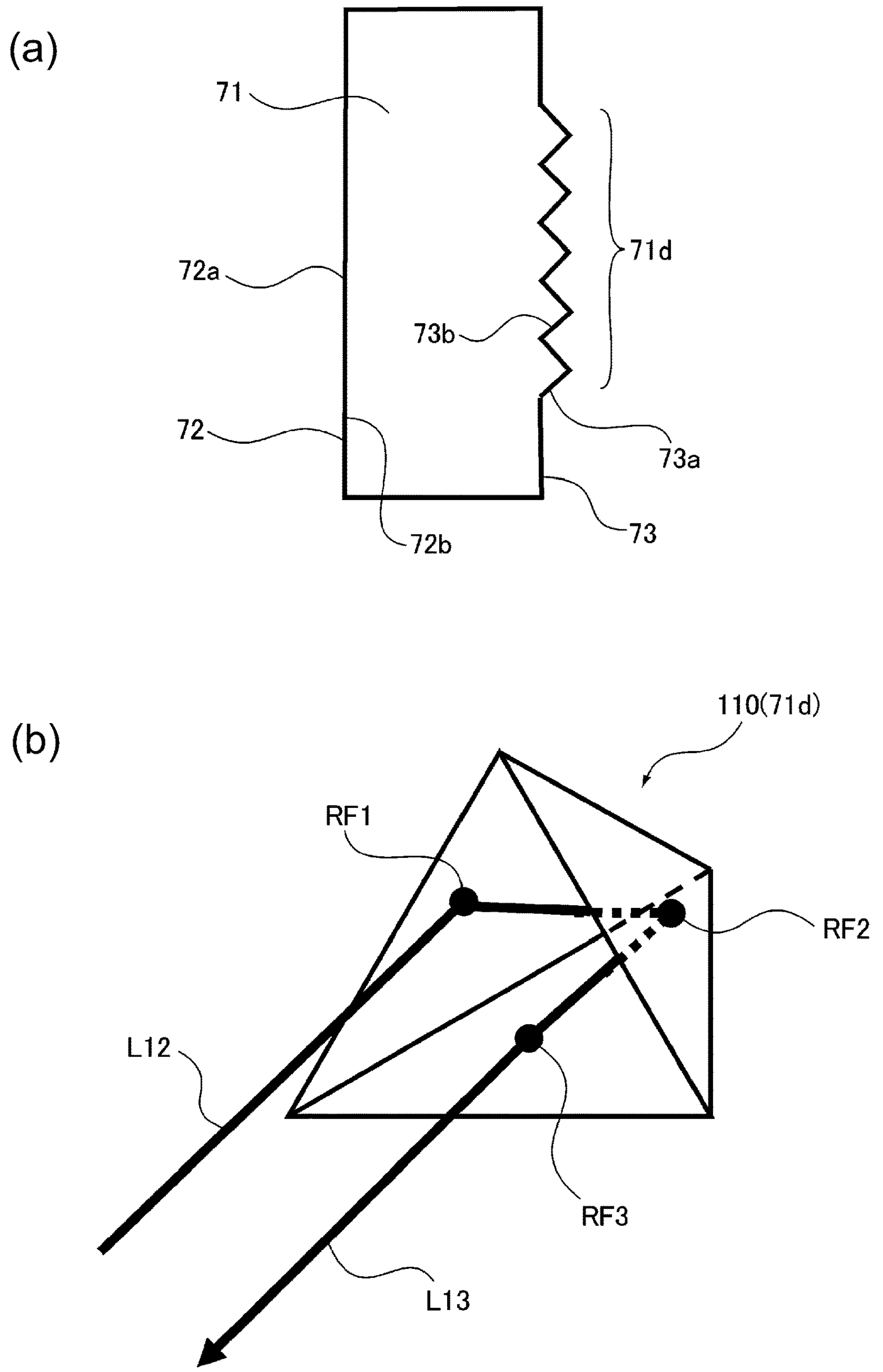

Parts (a) of FIG. 26 is a schematic view for illustrating a retroreflection member in an embodiment 5, and part (b) of FIG. 26 is a schematic view for illustrating a retroreflection shape and a reflection optical path in the embodiment 5.

Figure 27:
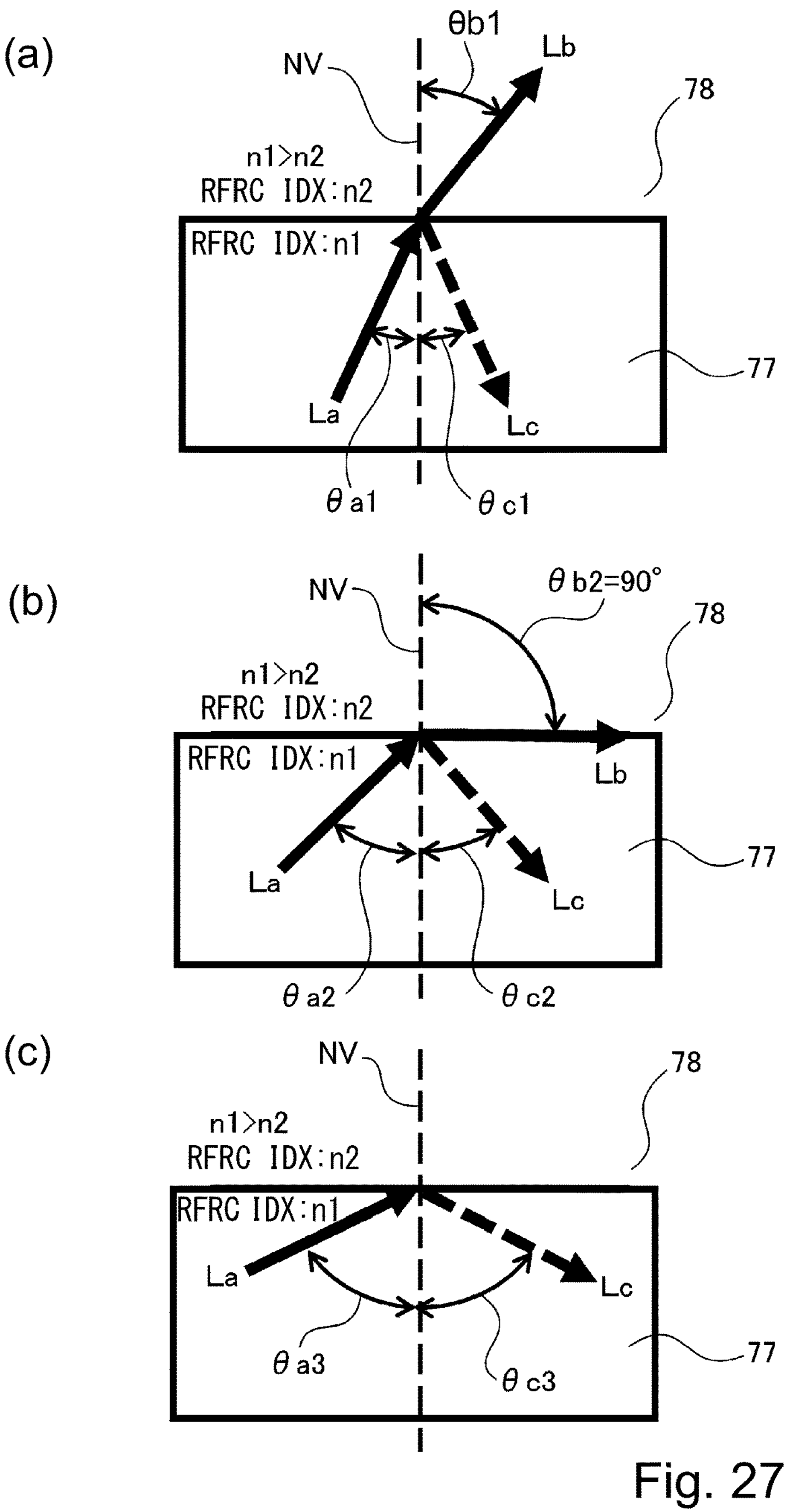

Parts (a) to (c) of FIG. 27 are schematic views for illustrating a total reflection phenomenon in the embodiment 5.

Figure 28:
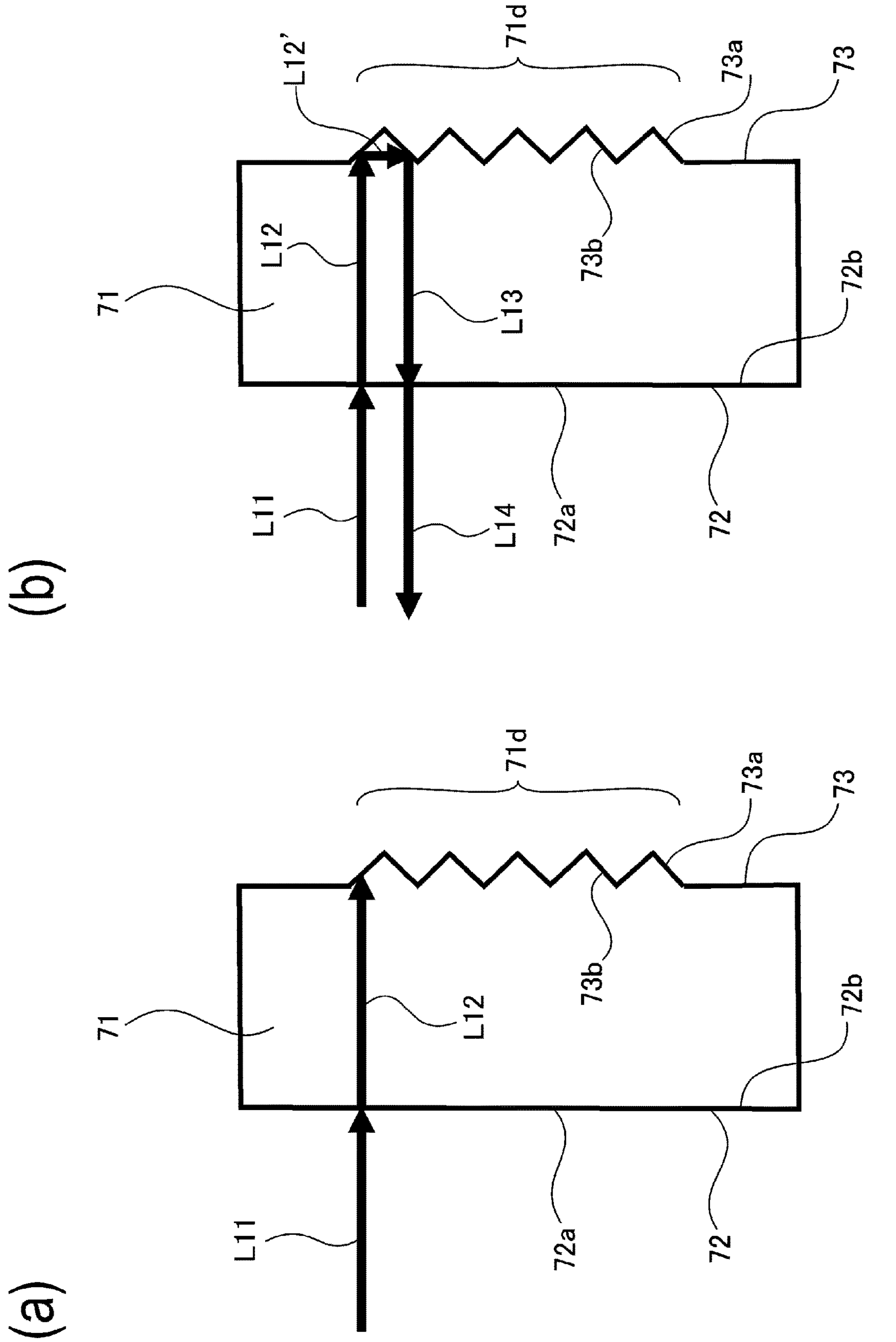

Parts (a) and (b) of FIG. 28 are schematic views for illustrating a reflection optical path of a retroreflection member in the embodiment 5.

Figure 29:
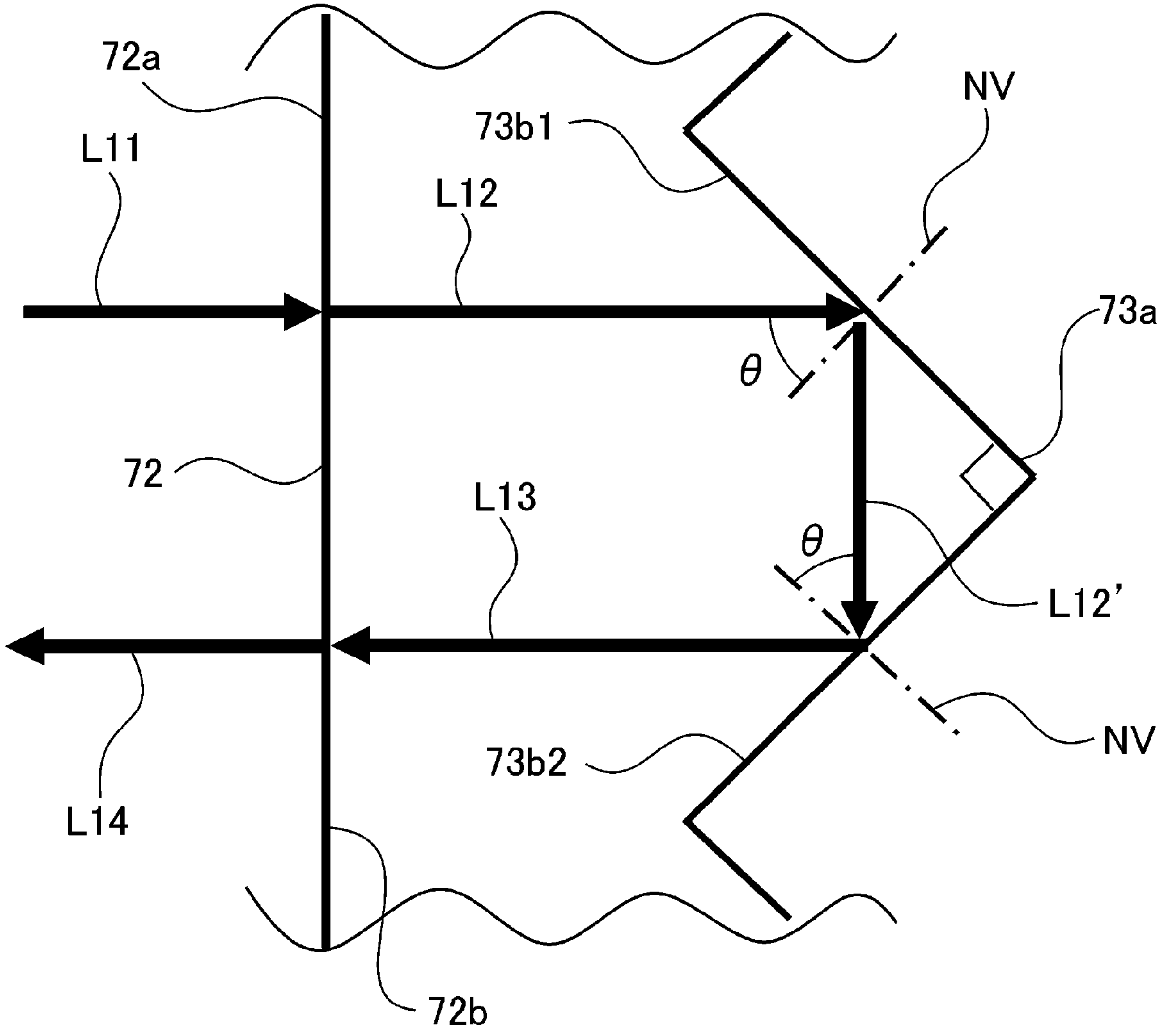

FIG. 29 is a schematic view for illustrating a reflection optical path of the retroreflection member in the embodiment 5.

Figure 30:
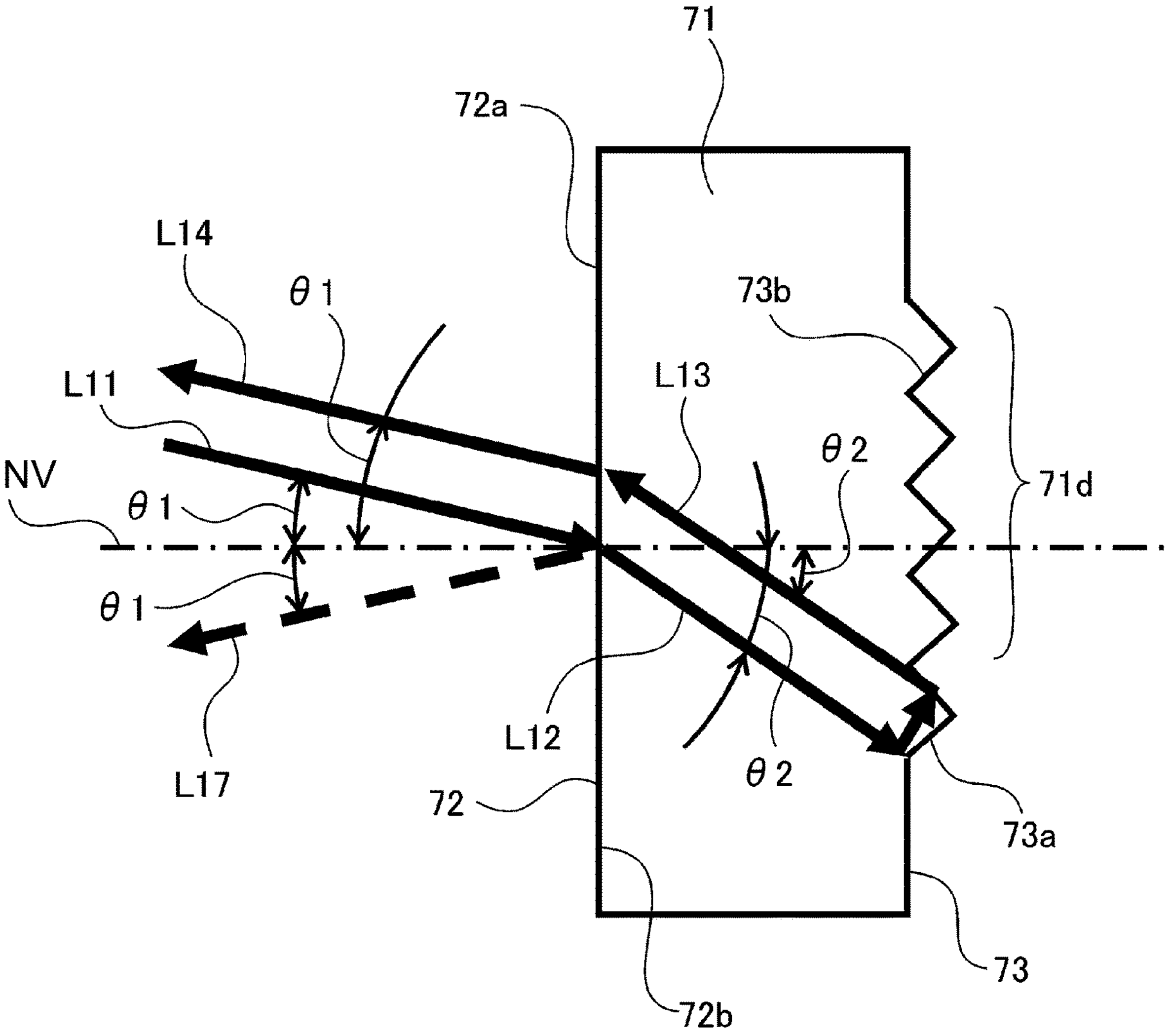

FIG. 30 is a schematic view for illustrating a reflection optical path of the retroreflection member in the embodiment 5.

Figure 31:
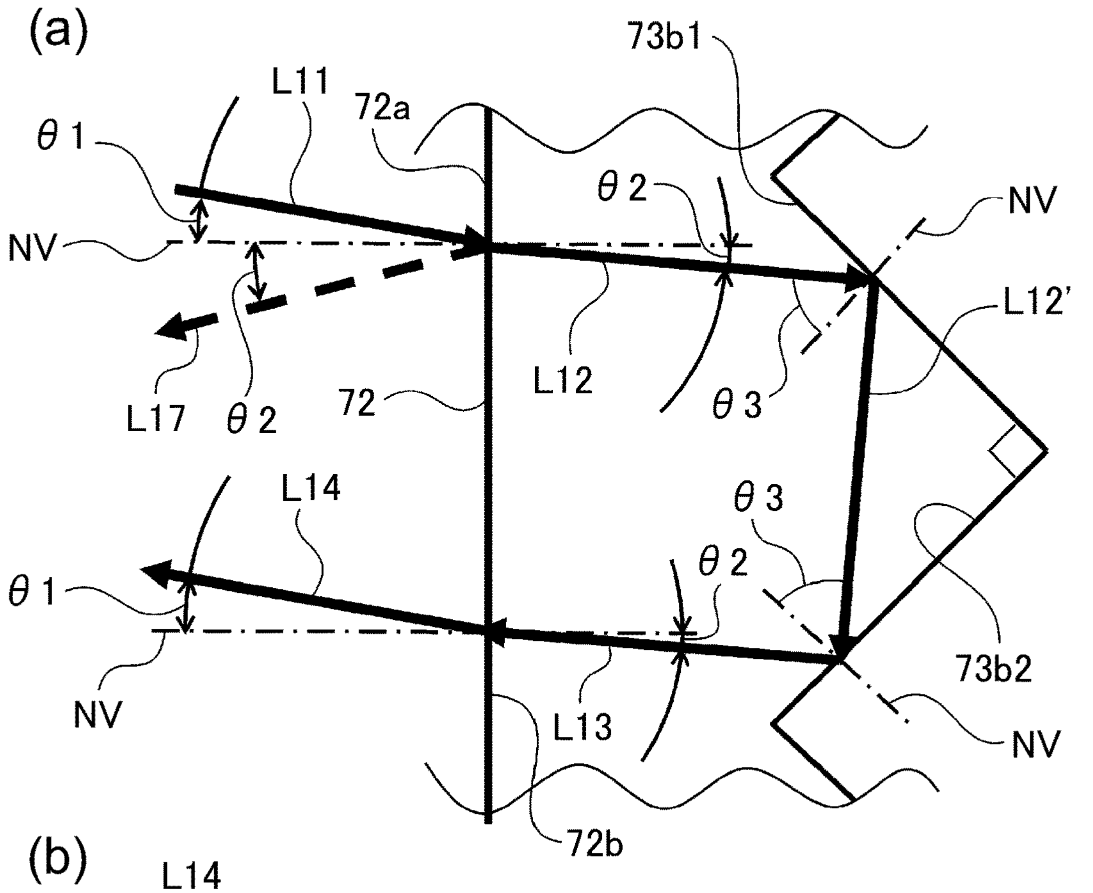
Figure 31:
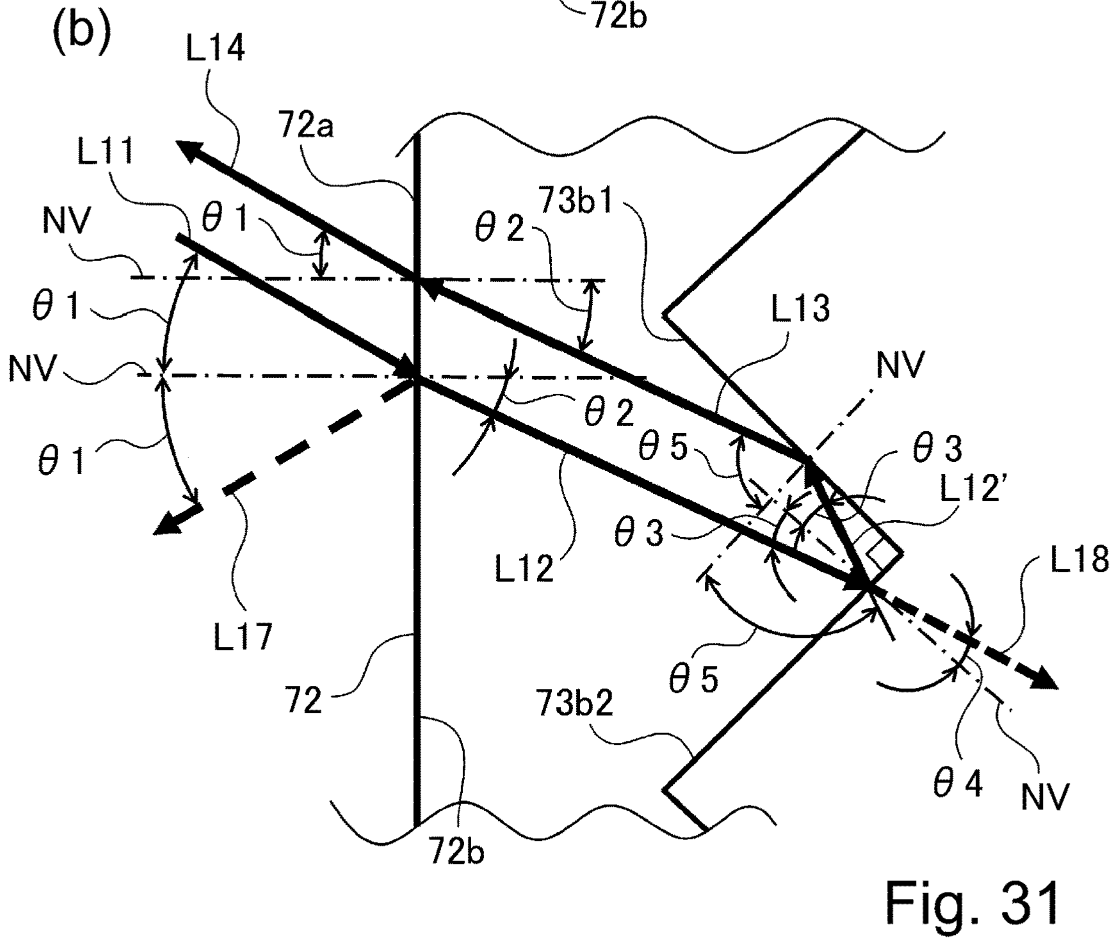

Parts (a) and (b) of FIG. 31 are schematic views each for illustrating a reflection optical path of the retroreflection member in the embodiment 5.

Figure 32:
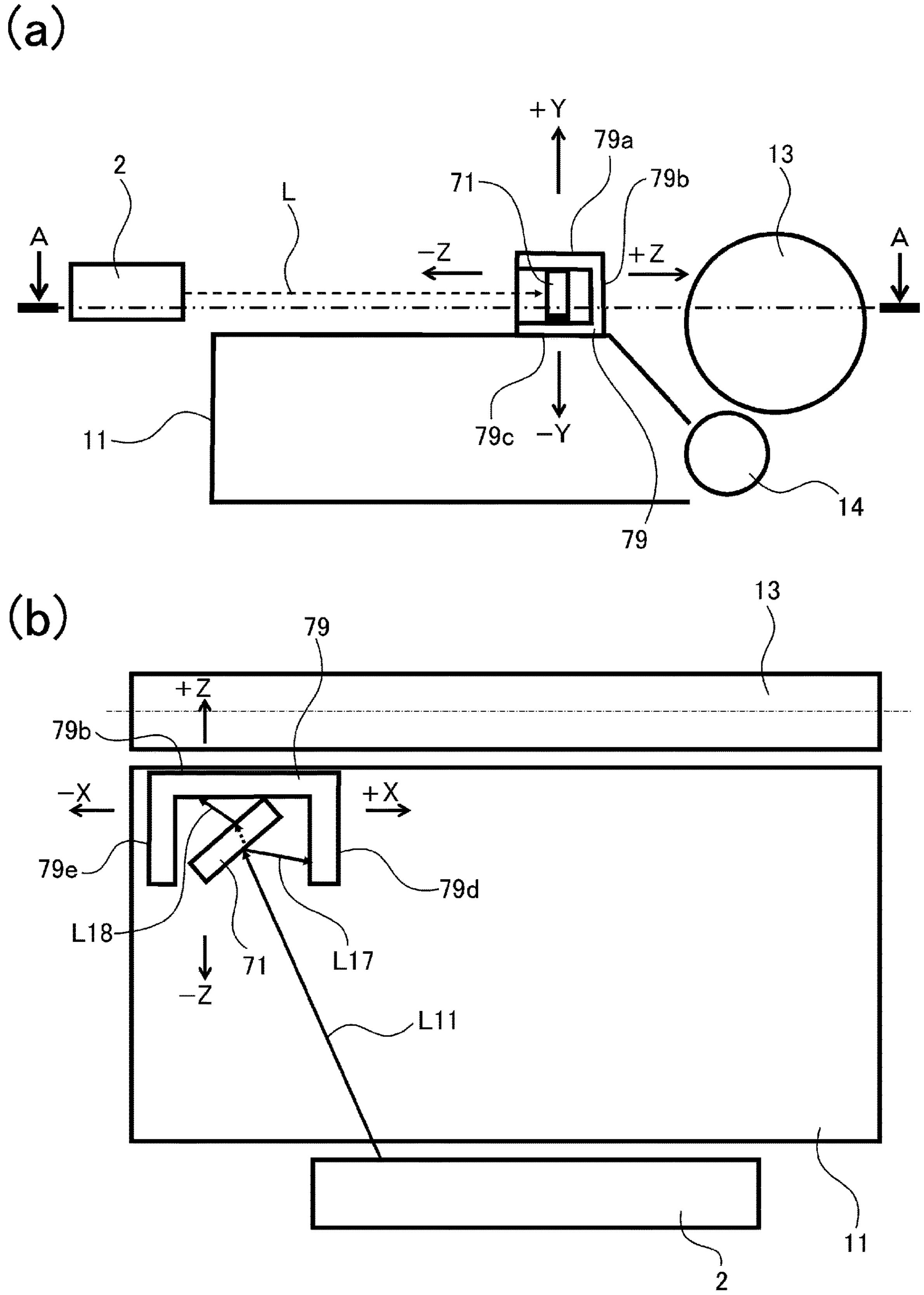

Parts (a) and (b) of FIG. 32 are schematic views for illustrating a shielding member in the embodiment 5.

Figure 33:
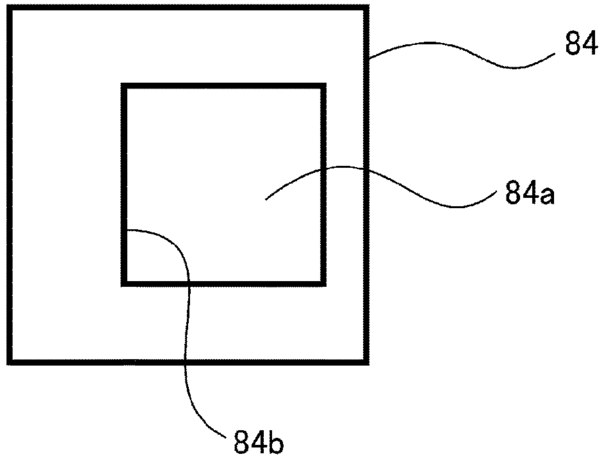
Figure 33:
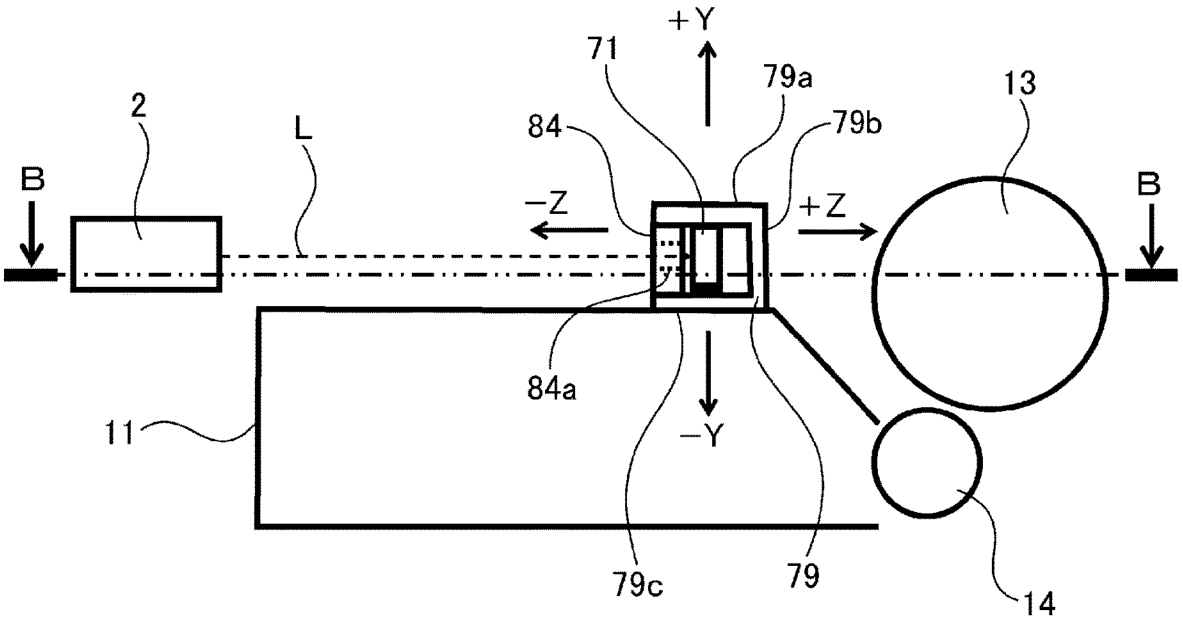

Part (a) of FIG. 33 is a schematic view for illustrating a slit member in the embodiment 5, and part (b) of FIG. 33 is a schematic view for illustrating the shielding member in the embodiment 5.

Figure 34:
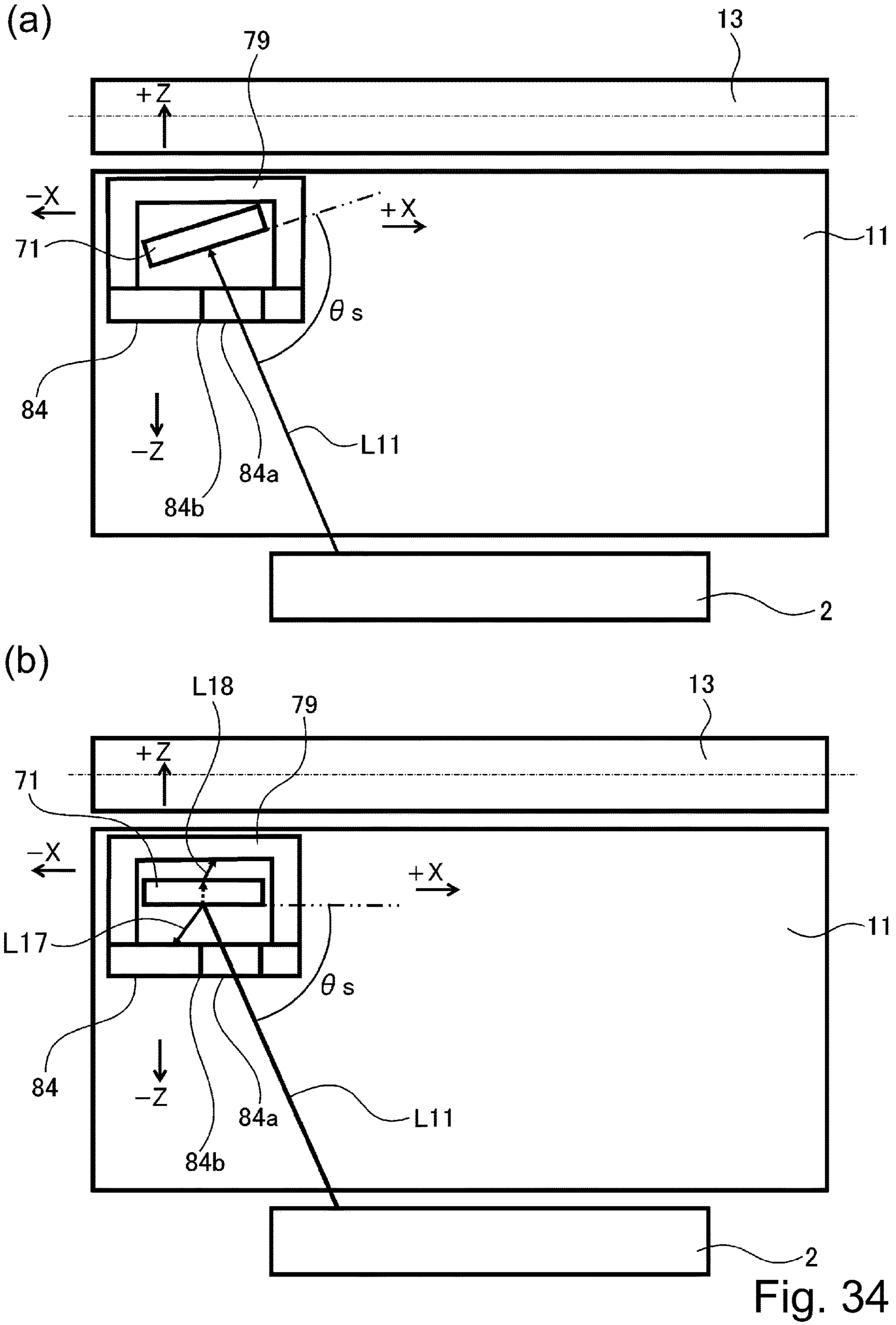

Parts (a) and (b) of FIG. 34 are schematic views for illustrating the shielding member in the embodiment 5.

Figure 35:
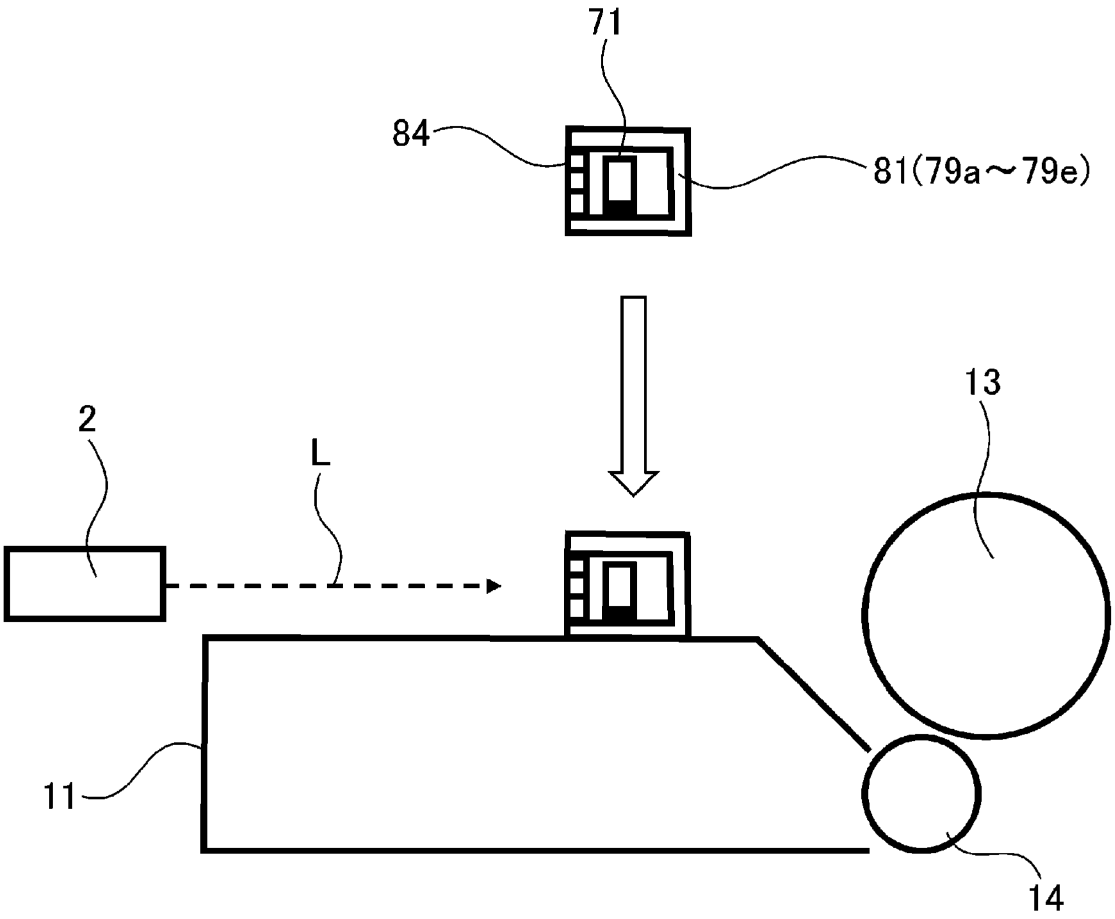

FIG. 35 is a schematic view for illustrating another shielding member in the embodiment 5.

Figure 36:
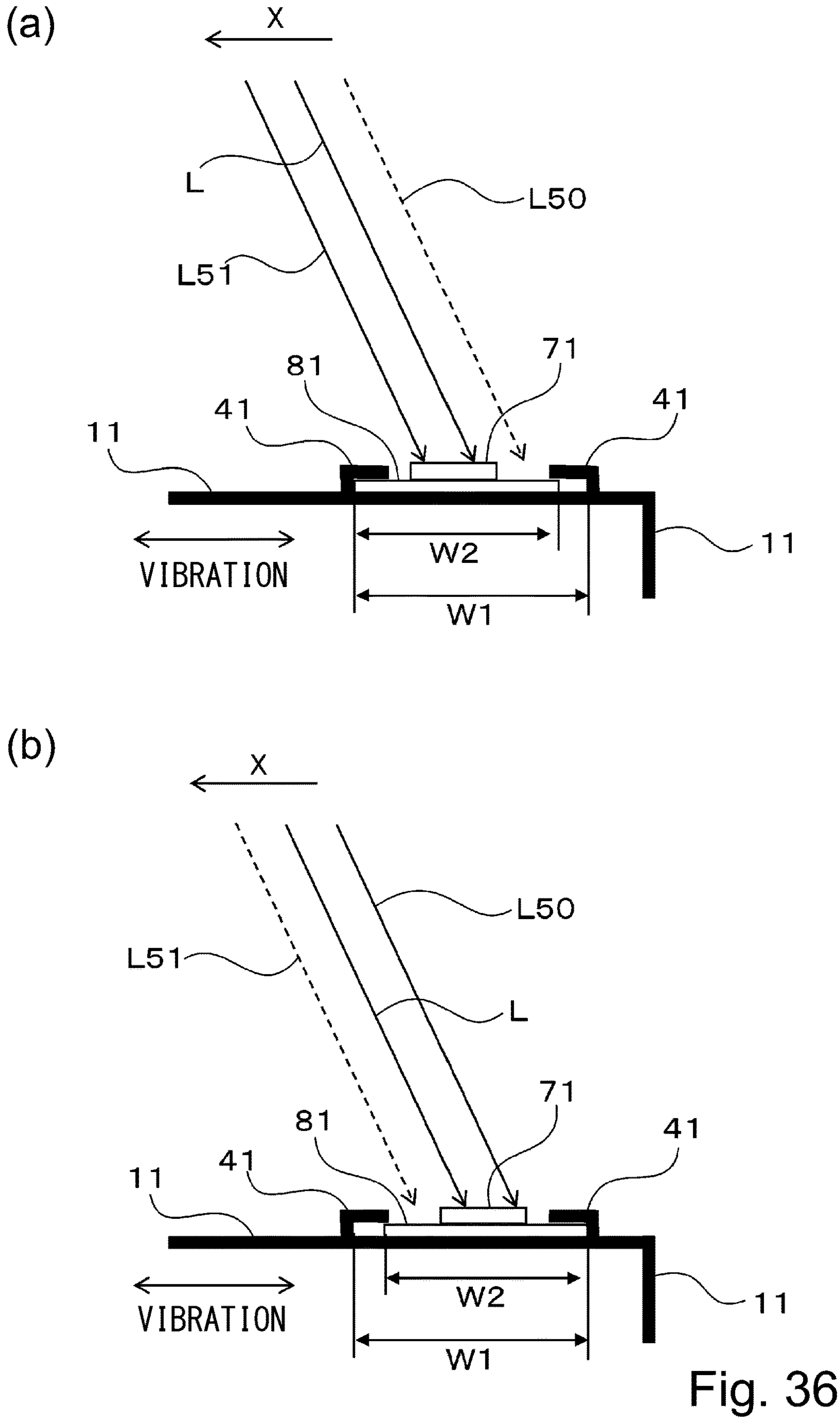

Parts (a) and (b) of FIG. 36 are schematic views for illustrating a reflection member installation from in an embodiment 6.

Figure 37:
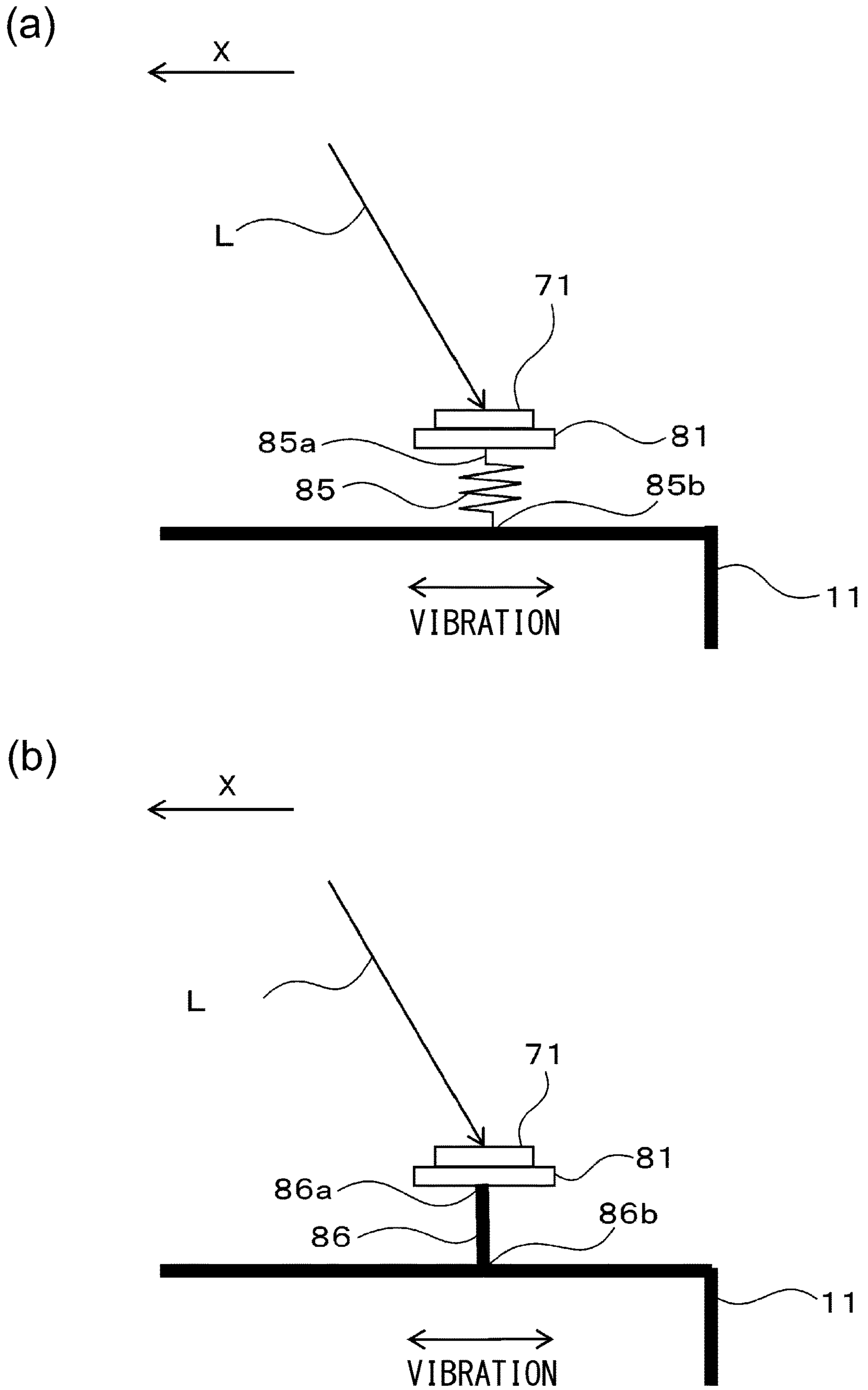

Part (a) of FIG. 37 is a schematic view for illustrating a reflection member installation form in an embodiment 7, and part (b) of FIG. 37 is a schematic view for illustrating a reflection member installation form in an embodiment 8.

Figure 38:
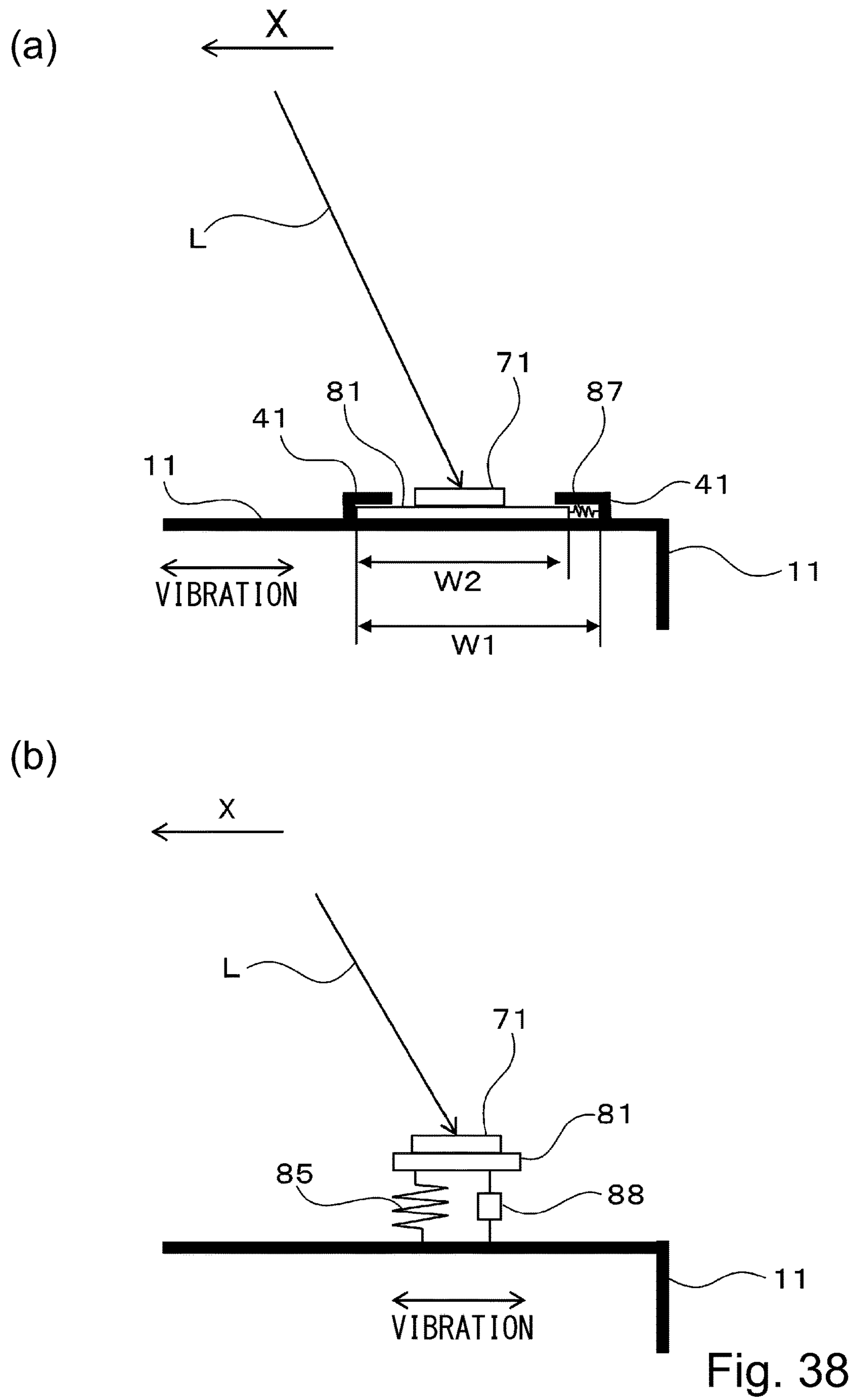

Part (a) of FIG. 38 is a schematic view for illustrating a reflection member installation form in an embodiment 9, and part (b) of FIG. 38 is a schematic view for illustrating a reflection member installation form in an embodiment 10.

Figure 39:
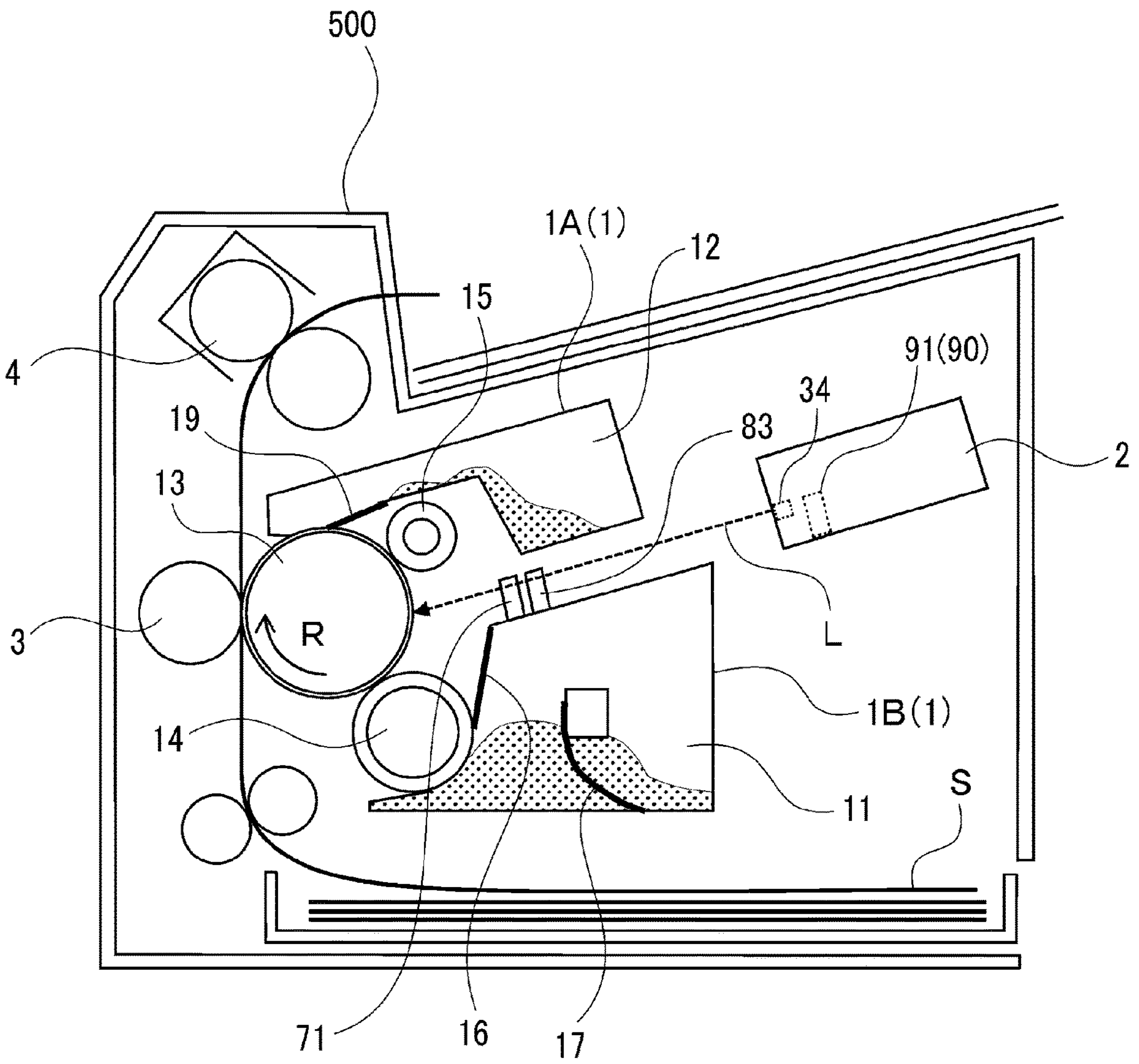

FIG. 39 is a schematic view of an image forming apparatus according to an embodiment 11.

Figure 40:
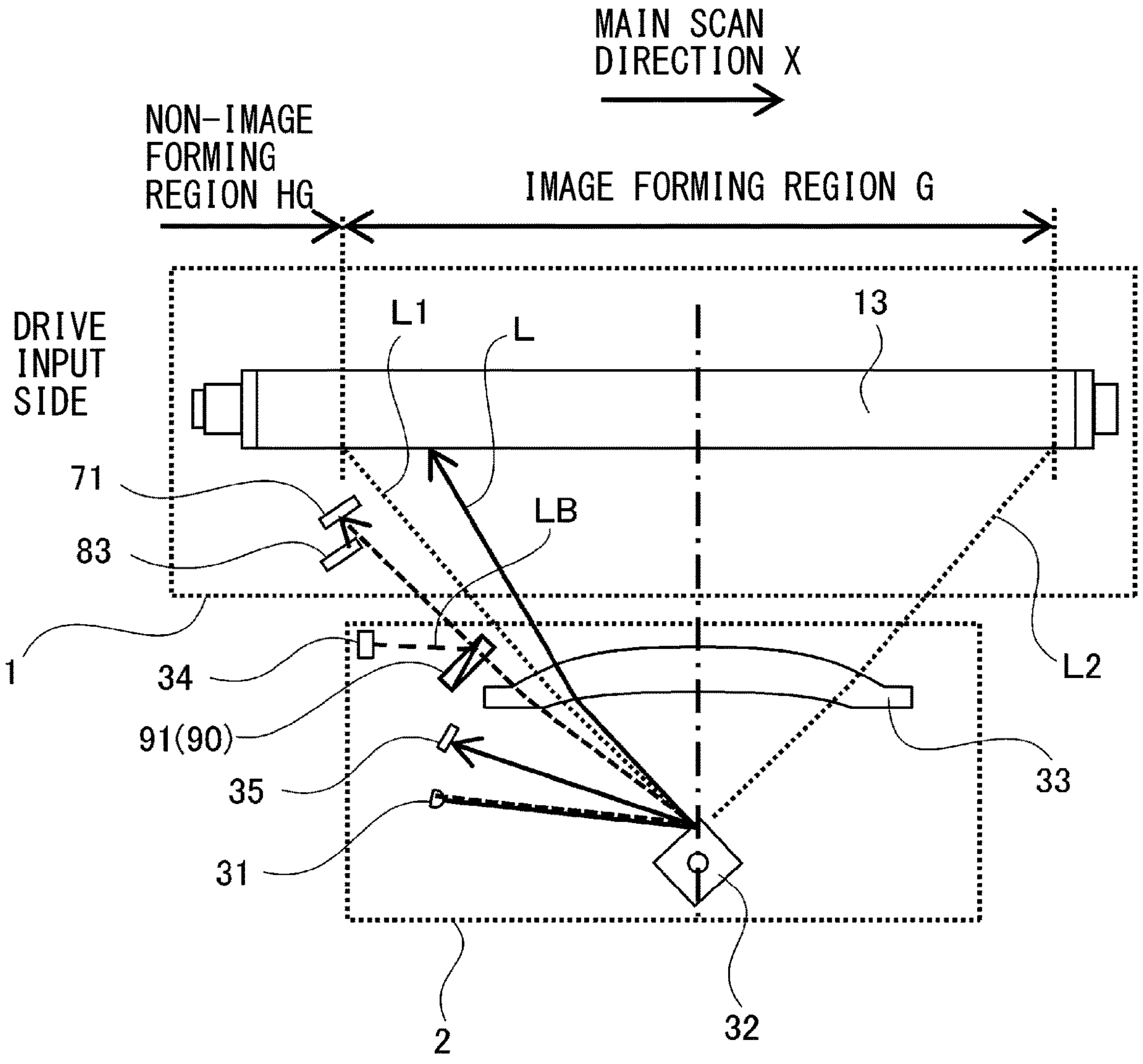

FIG. 40 is a schematic top view of an exposure unit and a light receiving sensor in the embodiment 11.

Figure 41:
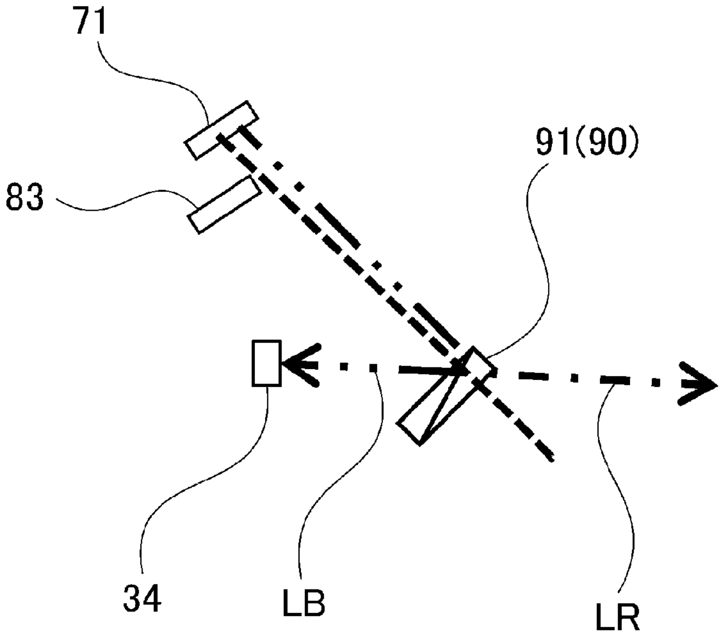

FIG. 41 is a schematic view for illustrating a beam separating (splitting) means and reflected light therefrom in the embodiment 11.

Figure 42:
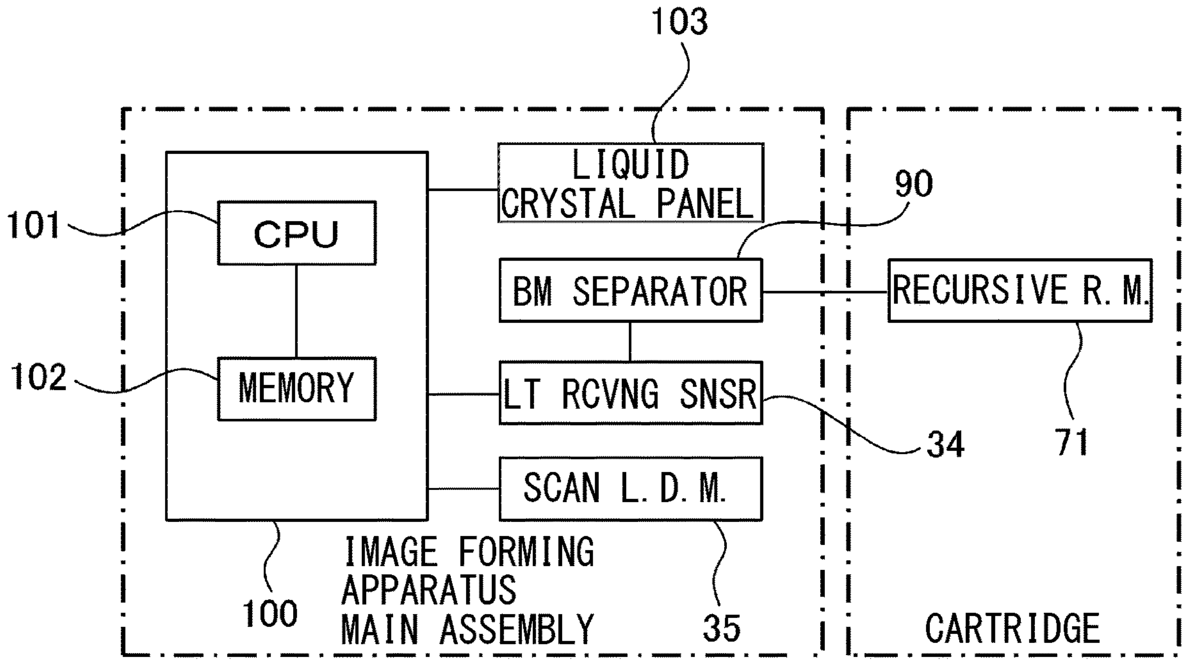

FIG. 42 is a blocking diagram showing a part of an electric circuit of the image forming apparatus according to the embodiment 11.

Figure 43:
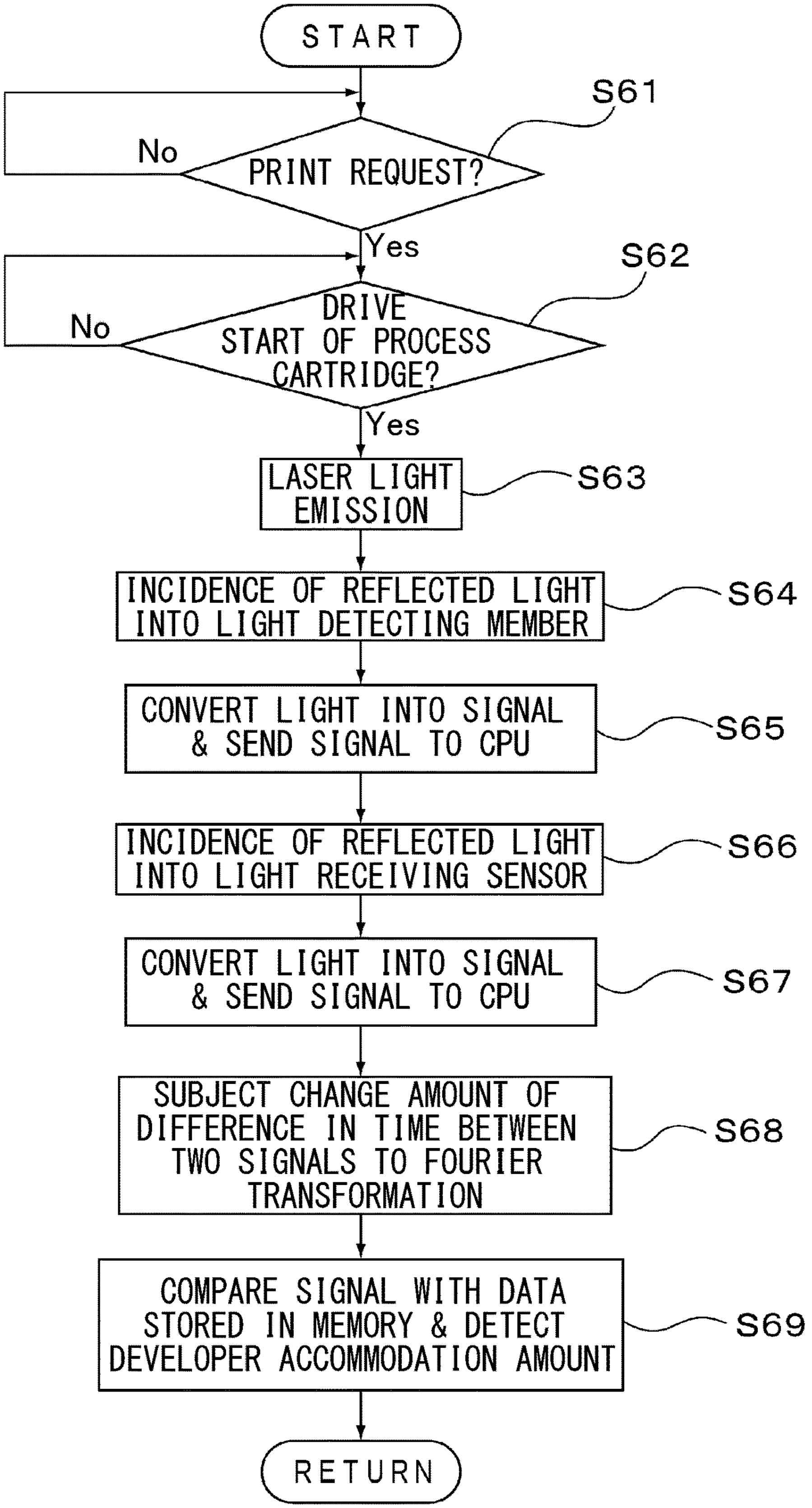

FIG. 43 is a flowchart relating to a detection process of a toner accommodation amount in the embodiment 11.

Figure 44:
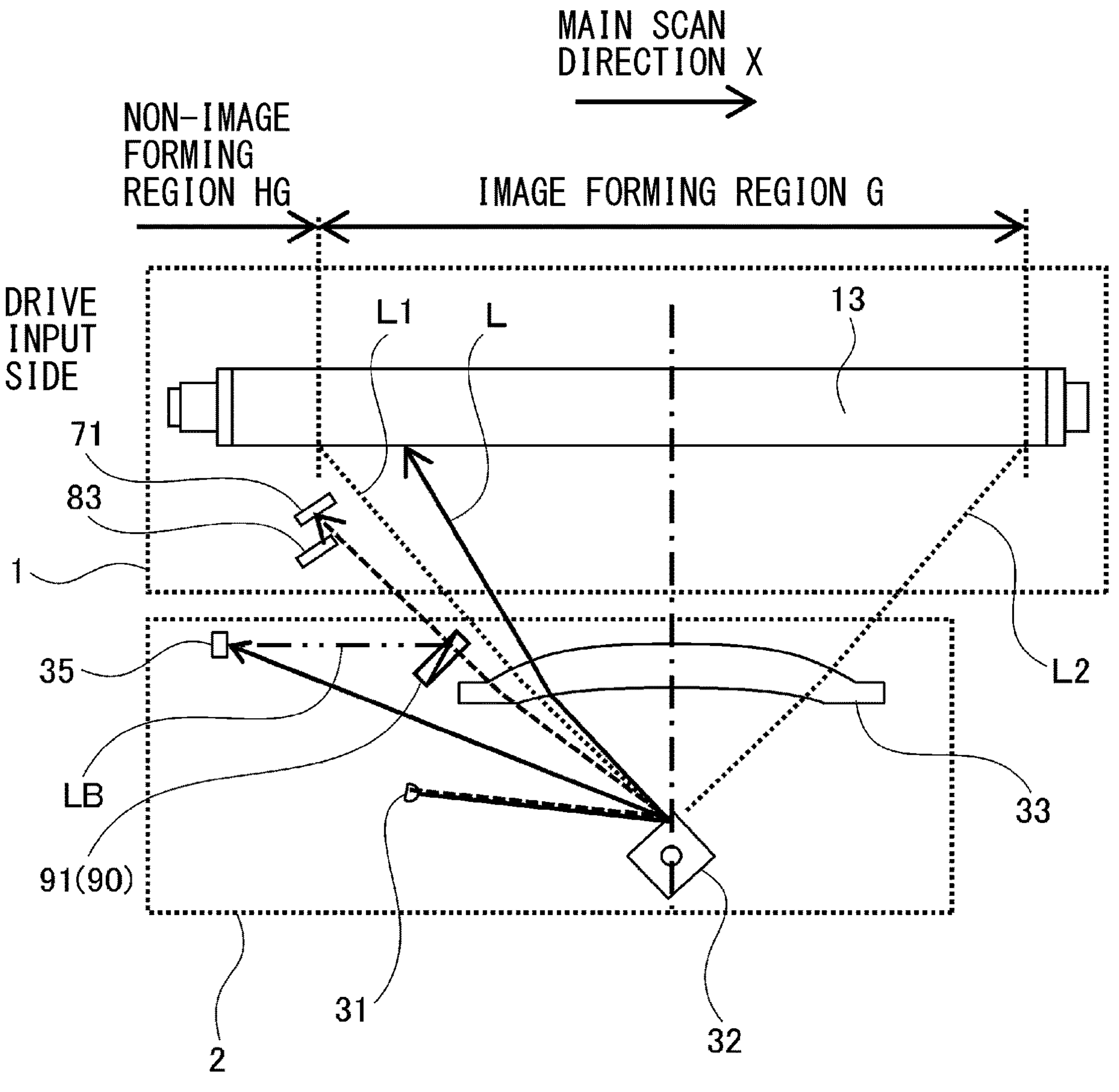

FIG. 44 is a schematic top view of an exposure unit and a light receiving sensor in another form of the embodiment 11.

Figure 45:
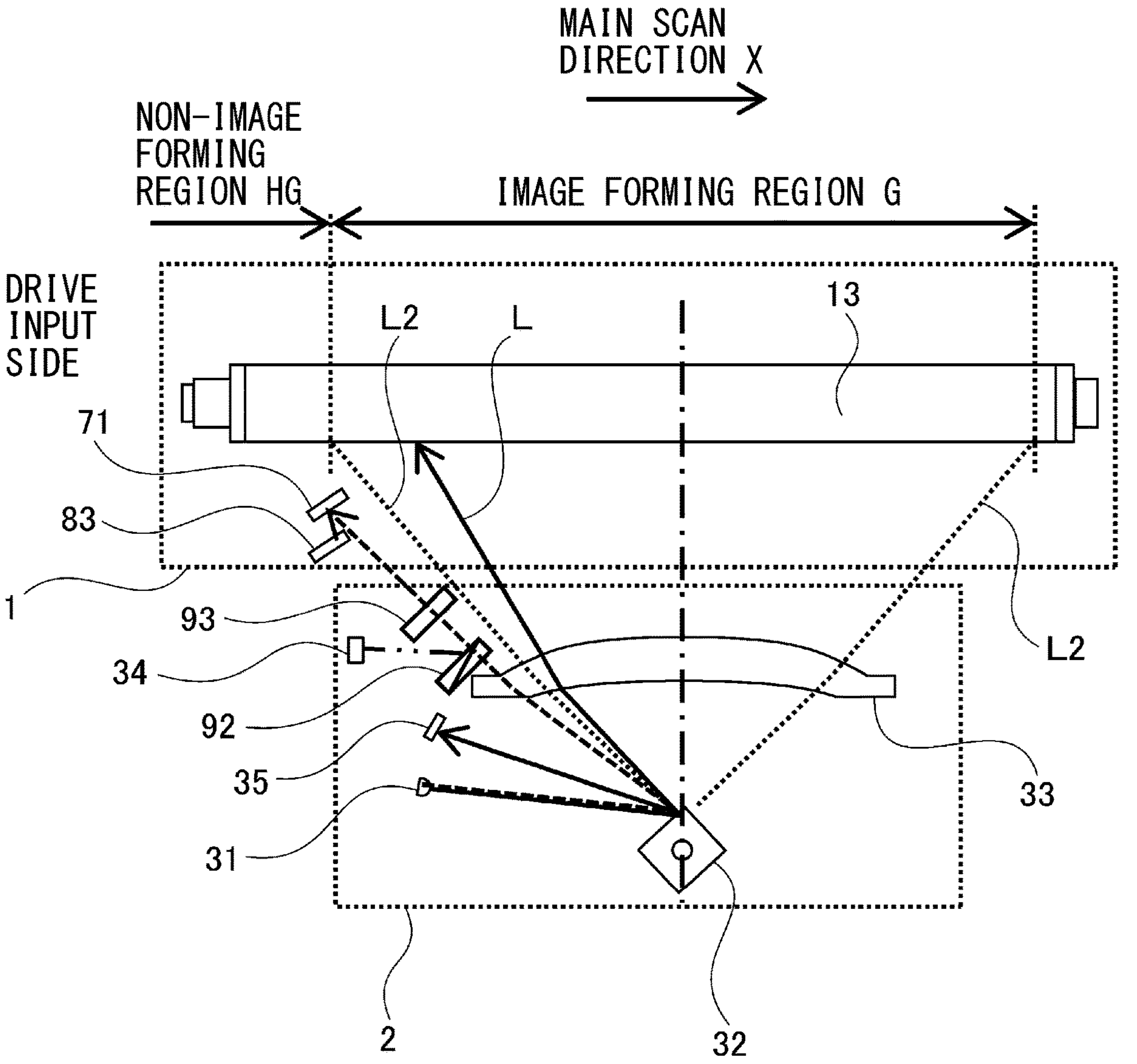

FIG. 45 is a schematic top view of an exposure unit and a light receiving sensor in an embodiment 12.

Figure 46:
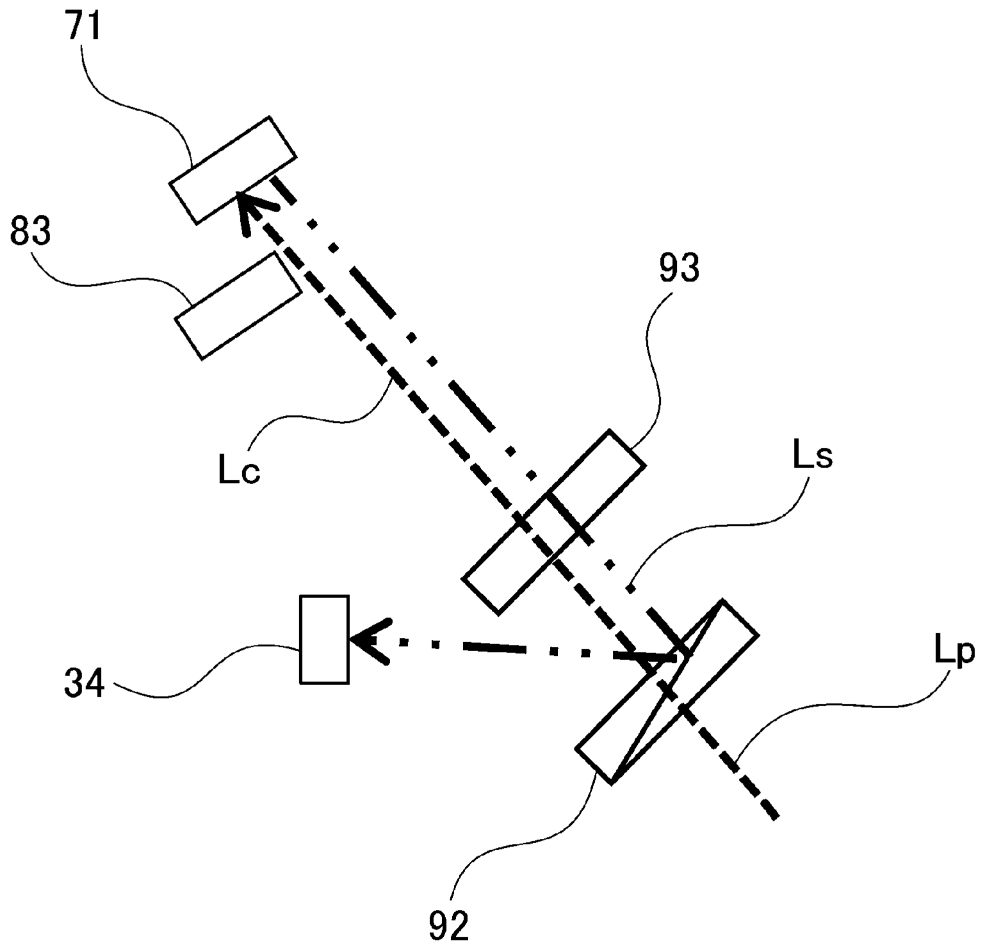

FIG. 46 is a schematic view for illustrating a beam separating means and a principle thereof in the embodiment 12.

Figure 47:
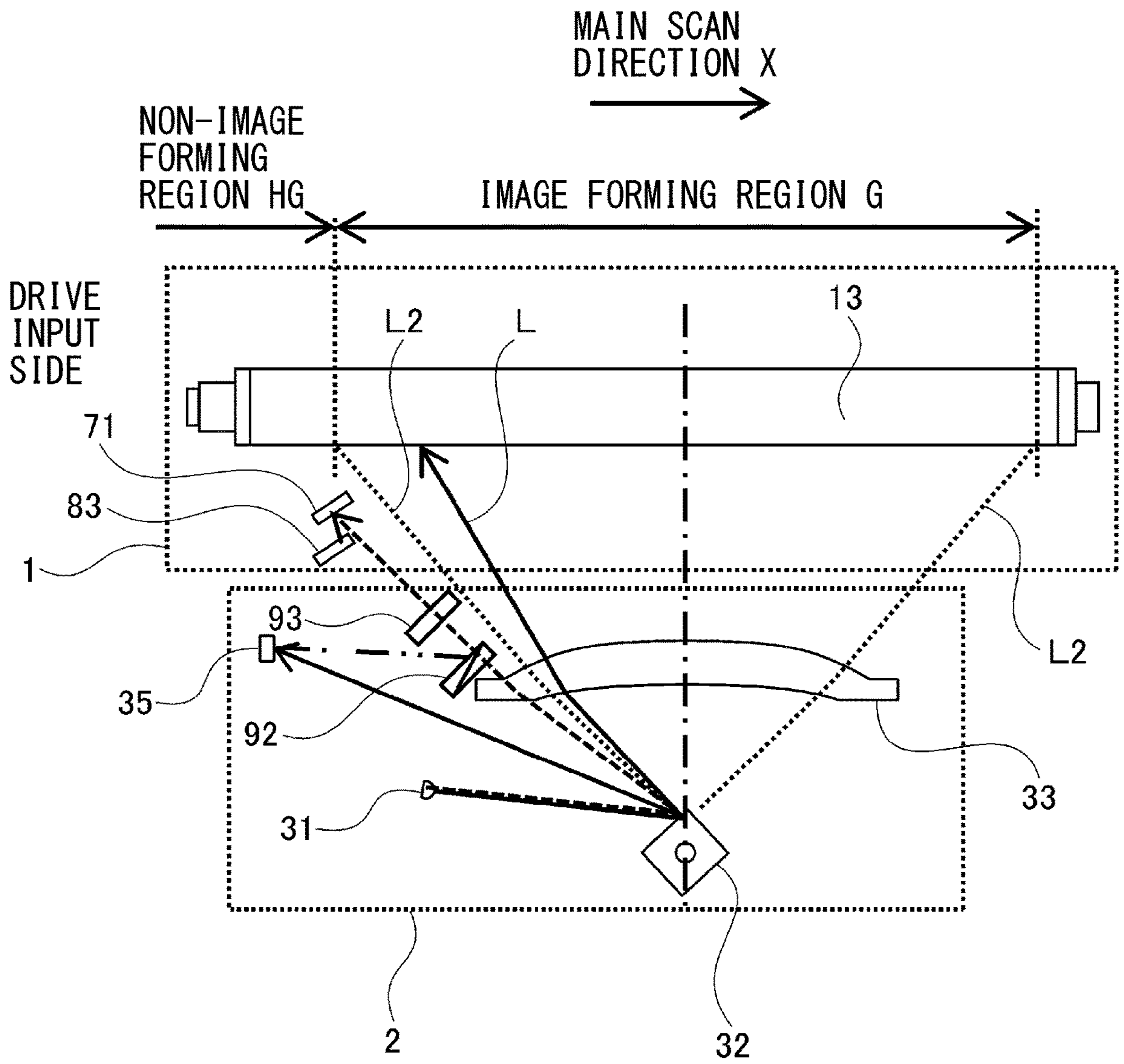

FIG. 47 is a schematic top view of an exposure unit and a light receiving sensor in another form of the embodiment 12.

Figure 48:
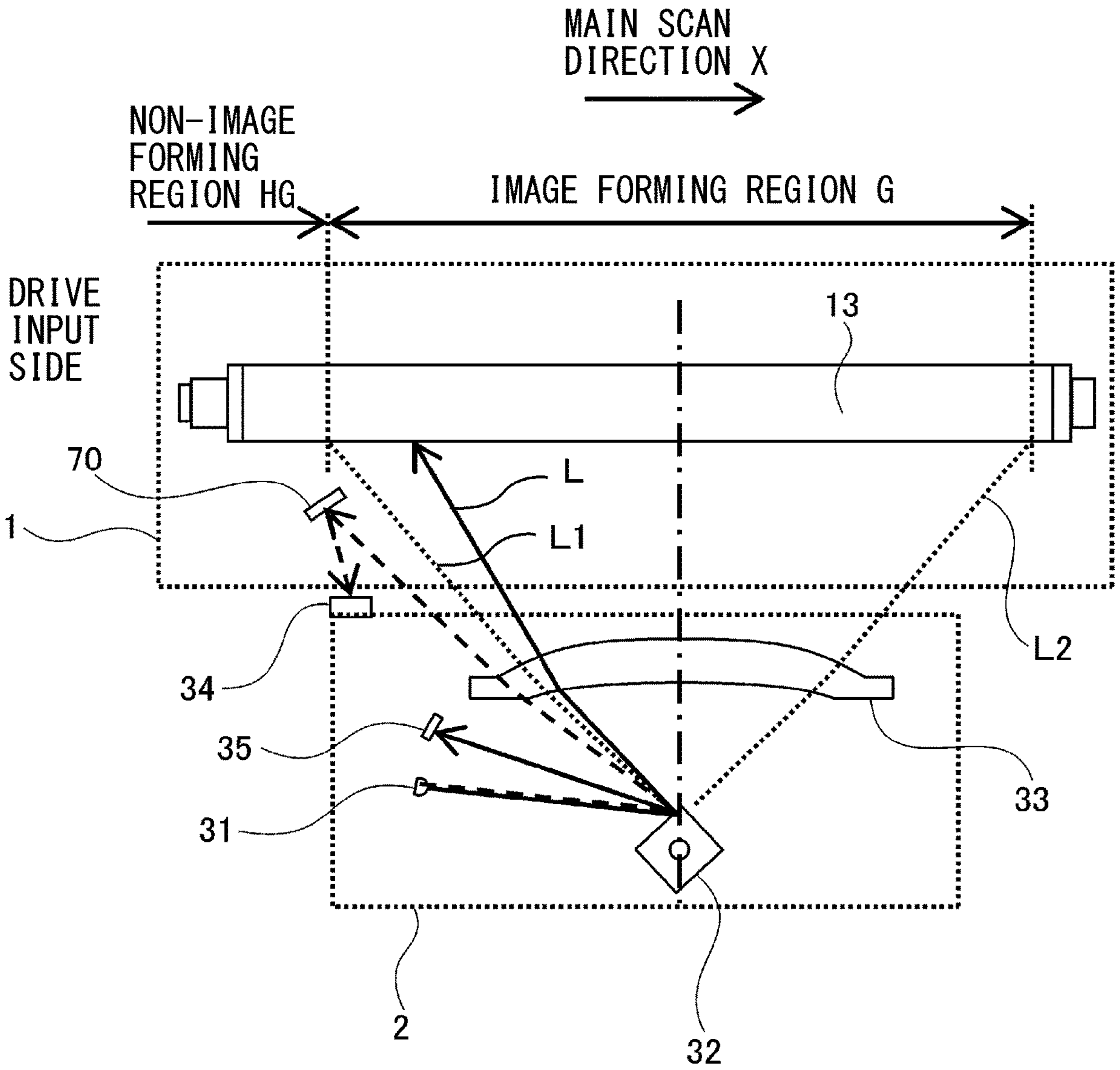

FIG. 48 is a schematic top view of an exposure unit and a light receiving sensor in an embodiment 13.

Figure 49:
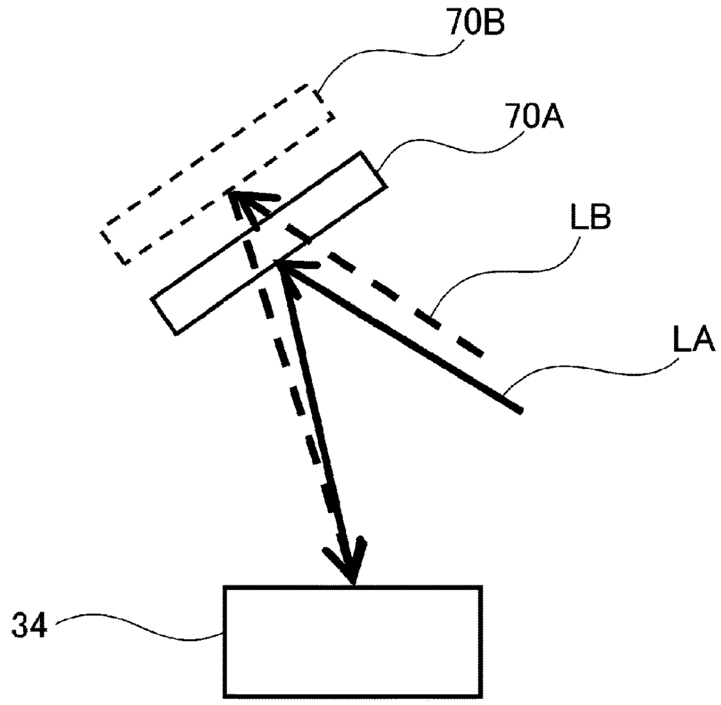
Figure 49:
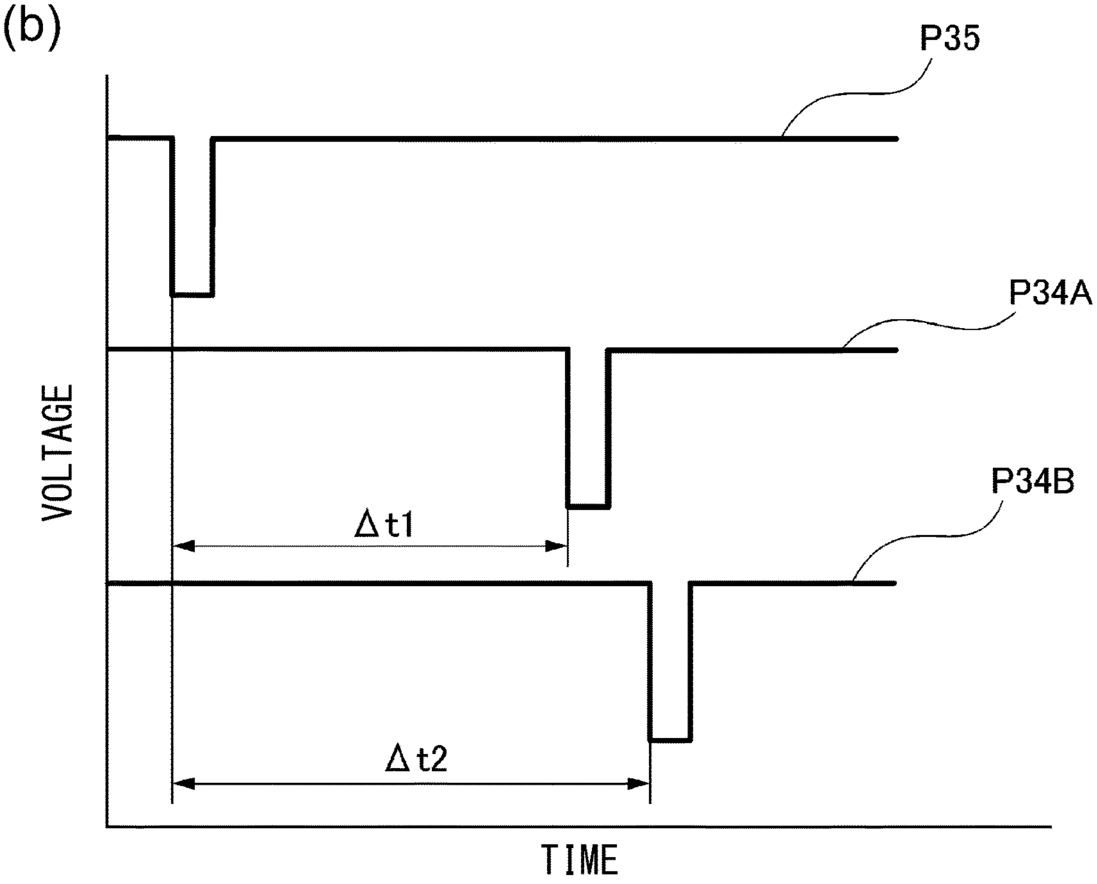

Parts (a) and (b) of FIG. 49 are schematic views for illustrating a method of detecting vibration in the embodiment 3.

Figure 50:
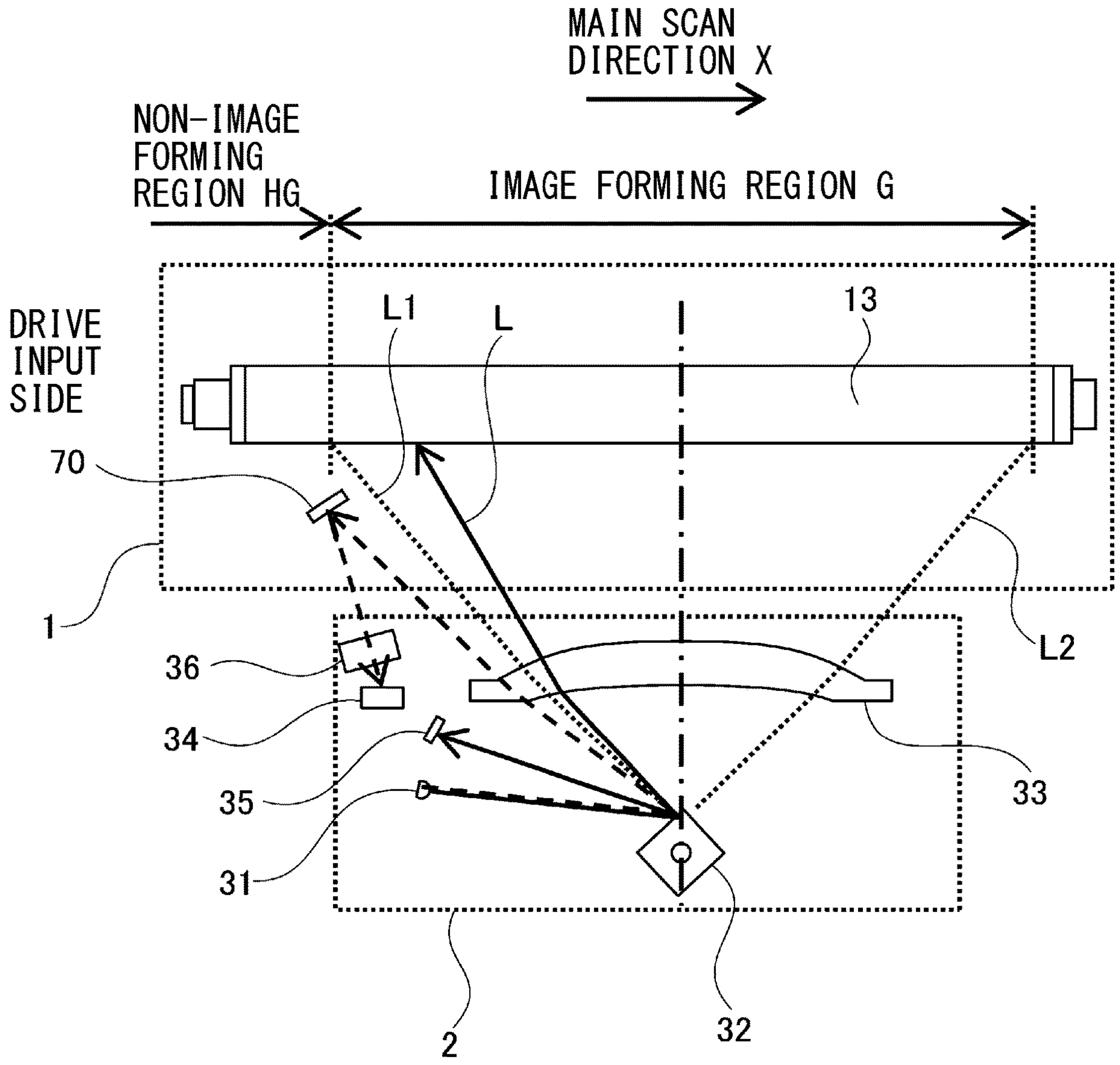

FIG. 50 is a schematic top view of an exposure unit and a light receiving sensor in an embodiment 14.

Figure 51:
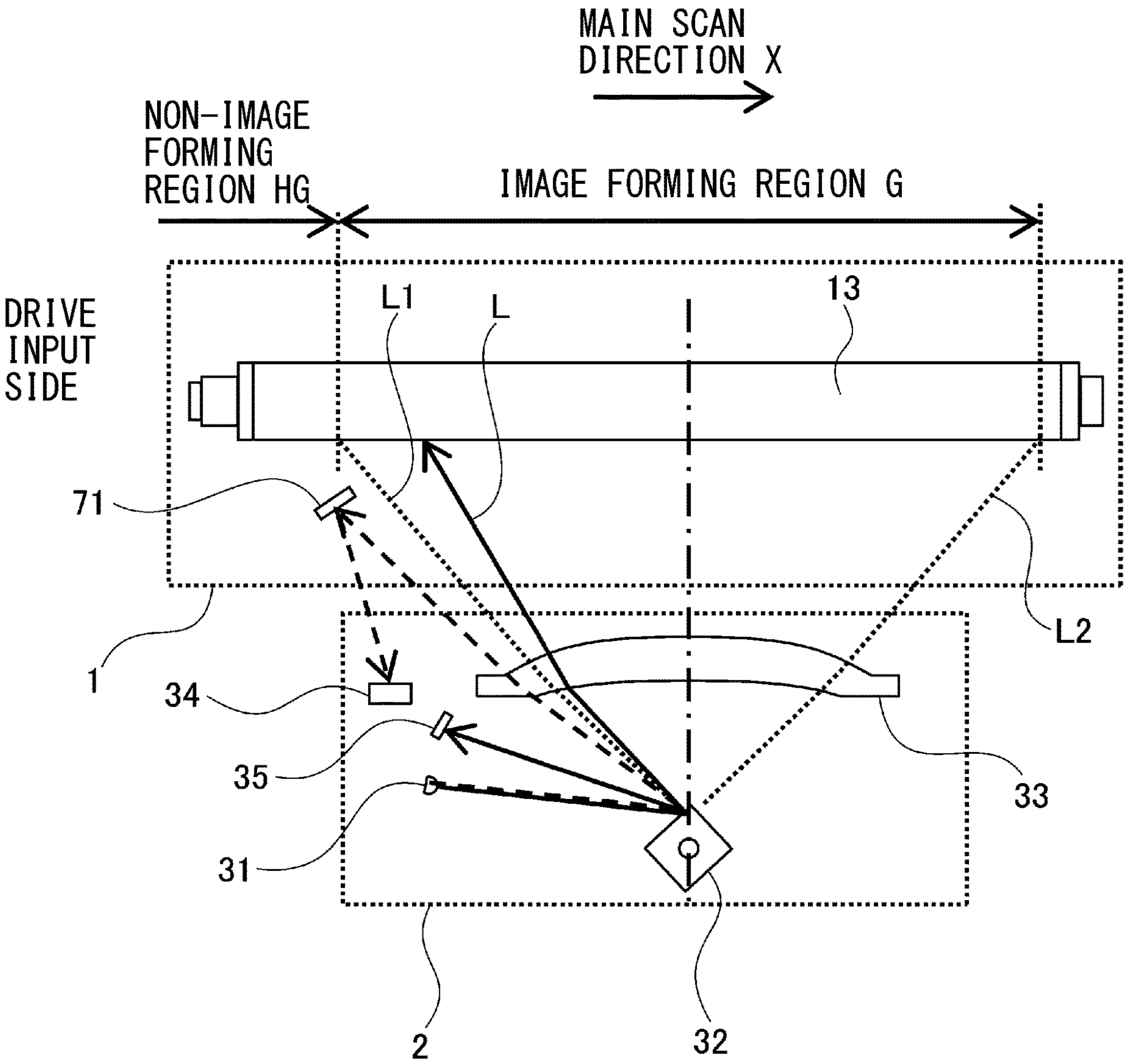

FIG. 51 is a schematic top view of an exposure unit and a light receiving portion in an embodiment 15.

Figure 52:
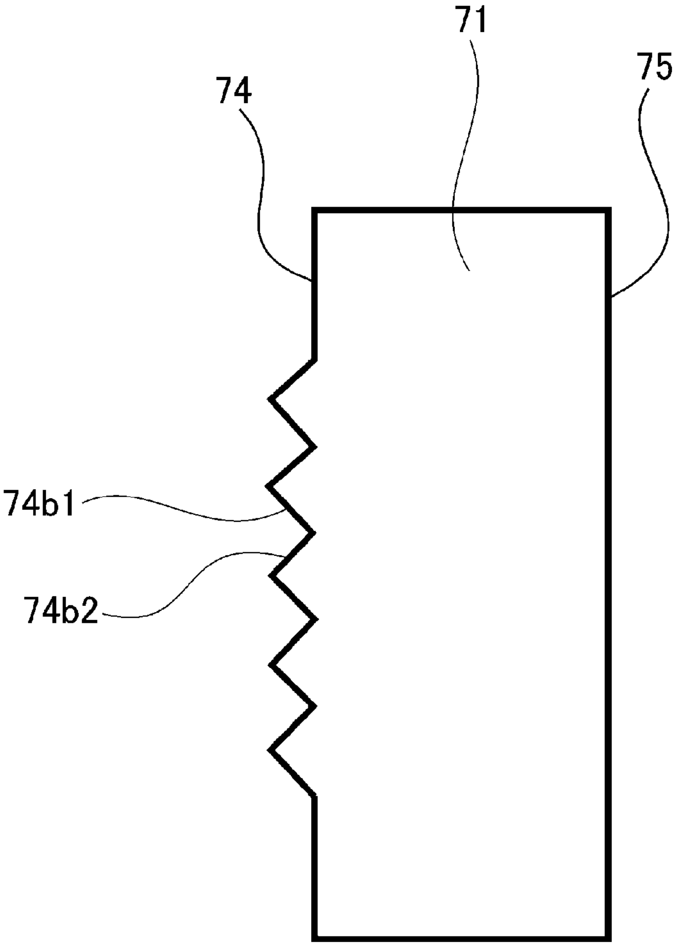

FIG. 52 is a schematic view of a reflection member in the embodiment 15.

Figure 53:
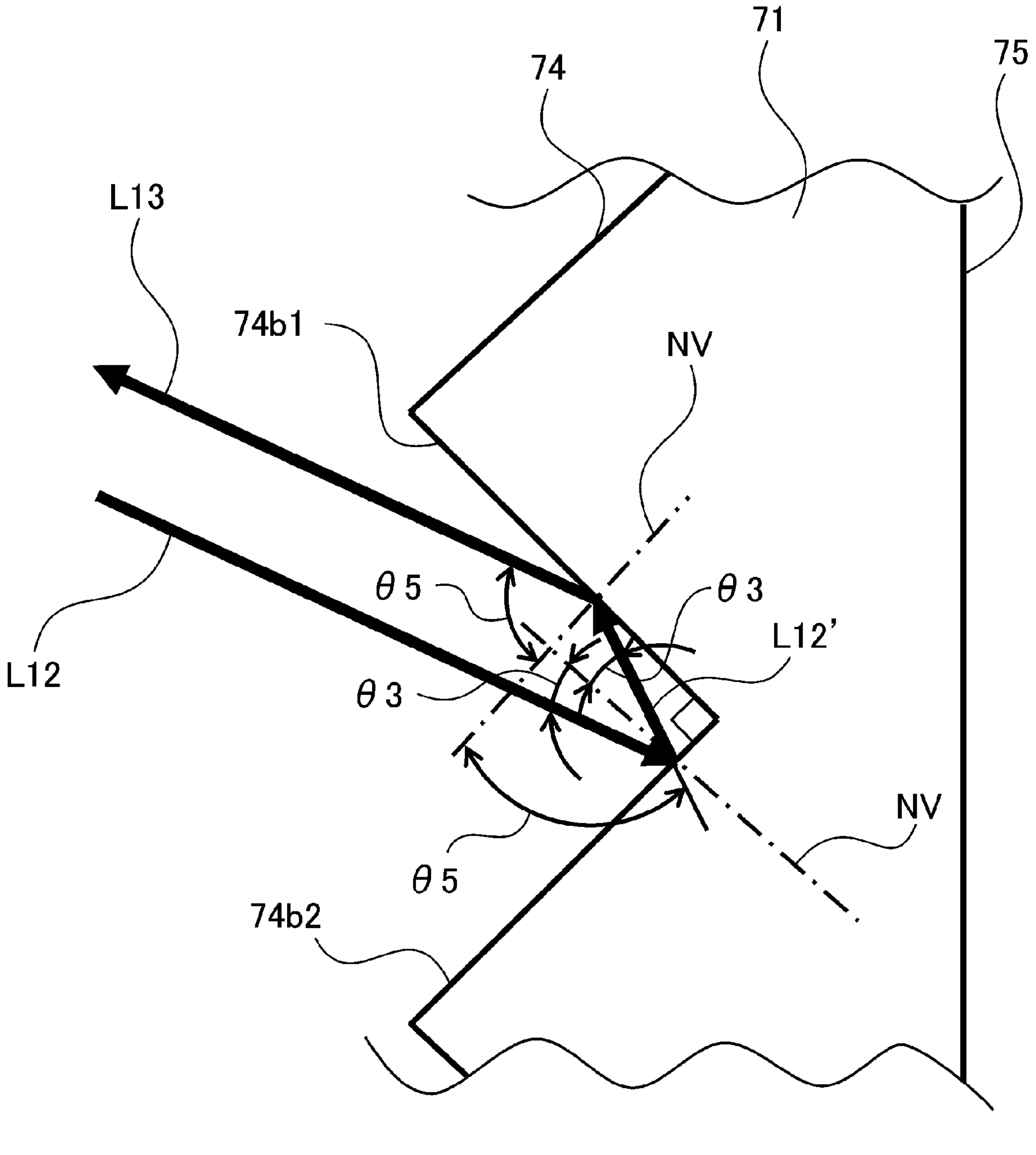

FIG. 53 is a schematic view of a reflection optical path of the reflection member in the embodiment 15.

Figure 54:
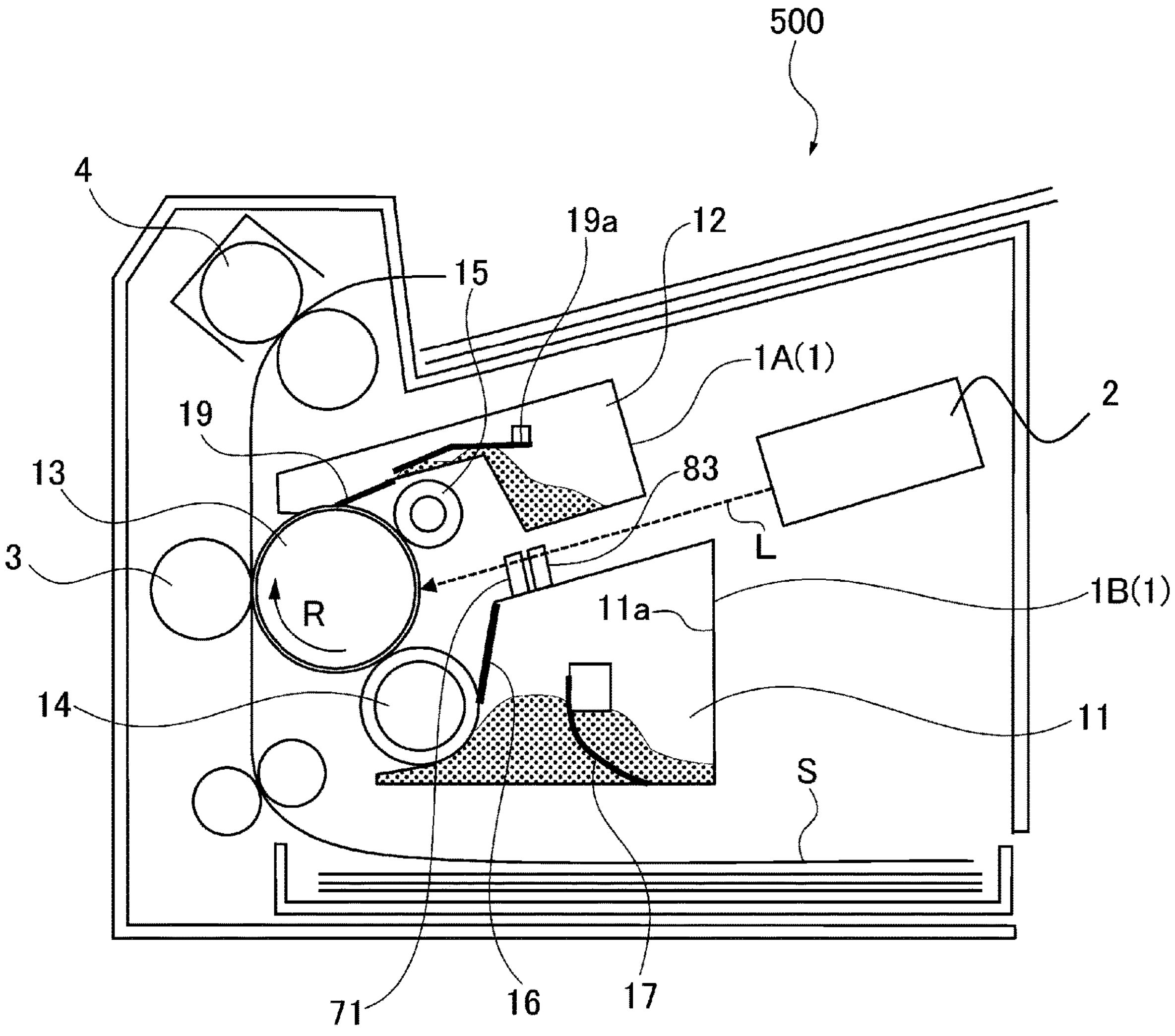

FIG. 54 is a schematic view of an image forming apparatus according to an embodiment 17.

Figure 55:
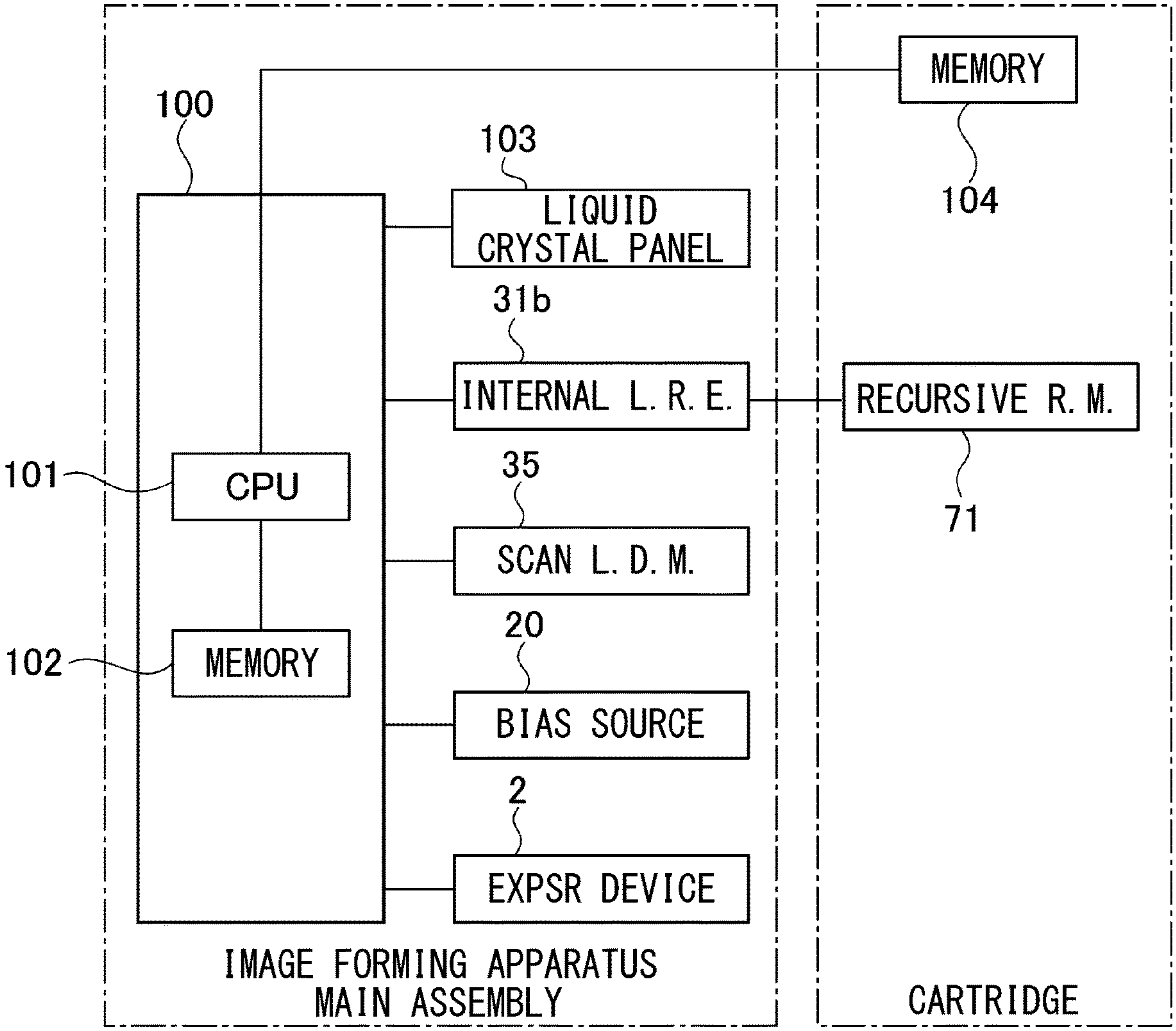

FIG. 55 is a block diagram showing a part of an electric circuit of the image forming apparatus according to the embodiment 17.

Figure 56:
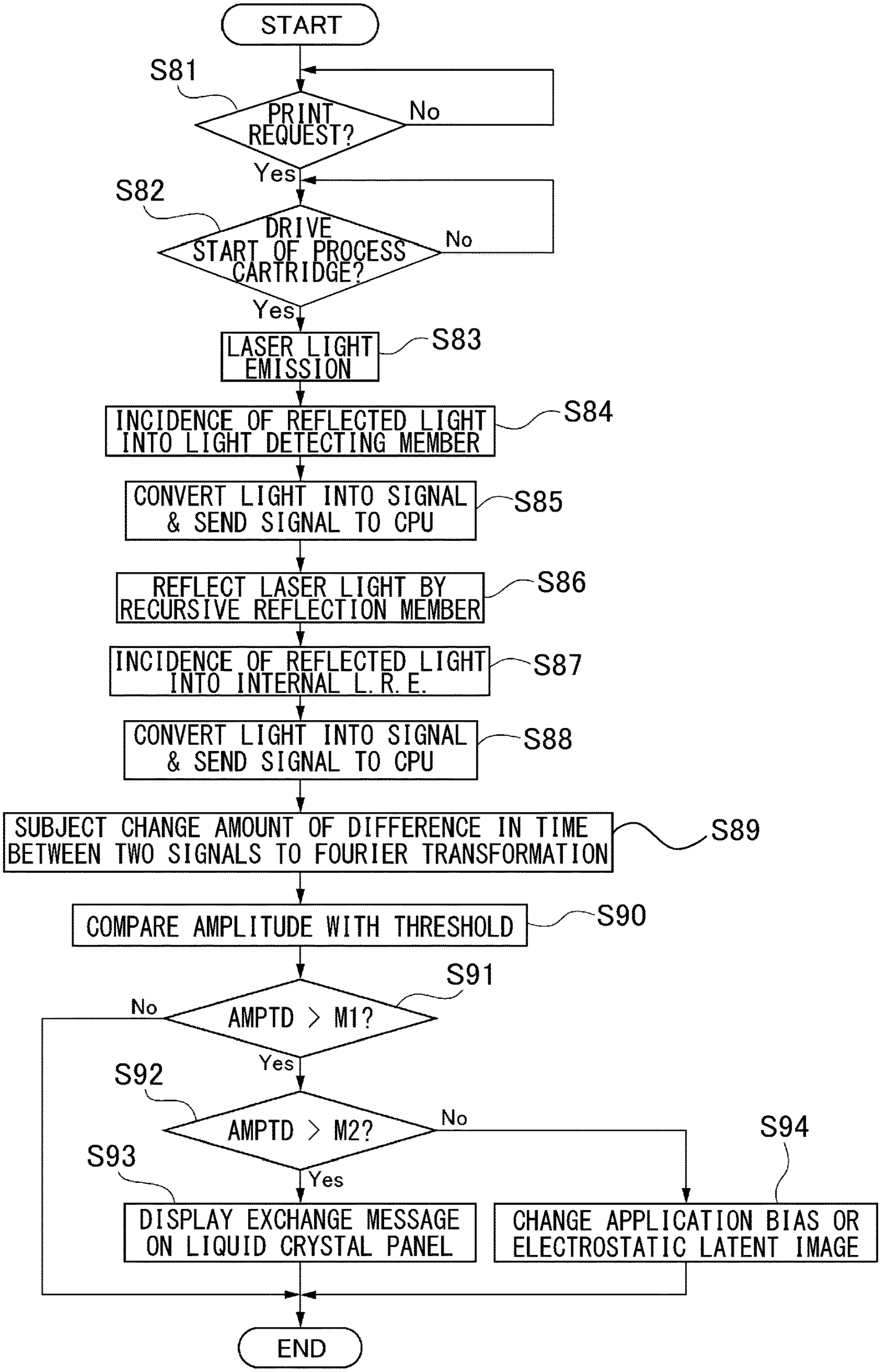

FIG. 56 is a flowchart relating to a detection process of abnormal vibration in the embodiment 17.

DESCRIPTION OF THE DRAWINGS

In the following, embodiments of the present invention will be specifically described with reference to the drawings.

However, as regards dimensions, materials, shapes, relative arrangement of these factors, and the like of constituent elements described in the following embodiments, the scope of the present invention is not intended to be limited thereto unless otherwise specified.

Figure 1:
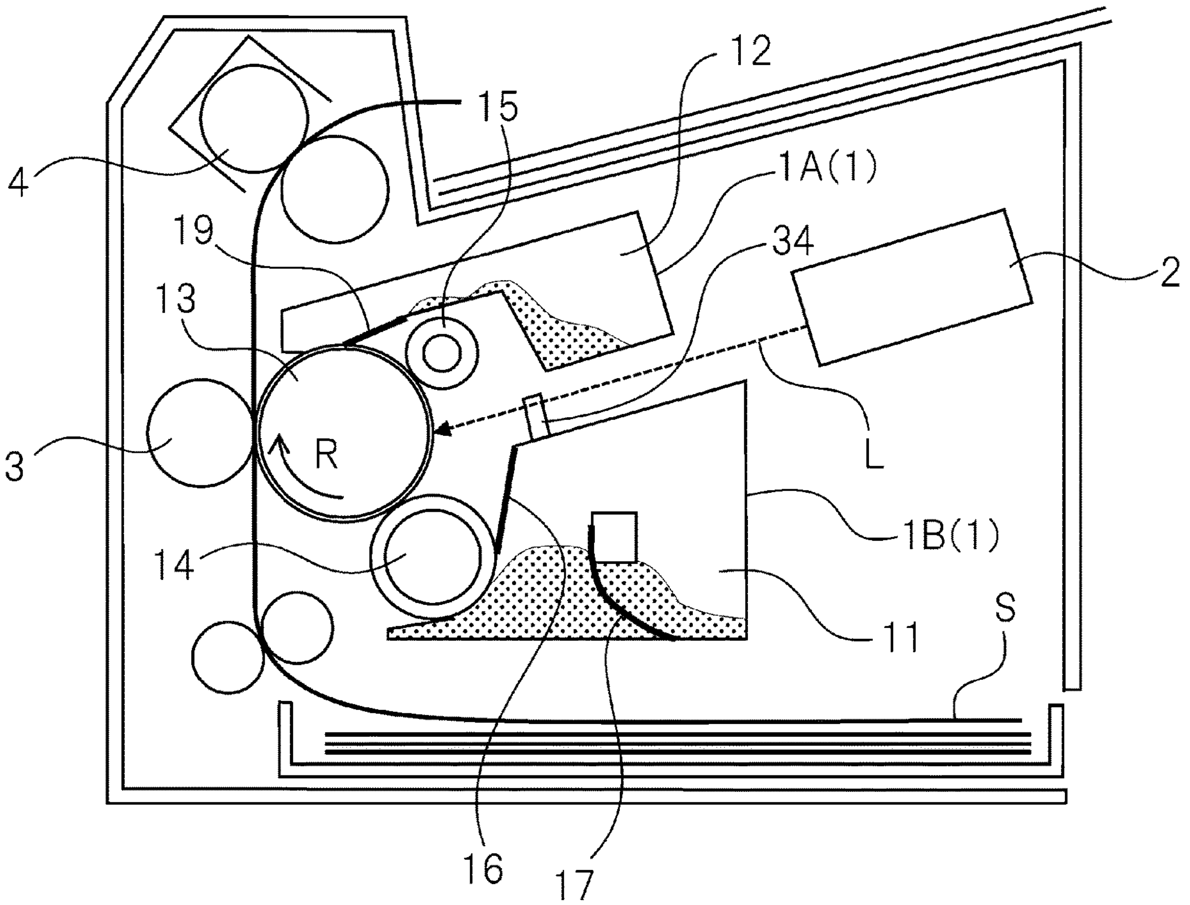
FIG. 1 is a schematic view of an image forming apparatus according to an embodiment 1.

A general structure of an image forming apparatus according to an embodiment 1 of the present invention will be described together with an image forming operation. FIG. 1 is a schematic view of the image forming apparatus according to the embodiment 1.

<Image Forming Apparatus>

When the image forming apparatus inputs an image formation start signal, a photosensitive drum 13 as an image bearing member is rotationally rotated in an arrow direction of FIG. 1.

A charging roller 15 as a charging member is supplied with a negative voltage at a predetermined timing and electrically charges a surface of the photosensitive drum 13 uniformly. An exposure unit 2 as an exposure means irradiates the charged photosensitive drum 13 with laser light L depending on image data (exposure to light), and thus forms an electrostatic latent image on the surface of the photosensitive drum 13.

A developing device as a developing means develops the electrostatic latent image, formed on the photosensitive drum 13, with toner as a developer. The developing device is provided opposed to the photosensitive drum 13 and is constituted by a developing roller 14 as a developer carrying member for supplying the toner to the photosensitive drum 13 and a toner accommodating portion 11 for accommodating the toner supplied to the photosensitive drum 13. In addition, the developing device is constituted by a toner feeding member 17 for conveying and supplying the toner from the toner accommodating portion 11 to the developing roller 14 and by a developing blade 16 for regulating the toner, supplied to the developing roller 14, into a thin layer so as to impart electric charges to the toner.

A developer image (toner image) formed on the photosensitive drum 13 is sent to a nip between the photosensitive drum 13 and a transfer roller 3, and is transferred onto a recording medium S fed to the nip by being timed to the toner image.

Then, the recording medium S on which the toner image is transferred is sent to a fixing device 4 and is heated and pressed by the fixing device 4, so that the transferred toner image is fixed on the recording medium S.

On the other hand, toner remaining on the surface of the photosensitive drum 13 without being transferred onto the recording medium S is removed by a cleaning blade 19 as a cleaning member for cleaning the photosensitive drum 13 in contact with the photosensitive drum 13, and is accommodated in a residual toner accommodating portion 12. Thereafter, the surface of the photosensitive drum 13 is changed again by the charging roller 15, and the above-described steps are repeated.

In this embodiment, the photosensitive drum 13, the charging roller 15, the cleaning blade 19, and the residual toner accommodating portion 12 are integrally assembled into a voltage as a drum cartridge 1A which is a first frame unit. Further, the developing roller 14, the toner accommodating portion 11, the toner feeding member 17, and the developing blade 16 are integrally assembled into a unit as a developing cartridge 1B which is a second frame unit. In this embodiment, the developing cartridge 1B which is the second frame unit is the developing device (developing means) for developing the electrostatic latent image, formed on the surface of the photosensitive drum 13, with the toner as the developer. Further, the drum cartridge 1A and the developing cartridge 1B are integrally assembled into a unit as a process cartridge 1. That is, the photosensitive drum 13, the charging roller 15, the cleaning blade 19, the residual toner accommodating portion 19, the developing roller 14, the toner accommodating portion 11, the toner feeding member 17, and the developing blade 16 are integrally assembled into the unit as the process cartridge 1. The resultant process cartridge 1 is mountable in and dismountable from the image forming apparatus.

<Exposure Unit>

Figure 2:
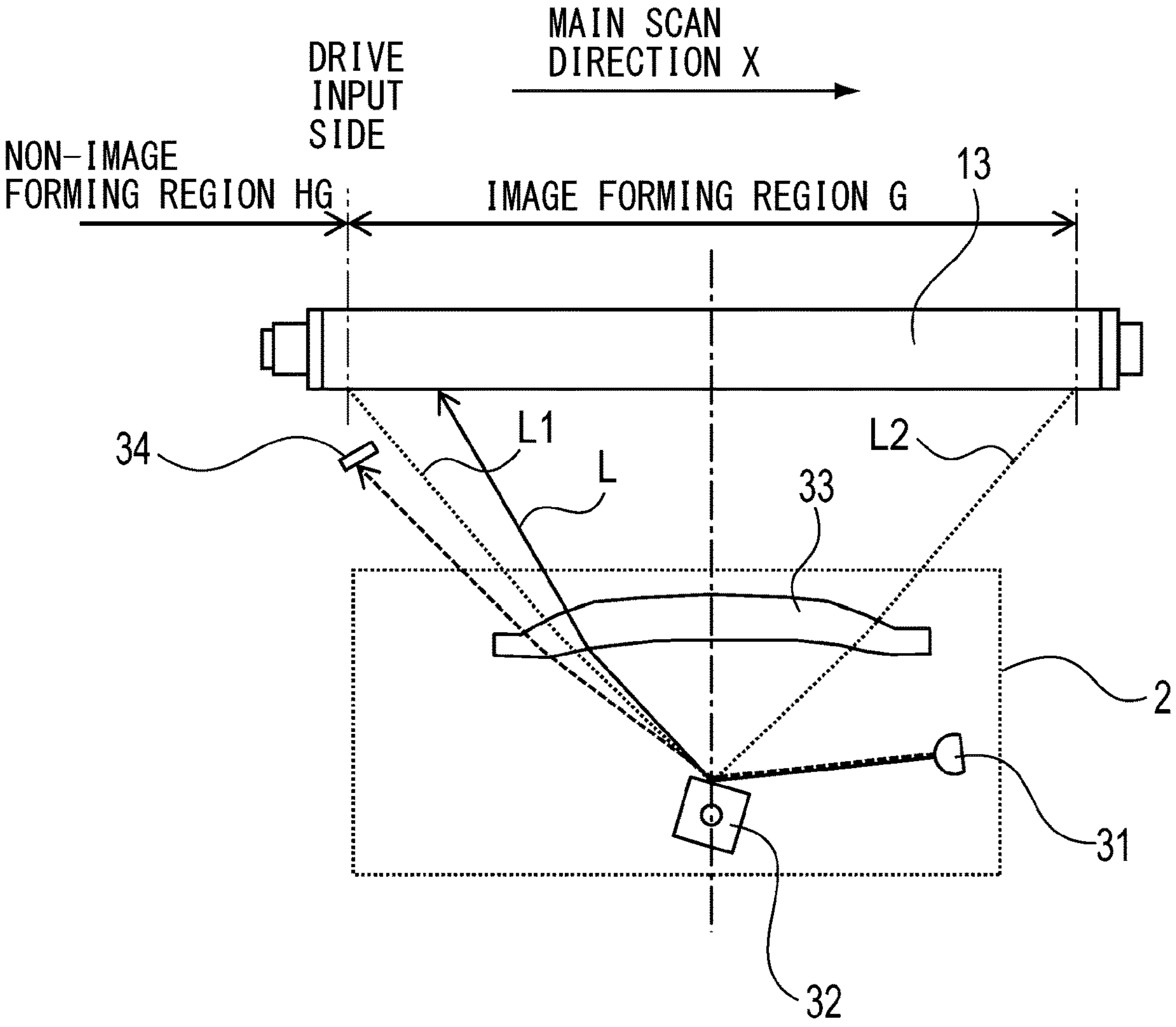
FIG. 2 is a schematic top (plan) view of an exposure unit and a light receiving sensor in the embodiment 1.

The exposure unit 2 in this embodiment is a laser beam scanner device. As shown in FIG. 2, in the exposure unit 2, a semiconductor laser 31 which is a light source emits laser light L depending on an image signal corresponding to an input signal, and the laser light L is reflected by a polygon mirror rotating at high speed, so that the photosensitive drum 13 is irradiated with the laser light L through an imaging lens 33. At this time, by rotation of the polygon mirror 32, the photosensitive drum 13 is scanned with the laser light L in an arrow X direction (main scan direction X) which is one direction, whereby the electrostatic latent image is formed on the surface of the photosensitive drum 13 and a predetermined light-portion potential is formed.

Here, with respect to a scan direction of the laser light by the exposure unit 2, a region in which the toner image which is the developer image is formed on the photosensitive drum 13 is an image forming region G, and a region outside the image forming region G is a non-image forming region HG. That is, the exposure unit 2 is capable of scanning and irradiating the photosensitive drum surface with the laser light not only in the image forming region in which the toner image is formed on the photosensitive drum 13 but also in the non-image forming region HG outside the image forming region G. The image forming region G is a region within a range from laser light L1 to laser light L2. On the other hand, the non-image forming region HG is a region outside the range from the laser light L1 to the laser light L2.

<Light Receiving Sensor>

As shown in FIGS. 1 and 2, the process cartridge 1 includes a light receiving sensor 34 which is a light receiving portion for receiving the light emitted from the exposure unit 2. The light receiving sensor 34 which is the light receiving portion is provided integrally with a frame of the process cartridge 1. Further, the light receiving sensor 34 is provided in the non-image forming portion HG with respect to the scan direction (main scan direction X) of the laser light L from the exposure unit 2 toward the photosensitive drum 13. Accordingly, the laser light L emitted from the exposure unit 2 toward the non-image forming region HG is incident on the light receiving sensor 34 provided on the frame of the process cartridge 1.

The light receiving sensor 34 in this embodiment may preferably be one capable of detecting the laser light by converting a laser light quantity into an electric signal, and is a photodiode, for example. Further, the light receiving sensor 34 in this embodiment includes a light receiving surface of φ1.0 (mm) in size, and thus is preferred for the purpose of realizing downsizing and cost reduction of the image forming apparatus or the process cartridge. Then, the received laser light L is converted into the electric signal and is sent to a controller 100 shown in FIG. 3.

<Controller>

Figure 3:
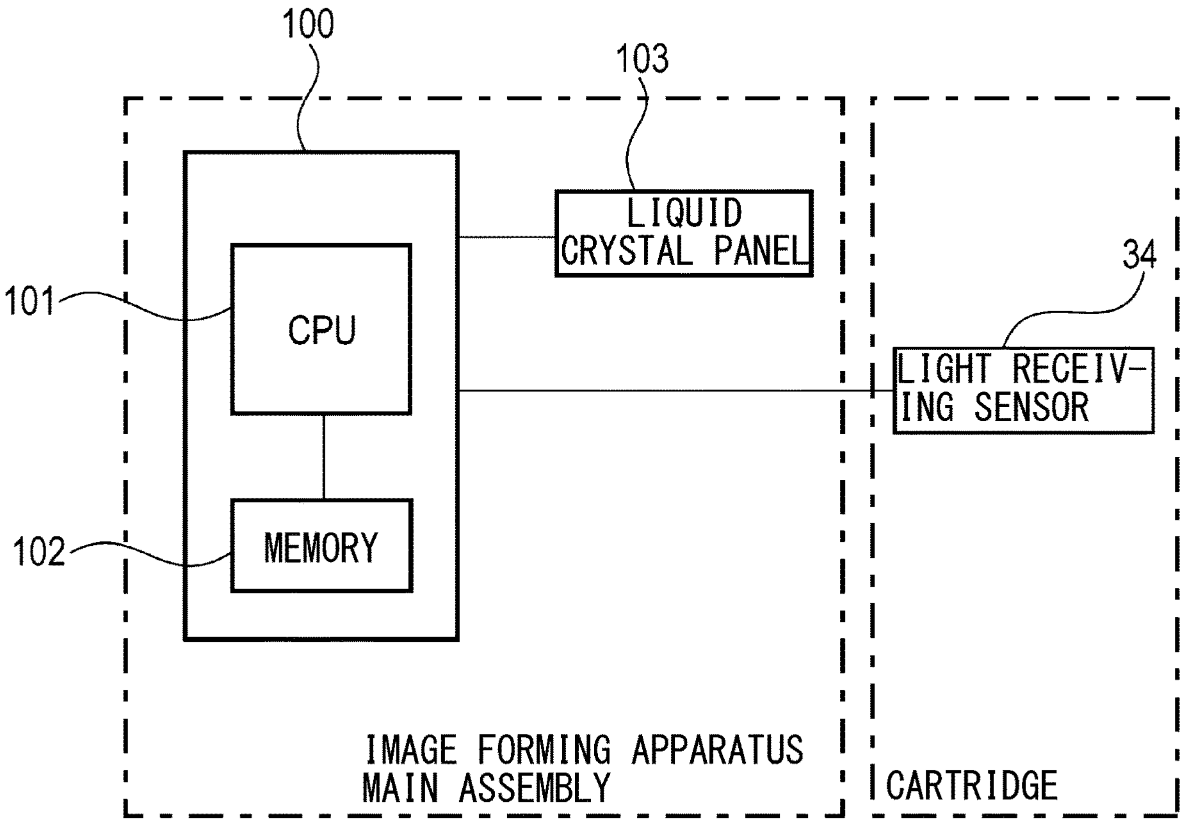
FIG. 3 is a block diagram showing a part of an electric circuit of the image forming apparatus according to the embodiment 1.

As shown in FIG. 3, in an apparatus main assembly of the image forming apparatus, the controller 100 is provided. The controller 100 extracts, as vibration data (vibration amplitude) of the process cartridge 1, a p-p (peak-to-peak) average of an output voltage from a light reception value of the light received by the light receiving sensor 34. Then, an accommodation amount of the developer in the process cartridge 1 is detected from the vibration data. In the controller 100, a CPU 101 as a detecting means (control means) and a memory 102 as a storing means are provided. Further, to the controller 100, the light receiving sensor 34 as the light receiving portion and a liquid crystal panel 103 as a display means are connected. Further, the memory 102 as the storing means may also be provided in the process cartridge 1.

In the memory 102, as reference data for detecting an accommodation amount of the developer in the developer accommodating portion depending on the vibration of the cartridge, the vibration data (p-p average (v) of output voltage) and toner amounts (%) for each vibration data are stored in advance. Further, the vibration of the cartridge is detected by the CPU 101 and the developer accommodation amount is detected from the detected vibration of the cartridge, with the result that the detected developer accommodation amount is displayed on the liquid crystal panel 103. Further, on the liquid crystal panel 103, a message prompting a user (operator) to exchange the cartridge when discrimination that the exchange from the cartridge is needed (for example, in the case where the developer to be supplied is insufficient or used up or in the case where the collected developer is in a full-state, or the like case) is made is displayed.

<Vibration Detection and Accommodation Amount Detecting Process>

Figure 4:
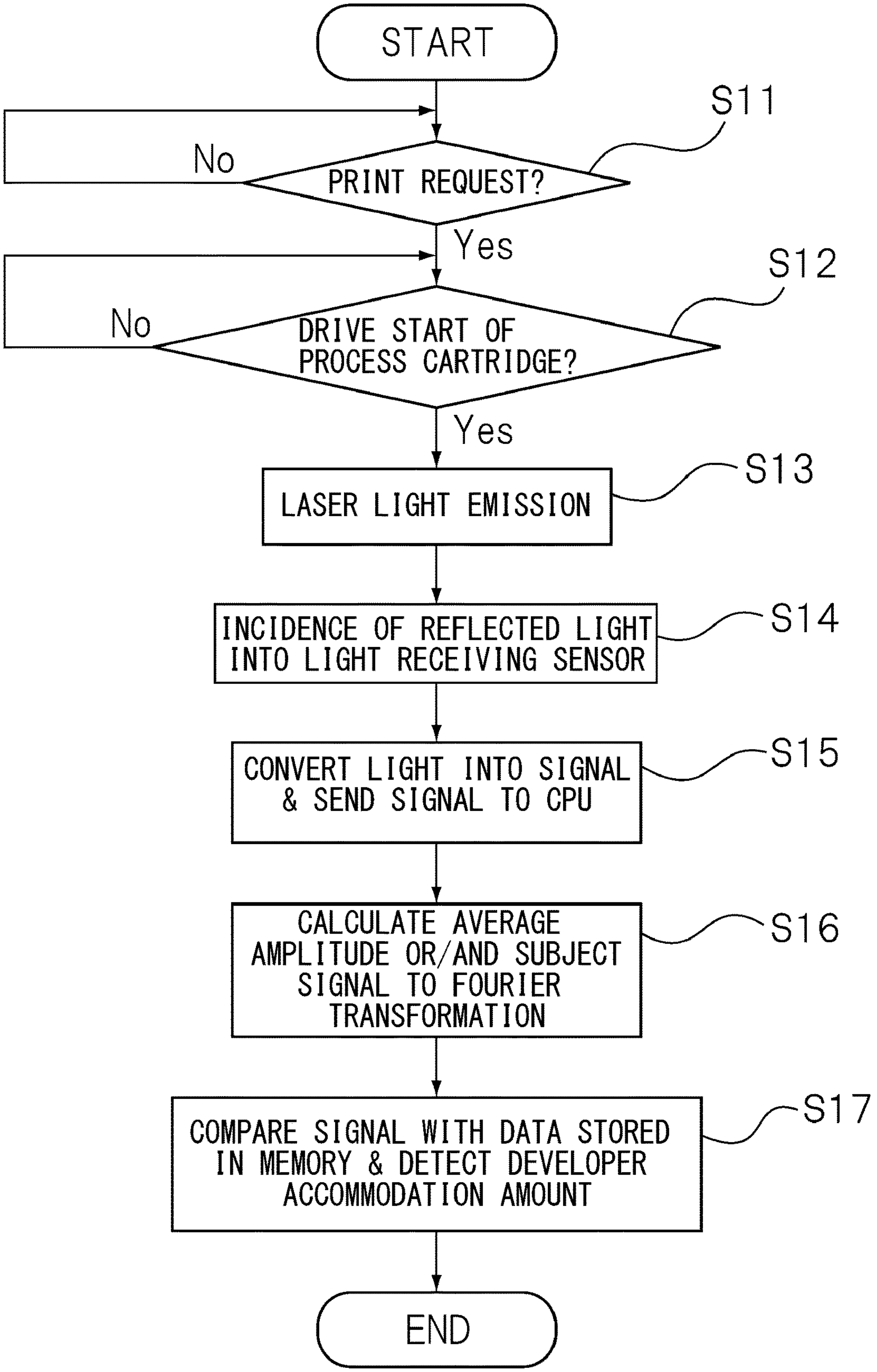
FIG. 4 is a flowchart relating to a detection process of a toner accommodation amount in the embodiment 1.

Next, using FIG. 4, a flow of detecting the developer accommodation amount in the cartridge by comparing the vibration data based on the light reception value of the light received by the light receiving sensor with the toner amount (%) for each of the vibration data stored in the memory will be described. That is, the vibration of the cartridge is detected from the light reception value of the light received by the light receiving sensor and then the developer accommodation amount in the cartridge is detected from the vibration of the cartridge. Such a flow will be described. FIG. 4 is a flowchart showing the flow of the contact vibration detection and the toner accommodation amount detection.

Incidentally, in this embodiment, as the developer accommodating portion, the toner accommodating portion 11 in the process cartridge is described as an example. That is, a constitution in which the light receiving sensor 34 is provided on the toner accommodating portion 11 which is a first developer accommodating portion for accommodating the toner to be supplied to the photosensitive drum 13 and in which the developer accommodation amount in the toner accommodating portion 11 is detected is described as an example, but the developer accommodating portion is not limited to the toner accommodating portion 11. As the developer accommodating portion, the residual toner accommodating portion 12 in the process cartridge may also be used. That is, a constitution in which the light receiving sensor 34 is provided on the residual toner accommodating portion 12 which is a second developer accommodating portion for accommodating residual toner collected from the photosensitive drum 13 and in which the developer accommodation amount in the residual toner accommodating portion 12 is detected may also be employed.

First, the controller 100 discriminates whether or not a print request (print job) in the image forming apparatus is made (S11). In the case where the controller discriminated that the print request is made (Yes of S11), the process is caused to go to a step S12. On the other hand, in the case where the controller discriminated that the print request is not made (No of S11), the process is caused to stand by in the step S11 until the print request is made. Incidentally, the vibration detection and accommodation amount detection process may also be executed every time when an image forming process in the image forming apparatus main assembly is executed predetermined numbers of times set in advance. Further, the vibration detection and accommodation amount detection process may be executed every lapse of a predetermined period set in advance during execution of continuous printing of images on a plurality of sheets (recording mediums).

Next, the controller starts drive of the process cartridge 1 (S12), and then the semiconductor laser 31 of the exposure unit 2 emits the laser light (S13), and thus the image forming operation is started. Simultaneously therewith, the laser light L is emitted from the exposure unit 2, the photosensitive drum 3 is scanned with the laser light L in the main scan direction (arrow X direction in FIG. 2). At this time, the laser light L is incident on the light receiving sensor 34 (see FIG. 1) provided on the frame (or a member connected to the frame) of the toner accommodating portion 11 of the process cartridge 1 at a timing when an optical path is formed in the non-image forming region HG with respect to the main scan direction (S14).

Subsequently, the laser light L incident on the light receiving sensor 34 is converted into an electric signal by the light receiving sensor 34, and then the electric signal is sent to the controller 100 (S15).

Then, the CPU 101 in the controller 100 receives the electric signal and then extracts, as vibration data (vibration amplitude) of the process cartridge 1, a p-p average of an output voltage from the provided electric signal (S16). Or, the received electric signal is subjected to Fourier transformation and thus is converted into vibration data. Here, the vibration data refers to vibration data of the cartridge based on a detection signal (light reception value) of the light received by the light receiving sensor, and is the p-p average of the output voltage which is extracted from the above-described electric signal and which corresponds to the developer accommodation amount in the cartridge.

Next, the CPU 101 compares the value data (p-p average of output voltage) extracted from the light reception value of the light received by the light receiving sensor 34 with the vibration data stored in the memory 102, and thus detects the developer accommodation amount of the cartridge (S17).

Thus, in this embodiment, a first step (S13) in which the light is emitted from the exposure unit 2 provided in the image forming apparatus and a second step (S14) in which the light emitted from the exposure unit 2 is received by the light receiving sensor 34 provided on the cartridge are performed. Then, the vibration of the cartridge is detected from the light reception value of the light received by the light receiving sensor 34, and the accommodation amount of the toner accommodated in the toner accommodating portion 11 of the cartridge is detected from the vibration of the cartridge (S17).

In this embodiment, the case where the developer accommodation amount (i.e., toner amount (%)) is detected as a proportion (%) from a state before use of the cartridge is shown (see FIG. 13) as an example, but may be detected by a toner weight.

Incidentally, the developer accommodation amount detected by the above-described process in the controller 100 is stored in the memory 102 of the controller 100. Then, for example, in the case where the developer accommodation amount reaches a change amount set in advance, the controller 100 causes the liquid crystal panel of the image forming apparatus main assembly to display that effect and thus prompts the user to exchange the cartridge for replenishment, disposal, or the like. A method of notification to the user is not limited thereto, but may be displayed on a monitor connected to a personal computer to which the image forming apparatus is connected.

<Detection of Vibration of Developer Accommodating Portion by Laser Light>

Parts (a) to (c) of FIG. 5 are schematic views for illustrating a method of detecting a vibration state of the cartridge in the constitution of the embodiment 1 shown in FIG. 2 and schematically show positions of the laser light L reaching the light receiving sensor 34 in a normal state and the vibration state. Here, the normal state refers to a state indicated by a solid line in which there is no vibration of the cartridge and thus there is no change in light receiving position of the light receiving sensor. Further, the vibration state refers to a state indicated by a broken line in which the cartridge vibrates and thus the light receiving position of the light receiving sensor changes.

As shown in part (a) of FIG. 5, the position of the light receiving sensor 34 in the normal state is a light receiving position C indicated by the solid line. On the other hand, in the vibration state, the light receiving sensor 34 vibrates, whereby the light receiving position of the light receiving sensor 34 changes and thus reciprocates between a light receiving sensor 34' (light receiving position D indicated by the broken line) and a light receiving sensor 34" (light receiving position E indicated by a chain line). As a result, the laser light L incident on the light receiving sensor 34 reciprocates between laser light L' and laser light L". Further, as shown in part (b) of FIG. 5, a light quantity of the laser light L incident on the light receiving sensor 34 changes, and therefore, a signal outputted from the light receiving sensor 34 has a waveform as shown in part (c) of FIG. 5.

In this embodiment, an amplitude of the output voltage changes depending on the toner accommodation amount. For that reason, an average (p-p average of output voltage) of the amplitude in a certain time from the short of the drive of the process cartridge in the image forming apparatus main assembly is calculated as the vibration data (vibration amplitude) of the process cartridge and is compared with the amplitude (vibration data) stored in the memory in advance. Or, the p-p average of the output voltage of the laser light first detected after the process cartridge is mounted in the apparatus main assembly is stored, as the vibration data (vibration amplitude) of the process cartridge, in the memory in advance. Then, during a period in which the process cartridge is used, the p-p average of the output voltage is detected, as the vibration data (vibration amplitude) of the process cartridge, periodically from the light reception value of the laser light, and then is compared with the vibration data stored in the memory, so that the toner accommodation amount is detected.

Further, the waveform as shown in part (c) of FIG. 5 is subjected to the Fourier transformation, whereby signal intensity based on a detection signal by the light receiving sensor 34 is calculated, and is compared with the vibration data stored in the memory in advance, so that the toner accommodation amount is calculated.

Effect of this Embodiment

Here, using a comparison example, an effect of the embodiment 1 will be described.

Comparison Example

First, the comparison example will be described. In the comparison example, a process cartridge is provided with an acceleration sensor by a piezoelectric sensor, and vibration of the process cartridge was detected by the acceleration sensor. That is, in this embodiment (embodiment 1), a non-contact type in which the light emitted from the fixed exposure unit is received by the light receiving sensor provided on the cartridge is employed, but in the comparison example, a contact type in which the vibration is detected by the acceleration sensor provided on the cartridge is employed.

Further, a unit of the vibration measured by the acceleration sensor is $m/s^2$, and therefore, when compared with the embodiment 1, there is a need to convert the vibration into a speed and displacement through integration.

In FIG. 12, a result such that the p-p average of the output voltage (vibration amplitude) detected by an associated sensor when the residual toner amount is 10% is measured three times and are added and averaged in the comparison example is shown together with a result of the embodiment 1. Further, in a table 1 below shows relative standard deviation (variation in vibration measurement) of the vibration amplitudes measured three times. In FIG. 12, the embodiment 1 is represented by a solid line, and the comparison example is represented by a broken line.

TABLE 1

| | Relative standard deviation*[1] |
|---|---|
| EMB. 1 | 2.5% |
| COMP. EX. | 8.2% |

*[1]Relative standard deviation of p-p average of the output voltage when the toner amount is 10%.

From the result shown in FIG. 12, in the case of the acceleration sensor of the contact type as the comparison example, in detection of the vibration (amplitude of the output voltage) of the cartridge in a state in which the toner amount is small, as shown in FIG. 12 by the broken line, there was a tendency that particularly a variation becomes large. Further, as is also apparent from the result shown in the table 1, compared with the comparison example in which the relative standard deviation calculated form the average of the output voltage which is an index of the vibration is large, in the embodiment 1, it become possible to suppress the variation to a low level. The reason therefor is that a weight of the acceleration sensor provided on the cartridge has a large influence on the weight of the cartridge (toner accommodating portion) in which the remaining toner amount became small. Further, the reason also includes that in the non-contact type in the embodiment 1 in which the laser light from the exposure unit is received by the light receiving sensor installed on the cartridge, the vibration of the cartridge (toner accommodating portion) itself can be detected with accuracy while canceling the vibration due to another driving portion of the image forming apparatus. Further, the vibration amplitude acquired by the contact acceleration sensor as in the comparison example is acceleration, and includes a noise component such as vibration which is not due to the cartridge weight and vibration due to another driving portion of the image forming apparatus in some instances. In such a case, there is a liability that the vibration amplitude (acceleration) acquired by the contact acceleration sensor as in the comparison example amplifies the above-described noise component by integration for making comparison with the vibration amplitude acquired from the output voltage of the provided light in the embodiment 1. For that reason, compared with the comparison example using the acceleration sensor, the embodiment 1 using the light receiving sensor can obtain a detection result with high accuracy.

In the detection of the remaining toner amount, particularly in the detection when the toner amount is 0% to about 10%, high accuracy is desired for notifying the user of an exchange timing of the process cartridge. Accordingly, in order to detect the remaining toner amount with high accuracy, compared with the comparison example, the embodiment 1 in which the relative standard deviation is small (i.e., the variation is small) is preferred.

That is, in this embodiment, the vibration of the developer accommodating portion is detected by the light emitted from the exposure unit provided in the image forming apparatus. By this, in this embodiment, the vibration of the image forming apparatus main assembly capable of causing the noise component in the vibration detection of the developer accommodating portion as in the comparison example (using the contact acceleration sensor) can be canceled. Further, the light source of the light (laser light) is disposed so as to avoid the influence of the vibration in the exposure unit to the extent possible, and the exposure unit itself has a vibration-damping structure, and therefore the vibration of the developer accommodating portion can be detected accurately.

As described above, in this embodiment, on an image formation principle, the laser light emitted from the exposure unit disposed so as to minimize the influence of the vibration of the image forming apparatus main assembly is utilized. Further, during image forming drive, the laser light is received by the light receiving sensor provided on the process cartridge which is the developer accommodating portion. From the light reception value thereof, minute vibration of the developer accommodating portion in which the vibration on the apparatus main assembly side causing the noise component is canceled is detected. For that reason, the developer accommodation amount depending on the vibration of the developer accommodating portion can be detected with high accuracy.

Next, an image forming apparatus according to an embodiment 2 and a cartridge detachably mountable to the image forming apparatus will be described.

This embodiment is characterized in that vibration of a process cartridge itself is detected more remarkably while suppressing the influence of the vibration noise of the image forming apparatus main assembly. For that reason, a constitution in which the laser light L emitted from the exposure unit 2 is reflected by a reflection plate provided in the process cartridge 1, and then the light reflected by the reflection plate is received by a light receiving sensor provided in the image forming apparatus main assembly in the neighborhood of the exposure unit 2, desirably provided on the exposure unit 2 is employed.

In the following, a characteristic portion of this embodiment will be specifically described. Incidentally, the constitution of this embodiment is similar to the constitution of the embodiment 1 except for a constitution in which the process cartridge is provided with the reflection plate and the exposure unit is provided with the light receiving sensor, and therefore, members having equivalent functions are represented by the same reference numerals or symbols and will be omitted from description.

<Reflection Plate>

As shown in FIGS. 6 and 7, in this embodiment, the process cartridge 1 is provided with a reflection member R which is a reflection member for reflecting the laser light L emitted from the exposure unit 2. The reflection plate R is a mirror on a side thereof opposing the exposure unit 2 and reflects the laser light L emitted from the exposure unit 2.

Further, the reflection plate R is provided correspondingly to the non-image forming region HG on the same flat plane as an exposure surface where the photosensitive drum 13 is scanned with the laser light during the image formation. The reflection plate R is provided on a drive input side of the cartridge, which is also one side with respect to a light scan direction (main scan direction X) of the exposure unit 2. By disposing the reflection plate R on the drive input side, a distance between a driving gear (not shown) of the cartridge and the reflection plate R becomes short. For that reason, the vibration generated in the driving gear is easily transmitted to the reflection plate R, and a change in laser light incident on the light receiving sensor 34 is easily grasped, so that accuracy of the detection of the vibration of the cartridge is improved.

<Light Receiving Sensor>

As shown in FIGS. 6 and 7, the image forming apparatus includes a light receiving sensor 34 which is a light receiving portion for receiving the light reflected by the reflection plate R which is the reflection member.

The light receiving sensor 34 in this embodiment is provided integrally with the exposure unit 2 on a side surface of the exposure unit 2. Further, the light receiving sensor 34 is provided on the same side as the reflection plate R with respect to the light scan direction (main scan direction X) of the exposure unit 2. Accordingly, the laser light L emitted from the exposure unit 2 toward the non-image forming region HG is reflected by the reflection plate R and then is incident on the light receiving sensor 34 provided on the frame of the process cartridge 1. By this, in the case where the vibration generated from the image forming apparatus main assembly is included as noise in the laser light L emitted from the exposure unit 2, the light receiving sensor provided on the exposure unit receives the laser light L and thus has an effect such that the vibration noise generated from the apparatus main assembly is canceled. That is, detection intensity of natural vibration of the process cartridge is enhanced, with the result that this enhancement leads to an enhancement in detection accuracy of the toner accommodation amount.

The light receiving sensor 34 in this embodiment may preferably be one capable of detecting the laser light by converting a laser light quantity into an electric signal, and is a photodiode, for example. Further, the light receiving sensor 34 in this embodiment includes a light receiving surface of φ1.0 (mm) in size, and thus is preferred for the purpose of realizing downsizing and cost reduction of the image forming apparatus or the process cartridge. Then, the received laser light L is converted into the electric signal and is sent to a controller 100 shown in FIG. 8.

Incidentally, the constitution in which the light receiving sensor 34 is provided on the exposure unit 2 was described as an example, but the present invention is not limited thereto. The light receiving sensor 34 may be provided at any position of the apparatus main assembly, but in order to avoid detection of ambient vibration as noise when the vibration of the toner accommodating portion is detected, the light receiving sensor 34 may preferably be provided in the neighborhood of the exposure unit 2 and may more preferably be provided integrally with the exposure unit 2.

<Controller>

As shown in FIG. 8, in an apparatus main assembly of the image forming apparatus, the controller 100 is provided. The controller 100 extracts, as vibration data (vibration amplitude) of the process cartridge 1, a p-p average of an output voltage from a light reception value of the light received by the light receiving sensor 34. Then, an accommodation amount of the developer in the process cartridge 1 is detected from the vibration data. In the controller 100, a CPU 101 as a detecting means (control means) and a memory 102 as a storing means are provided. Further, to the controller 100, the light receiving sensor 34 as the light receiving portion and a liquid crystal panel 103 as a display means are connected. Further, the memory 102 as the storing means may also be provided in the process cartridge 1.

In the memory 102, as reference data for detecting an accommodation amount of the developer in the developer accommodating portion depending on the vibration of the cartridge, the vibration data (p-p average (v) of output voltage) and toner amounts (%) for each vibration data are stored in advance. Further, the vibration of the cartridge is detected by the CPU 101 and the developer accommodation amount is detected from the detected vibration of the cartridge, with the result that the detected developer accommodation amount is displayed on the liquid crystal panel 103. Further, on the liquid crystal panel 103, a message prompting a user (operator) to exchange the cartridge when discrimination that the exchange from the cartridge is needed (for example, in the case where the developer to be supplied is insufficient or used up or in the case where the collected developer is in a full-state, or the like case) is made is displayed.

<Vibration Detection and Accommodation Amount Detecting Process>

Next, using FIG. 9, a flow of detecting the developer accommodation amount in the cartridge by comparing the vibration data based on the light reception value of the light received by the light receiving sensor with the toner amount (%) for each of the vibration data stored in the memory will be described. That is, the vibration of the cartridge is detected from the light reception value of the light received by the light receiving sensor and then the developer accommodation amount in the cartridge is detected from the vibration of the cartridge. Such a flow will be described. FIG. 9 is a flowchart showing the flow of the contact vibration detection and the toner accommodation amount detection.

Incidentally, in this embodiment, as the developer accommodating portion, the toner accommodating portion 11 in the process cartridge is described as an example. That is, a constitution in which the reflection plate R is provided on the toner accommodating portion 11 which is a first developer accommodating portion for accommodating the toner to be supplied to the photosensitive drum 13, in which the light receiving sensor 34 is provided on the exposure unit 2, and in which the developer accommodation amount in the toner accommodating portion 11 is detected is described as an example, but the developer accommodating portion is not limited to the toner accommodating portion 11. As the developer accommodating portion, the residual toner accommodating portion 12 in the process cartridge may also be used. That is, a constitution in which the reflection plate R is provided on the residual toner accommodating portion 12 which is a second developer accommodating portion for accommodating residual toner collected from the photosensitive drum 13, in which the light receiving sensor 34 is provided on the exposure unit 2, and in which the developer accommodation amount in the residual toner accommodating portion 12 is detected may also be employed.

First, the controller 100 discriminates whether or not a print request (print job) in the image forming apparatus is made (S21). In the case where the controller discriminated that the print request is made (Yes of S21), the process is caused to go to a step S22. On the other hand, in the case where the controller discriminated that the print request is not made (No of S21), the process is caused to stand by in the step S21 until the print request is made. Incidentally, the vibration detection and accommodation amount detection process may also be executed every time when an image forming process in the image forming apparatus main assembly is executed predetermined numbers of times set in advance. Further, the vibration detection and accommodation amount detection process may be executed every lapse of a predetermined period set in advance during execution of continuous printing of images on a plurality of sheets (recording mediums).

Next, the controller starts drive of the process cartridge 1 (S22), and then the semiconductor laser 31 of the exposure unit 2 emits the laser light (S23), and thus the image forming operation is started. Simultaneously therewith, the laser light L is emitted from the exposure unit 2, and the photosensitive drum 3 is scanned with the laser light L in the main scan direction (arrow X direction in FIG. 7). At this time, the laser light L is reflected by the reflection plate R provided on the frame (or a member connected to the frame) of the toner accommodating portion 11 of the process cartridge 1 at a timing when an optical path is formed in the non-image forming region HG with respect to the main scan direction (S24). Then, the light reflected by the reflection plate R is incident on the light receiving sensor 34 (see FIG. 6) provided on the exposure unit 2 (S25).

Subsequently, the laser light L incident on the light receiving sensor 34 is converted into an electric signal by the light receiving sensor 34, and then the electric signal is sent to the controller 100 (S26).

Then, the CPU 101 in the controller 100 receives the electric signal and then extracts, as vibration data (vibration amplitude) of the process cartridge 1, a p-p average of an output voltage from the provided electric signal (S27). Or, the received electric signal is subjected to Fourier transformation and thus is converted into vibration data. Here, the vibration data refers to vibration data of the cartridge based on a detection signal (light reception value) of the light received by the light receiving sensor, and is the p-p average of the output voltage which is extracted from the above-described electric signal and which corresponds to the developer accommodation amount in the cartridge.

Next, the CPU 101 compares the value data (p-p average of output voltage) extracted from the light reception value of the light received by the light receiving sensor 34 with the vibration data stored in the memory 102, and thus detects the developer accommodation amount of the cartridge (S28).

Thus, in this embodiment, a first step (S23) in which the light is emitted from the exposure unit 2 provided in the image forming apparatus and a second step (S24) in which the light emitted from the exposure unit 2 is reflected by the reflection plate R provided on the cartridge are performed. Thereafter, a third step (S25) in which the light reflected from the reflection plate R is received by the light receiving sensor 34 is performed. Then, the vibration of the cartridge is detected from the light reception value of the light received by the light receiving sensor 34, and the accommodation amount of the toner accommodated in the toner accommodating portion 11 of the cartridge is detected from the vibration of the cartridge (S28).

Incidentally, parts (a) to (f) of FIG. 11 are graphs each showing an FFT analysis result of a vibration state for an associated toner accommodation amount in the embodiment 2. In FIG. 11, part (a) shows the result for the toner accommodation amount of 0%, part (b) shows the result for the toner accommodation amount of 20%, part (c) shows the result for the toner accommodation amount of 40%, part (d) shows the result for the toner accommodation amount of 60%, part (e) shows the result for the toner accommodation amount of 80%, and part (f) shows the result for the toner accommodation amount of 100%. In either result, there is substantially no vibration of a high-frequency range of 200 Hz or more generated by the image forming apparatus main assembly. Vibration of a low-frequency range of 50 Hz or less generated by gears, the rotating developing roller, the rotating toner feeding member, and the like which are operable by the drive directly inputted to the process cartridge is remarkably detected. Further, a state in which each peak intensity changes depending on the toner accommodation amount can be grasped.

<Detection of Vibration of Developer Accommodating Portion by Laser Light>

Parts (a) to (c) of FIG. 10 are schematic views for illustrating a method of detecting a vibration state of the cartridge in the constitution of the embodiment 2 shown in FIG. 7 and schematically show positions of the laser light L reaching the light receiving sensor 34 in a normal state and the vibration state. Here, the normal state refers to a state indicated by a solid line in which there is no vibration of the cartridge and thus there is no change in light receiving position of the light receiving sensor. Further, the vibration state refers to a state indicated by a broken line in which the cartridge vibrates and thus the light receiving position of the light receiving sensor changes.

As shown in part (a) of FIG. 10, the position of the reflection plate R in the normal state is a light receiving position C indicated by the solid line. On the other hand, in the vibration state, the reflection plate R vibrates, whereby the light receiving position of the reflection plate R changes and thus reciprocates between a reflection plate R' (light receiving position D indicated by the broken line) and a reflection plate R" (light receiving position E indicated by a chain line). As a result, the laser light L reflected by the reflection plate R reciprocates between laser light L' and laser light L". Further, as shown in part (b) of FIG. 10, a light quantity of the laser light L incident on the light receiving sensor 34 changes, and therefore, a signal outputted from the light receiving sensor 34 has a waveform as shown in part (c) of FIG. 10.

In this embodiment, an amplitude of the output voltage changes depending on the toner accommodation amount, and therefore, an average (p-p average of output voltage) of the amplitude in a certain time from the short of the drive of the process cartridge in the image forming apparatus main assembly is calculated as the vibration data (vibration amplitude) of the process cartridge. Then, the average (vibration data) is compared with the amplitude (vibration data) stored in the memory in advance. Or, the p-p average of the output voltage of the laser light first detected after the process cartridge is mounted in the apparatus main assembly is stored, as the vibration data (vibration amplitude) of the process cartridge, in the memory in advance. Then, during a period in which the process cartridge is used, the p-p average of the output voltage is detected, as the vibration data (vibration amplitude) of the process cartridge, periodically from the light reception value of the laser light, and then is compared with the vibration data stored in the memory, so that the toner accommodation amount is calculated.

Further, the waveform as shown in part (c) of FIG. 10 is subjected to the Fourier transformation, whereby signal intensity based on a detection signal by the light receiving sensor 34 is calculated, and is compared with the vibration data stored in the memory in advance, so that the toner accommodation amount is calculated.

Effect of this Embodiment

Here, using a comparison example, an effect of the embodiment 2 will be described.

Incidentally, the comparison example is similar to the comparison example described in comparison with the embodiment 1, and therefore will be omitted from description.

In FIG. 12, a result such that the p-p average of the output voltage (vibration amplitude) detected by an associated sensor when the residual toner amount is 10% is measured three times and are added and averaged in the comparison example is shown together with a result of the embodiment 2. In FIG. 12, the embodiment 2 is represented by a chain line, and the comparison example is represented by a broken line.

From the result shown in FIG. 12, in the case of the acceleration sensor of the contact type as the comparison example, in detection of the vibration (amplitude of the output voltage) of the cartridge in a state in which the toner amount is small, as shown in FIG. 12 by the broken line, there was a tendency that particularly a variation becomes large.

In the case where the non-contact type of this embodiment in which the laser light from the exposure unit is reflected by the reflection plate provided on the cartridge and is received by the light receiving sensor provided on the exposure unit is used, the following reason can be cited. The vibration of the cartridge (toner accommodating portion) itself can be detected with accuracy while canceling the vibration due to another driving portion of the image forming apparatus. Particularly, the vibration of the cartridge becomes small with a smaller remaining toner amount, and therefore, a noise component of the vibration of the cartridge due to another driving portion of the image forming apparatus other than the driving portion for the cartridge lowers the accuracy when the toner amount is detected from the vibration. Accordingly, in order to accurately detect the remaining toner amount, the constitution of the embodiment 2 in which the variation in measurement is smaller than the variation in the comparison example is preferred. In the embodiment 2, the relative standard deviation indicating the variation was the same level as that of the embodiment 1.

In FIG. 13, a result of the toner amount and the amplitude of the output voltage detected by the sensor in each of the embodiment 1 and the embodiment 2 is shown.

In both of the embodiment 1 and the embodiment 2, toner amounts from 100% to 0% were able to be detected from amplitudes of the vibration of the cartridge acquired by detection of the laser light.

As is understood from FIG. 13, compared with the embodiment 1, the p-p average (amplitude) of the output voltage is large in the embodiment 2. The reason therefor would be considered as follows. In the constitution of the embodiment 1, the light receiving sensor was provided on the cartridge and the laser light was received by the light receiving sensor. On the other hand, in the constitution of the embodiment 2, the cartridge is provided with the reflection plate and the exposure unit on the apparatus main assembly side is provided with the light receiving sensor. The laser light is reflected by the reflection plate provided on the cartridge and then is received by the light receiving sensor provided on the apparatus main assembly side. That is, compared with the constitution of the embodiment 1, the embodiment 2 is constituted so that an optical path of the laser light from the light source to the light receiving sensor is made longer so as to detect the vibration of the cartridge in a large degree. By this constitution, it would be considered that compared with the embodiment 1, the p-p average (amplitude) of the output voltage is larger in the embodiment 2.

Accordingly, by the vibration detecting means of the non-contact type using the laser light, which is provided in the image forming apparatus, the toner accommodation amount of the toner accommodated in the toner accommodating portion was able to be detected continuously on the basis of the vibration generated in the toner accommodating portion.

Thus, according to the constitution of the embodiment 2, compared with the comparison example using the contact type, the accommodation amount of the developer accommodated in the developer accommodating portion can be accurately detected from an initial stage to a last stage of use on the basis of the vibration generated in the developer accommodating portion.

That is, in this embodiment, the vibration of the developer accommodating portion is detected by the light emitted from the exposure unit provided in the image forming apparatus. By this, in this embodiment, the vibration of the image forming apparatus main assembly capable of causing the noise component in the vibration detection of the developer accommodating portion as in the comparison example (using the contact acceleration sensor) can be canceled. Further, the light source of the light (laser light) is disposed so as to avoid the influence of the vibration in the exposure unit to the extent possible, and the exposure unit itself has a vibration-damping structure, and therefore the vibration of the developer accommodating portion can be detected accurately.

As described above, in this embodiment, on an image formation principle, the laser light emitted from the exposure unit disposed so as to minimize the influence of the vibration of the image forming apparatus main assembly is utilized. Further, during image forming drive, the laser light is reflected by the reflection plate provided on the process cartridge which is the developer accommodating portion, and then is received by the light receiving sensor provided on the exposure unit. From the light reception value thereof, minute vibration of the developer accommodating portion in which the vibration on the apparatus main assembly side causing the noise component is canceled is detected. For that reason, the developer accommodation amount depending on the vibration of the developer accommodating portion can be calculated with high accuracy. Particularly, in this embodiment, even when compared with the embodiment 1, the influence of the vibration of the apparatus main assembly is further eliminated, and the vibration of the developer accommodating portion is detected, so that detection accuracy of the developer accommodation amount depending on the vibration can be enhanced.

In the above-described embodiments, the constitution in which the drum cartridge 1A which is the first frame unit including the photosensitive drum 13, the residual toner accommodating portion, and the like and the developing cartridge 1B which is the second frame unit including the developing roller 14, the toner accommodating portion 11, and the like are provided was described as an example. In addition, the constitution in which these cartridges are integrally assembled into a unit as the process cartridge detachably mountable to the image forming apparatus was described as an example. However, the present invention is not limited thereto. For example, when a constitution as shown in FIG. 14 is employed, a more effective detecting means in the present invention can be realized.

FIG. 14 is a schematic sectional view of a process cartridge, in which a preferred form for detecting a vibration state of a toner accommodating portion of a process cartridge 1 with accuracy is illustrated. The process cartridge 1 shown in FIG. 14 is constituted by integrally assembling a drum cartridge 1A which is a first frame unit including a photosensitive drum 13 and a residual toner accommodating portion 12 and a developing cartridge 1B which is a second frame unit corresponding to the developing device into a unit (cartridge). Incidentally, members having the same functions as the members constituting the process cartridges in the above-described embodiments are represented by the same reference numerals or symbols.

As shown in FIG. 14, in a portion P, rotation holes at opposite end portions of the drum cartridge A which is the first frame unit and fixed holes at opposite end portions of the developing cartridge 1B which is the second frame unit are connected by unit connecting pins. By this, the drum cartridge 1A which is the first frame unit and the developing cartridge 1B which is the second frame unit are rotatably connected to each other. Further, an urging spring T is provided between the drum cartridge 1A which is the first frame unit and the developing cartridge 1B which is the second frame unit. By this urging spring T, the developing roller 14 is urged toward the photosensitive drum 13 while maintaining a certain clearance via spacer rollers (not shown) provided at the above-described roller end portions.

As described above, in the drum cartridge 1A which is the first frame unit, the photosensitive drum 13 scanned with the laser light from the exposure unit is inclined. For that reason, the drum cartridge 1A includes a positioning portion (not shown) to be positioned to the image forming apparatus main assembly and is mounted into the image forming apparatus main assembly so as not to be shaken by being positioned at this positioning portion. Relative to such a drum cartridge 1A which is the first frame unit, the developing cartridge 1B which is the second frame unit disposed in a suspended state by the connecting pins and also in a swingable state by the urging spring T is driven by rotation of the toner feeding member 17. Compared with the process cartridge having the constitution described in the embodiment 1, the process cartridge shown in FIG. 14 has a constitution in which relative to the drum cartridge 1A which is one frame unit, the developing cartridge 1B which is the other frame unit is held so as to be swingable. For that reason, the developing cartridge 1B is remarkably subjected to vibration with a rotation period of the toner feeding member 17. As a result, the vibration of the toner accommodating portion 11 is remarkably detected, so that the toner accommodation amount can be accurately detected from the detected vibration.

Further, in the above-described embodiment 1, the constitution in which the light receiving sensor 34 was provided on the frame of the toner accommodating portion 11 constituting the process cartridge 1 shown in FIG. 1 was described as an example, but the present invention is not limited thereto. For example, a constitution in which a light receiving sensor is provided on a frame of the residual toner accommodating portion 12 constituting the process cartridge 1 shown in FIG. 1 may be employed. Further, although not illustrated, a light receiving sensor is provided on a residual toner container provided to a cleaning means for a transfer belt provided in the image forming apparatus main assembly, and then it is also possible to detect an accommodation amount of residual toner accommodated in the container. Or, a light receiving sensor is provided on a toner accommodating container such as a toner bottle which is independent from the developing device and which is for storing toner for supply, and then it is also possible to detect an accommodation amount of the toner accommodated in the container.

Further, in the above-described embodiment 2, the constitution in which the reflection plate R was provided on the frame of the toner accommodating portion 11 constituting the process cartridge 1 shown in FIG. 6 and in which the light receiving sensor 34 was provided on the exposure unit 2 was described as an example, but the present invention is not limited thereto. For example, a constitution in which a reflection plate is provided on a frame of the residual toner accommodating portion 12 constituting the process cartridge 1 shown in FIG. 6 and in which a light receiving sensor is provided on the exposure unit 2 may be employed. Further, although not illustrated, a reflection plate may be provided on a residual toner container provided to a cleaning means for a transfer belt provided in the image forming apparatus main assembly, or on a toner accommodating container such as a toner bottle which is independent from the developing device and which is for storing toner for supply. In that case, the light receiving sensor is provided on the exposure unit or in the apparatus main assembly at a periphery of the exposure unit, and then it is also possible to detect an accommodation amount of the toner accommodated in the container.

The drum cartridge 1A is the first frame unit including the residual toner accommodating portion 12 which is a second developer accommodating portion, and the developing cartridge 1B is the second frame unit including the toner accommodating portion 11 which is a first developer accommodating portion. In the above-described embodiments, the constitution in which the drum cartridge 1A and the developing cartridge 1B were integrally assembled into the unit was described as an example, but the present invention is not limited thereto. The present invention is also effective even in a constitution in which the cartridges including the developer accommodating portion, respectively, are independently detachably mountable to the image forming apparatus. That is, a constitution in which a light receiving sensor is provided on a frame of each developer accommodating portion or on a member connected to the frame may be employed. Further, a constitution in which the reflection plate is provided on the frame of each developer accommodating portion or the member connected to the frame and in which the light receiving sensor is provided on the exposure unit or in the apparatus main assembly at the periphery of the exposure unit may be employed. Even when such a constitution is employed, the accommodation amount of the toner or the residual toner in the associated developer accommodating portion can be accurately detected. In the case where the light receiving sensor or the reflection plate is provided on the associated developer accommodating portion, positions of these members may only be required to be different from each other with respect to the light scan direction of the exposure unit.

Further, in the above-described embodiments, the printer was described as an example of the image forming apparatus, but the present invention is not limited thereto. For example, another image forming apparatus such as a copying machine or a facsimile machine or another image forming apparatus such as a multi-function machine having functions of these machines in combination may be used. Further, the image forming apparatus in which the intermediary transfer member was used and the toner images carried on the intermediary transfer member were collectively transferred onto the recording medium was described as an example, but the present invention is not limited thereto. For example, an image forming apparatus in which a recording medium carrying member is used and toner image of respective colors are successively transferred onto the recording medium carried on the recording medium carrying member may also be used. By applying the present invention to these image forming apparatuses, a similar effect can be obtained.

Next, an image forming apparatus according to an embodiment 4 and a cartridge detachably mountable to the image forming apparatus will be described. Incidentally, members having the same functions as the functions of the members in the above-described embodiments are represented by the same reference numerals or symbols and will be omitted from description.

<General Outline>

A general outline of a characteristic of this embodiment will be described using FIG. 15 and part (a) of FIG. 16. FIG. 15 is a schematic sectional view of an image forming apparatus 500. Part (a) of FIG. 16 is a schematic view showing an exposure unit 2, and a photosensitive drum 13, a retroreflection member 71, and a scanning light detecting member 35 of a process cartridge 1.

In this embodiment, as shown in FIG. 15 and part (a) of FIG. 16, a constitution in which laser light L1 emitted from a laser light emitting element 31*a* in a semiconductor laser 31 which is a light emitting source is caused to be incident on a retroreflection member 71 provided on the process cartridge 1 is employed. Further, a constitution in which the light reflected by the retroreflection member 71 is received by an inner light receiving element 31*b* inside the semiconductor laser 31 is employed. Here, a system in which an accommodation amount of the toner accommodated in the process cartridge 1 is detected from the vibration of the process cartridge 1 by using the light reflected by the retroreflection member 71 is used.

<Semiconductor Laser>

The semiconductor laser 31 which is the light emitting source will be described using part (b) of FIG. 16. Part (b) of FIG. 16 is a schematic sectional view showing an inside structure of the semiconductor laser 31 included in the exposure unit 2.

The exposure unit 2 which is the exposure means includes the semiconductor laser 31 which is the light emitting source for emitting the laser light. The semiconductor laser 31 includes the laser light emitting element 31*a* which is a light emitting element and the inner light receiving element 31*b* which is an inner light receiving portion. The laser light emitting element 31*a* emits the laser light L in two directions including a first direction (arrow L3 direction) toward a polygon mirror 32 side and a second direction (arrow L4 direction) is opposite to the first direction. The inner light receiving element 31*b* is provided inside the semiconductor laser 31 with respect to the arrow L4 direction of the laser light emitting element 31*a* and detects the laser light L emitted in the second direction. Further, a light quantity of the laser light L emitted from the laser light emitting element 31*a* in the arrow L3 direction is controlled by detecting, with an unshown laser driving board, a monitor current outputted by receiving the laser light L, emitted in the arrow L4 direction simultaneously with the laser light L emitted in the arrow L3 direction, by the inner light receiving element 31*b*.

<Scanning Light Detecting Member>

The scanning light detecting member 35 will be described using part (a) of FIG. 16. The scanning light detecting member 35 is provided on the exposure unit 2. The scanning light detecting member 35 is provided in a predetermined position in order to output a reference signal of a scanning start timing of the laser light L with which the photosensitive drum is scanned by rotation of the polygon mirror 32. When the laser light L is incident on the scanning light detecting member 35, the reference signal of the scanning start timing of the laser light L based on image data is outputted by an unshown circuit.

<Retroreflection Member>

The retroreflection member 71 will be described using FIG. 15 and part (a) of FIG. 16. In this embodiment, the process cartridge 1 includes the retroreflection member 71 which is a reflecting member for reflecting the laser light L emitted from the semiconductor laser 31 of the exposure unit 2. The retroreflection member 71 has a property of retroreflection such that the laser light L emitted from the exposure unit 2 is reflected in the same direction as a direction of incidence on a reflecting surface by a reflection structure specifically described later. As in this embodiment, for an object (the process cartridge in this embodiment) subjected to detection of vibration, by using the retroreflection member 71, even when a position and an angle of the retroreflection member 71 are changed, the light can be returned in the direction opposite to the direction of the incident light.

The laser light L reflected by the retroreflection member 71 is returned in the same direction as the incident direction, and therefore, is simultaneously returned to the semiconductor laser 31 which is the light emitting source. At this time, the returned laser light L is received by the inner light receiving element 31*b* of the semiconductor laser 31, so that a monitor current outputted by the inner light receiving element 31*b* changes. From the change in monitor current outputted by the inner light receiving element 31*b*, a timing when the laser light (returned light) reflected by the above-described retroreflection member 71 is received by the inner light receiving element 31*b* can be detected.

Incidentally, at this time, a light quantity of the laser light L emitted from the laser light emitting element 31*a* of the semiconductor laser 31 in the first direction is constant. Accordingly, a light quantity of the laser light L emitted from the laser light emitting element 31*a* in the second direction is the same as the light quantity of the laser light L emitted in the first direction. For that reason, the monitor current outputted from the inner light receiving element 31*b* which received the laser light L emitted from the laser light emitting element 31*a* in the second direction is constant (a voltage a shown in FIG. 21). When the laser light L (returned light) reflected by the retroreflection member 71 is incident on the inner light receiving element 31*b* in this state, the monitor current outputted changes (the voltage b shown in FIG. 21). By this, the inner light receiving element 31*b* is capable of detecting a receiving timing of the laser light L which is the returned light from the above-described retroreflection member 71. Incidentally, a detection signal of the scanning light detecting member 35 is indicated by a broken line (35*a*) in FIG. 21. The scanning light detecting member 35 only detects ON/OFF as to whether the laser light L is received, and thus does not detect the light quantity of the laser light L as indicated by a solid line (31*b*1) detected by the inner light receiving element 31*b*. For this reason, the voltage of the ordinate shown in FIG. 21 does not relate to the detection signal of the scanning light detecting member 35. Although details will be described later, in order to explain a time difference from the timing when the laser light from the retroreflection member is received by the inner light receiving element 31*b*, a reference signal for a scanning start timing of the laser light L by the scanning light detecting member 35 is shown in FIG. 21.

In this embodiment, a constitution in which the inner light emitting element 31*b* of the semiconductor laser 31 which is the light emitting source also functions as a light receiving portion for receiving the laser light L reflected by the retroreflection member 71 was described as an example, but the present invention is not limited thereto. A constitution in which the light receiving portion for receiving the laser light L reflected by the retroreflection member 71 is independently separately may be constituted.

Further, the retroreflection member 71 is provided in the non-image forming region HG which is an outside of the image forming region G in which the photosensitive drum is scanned with the laser light L during the image formation as shown in part (a) of FIG. 16. The retroreflection member 71 is provided directly or through an unshown supporting member on the toner accommodating portion 11 disposed on a drive input side of the cartridge which is also one side with respect to the light scan direction (main scan direction X) of the exposure unit 2 (see FIG. 15).

Further, in front of a laser light L incident surface of the retroreflection member 71, a slit member 83 is provided on the toner accommodating portion 11 directly or through the unshown supporting member. A detection constitution depending on a vibration direction of the retroreflection member 71 can be employed by providing the slit member 83. Details thereof will be described later in <Slit member>.

<Principle of Retroreflection Member>

Here, a structure of the retroreflection member 71 will be described using FIGS. 17 and 18. Parts (a) to (d) of FIG. 17 are schematic views each for illustrating a retroreflection member of a corner cube type, and parts (a) and (b) of FIG. 18 are schematic views each for illustrating a spherical retroreflection member.

The retroreflection member 71 is reflection member having a retroreflection property such that the light is reflected in the incident direction. For example, one using a prism having a shape which is called a corner cube 110 has been known. The corner cube 110 has a shape such that three flat surface plates 110*a* which are three flat surfaces for reflecting the light are arranged at right angles (angles 110*b* are right angles) to each other as shown in part (a) of FIG. 17. The corner cube 110 has a property such that incident light L6 is reflected by three flat plates 110*a* and reflected light L7 is returned in a direction opposite to the incident direction.

Further, the reflection member having the retroreflection property may have the above-described corner cube shape and may also have a V-character aggregate 112 (part (b) of FIG. 17) formed by two flat surfaces 112*a* of which interior angle is a right angle.

Further, even a square pyramid aggregate 113 (part (c) of FIG. 17) which is a tetrahydron of which interior angles are right angles can exhibit a similar retroreflection property. However, the aggregate 112 of the flat surfaces of which interior angle is the right angle and the aggregate 113 of the square pyramids cannot realize the retroreflection in all of three-dimensional directions. For that reason, as the retroreflection member provided on the toner accommodating portion 11 which vibrates three dimensionally, an aggregate 114 (part (d) of FIG. 17) of corner cubes 110 each constituted by three flat surface plates 110*a* arranged at right angles of each other on a reflecting surface which is a single surface may preferably be used. A base material of the retroreflection member 71 is molded with a resin material in consideration of a molding property, and on the reflecting surfaces 110*a* and the reflecting surfaces 112*a*, a reflecting film (deposited film or the like) is formed of metal such as aluminum or gold.

Further, the spherical retroreflection member as shown in part (a) of FIG. 18 may be a spherical retroreflection member (of glass bead type) 111 in which small glass balls (spheres) 111*a* are arranged on a reflecting layer 111*b*. Also, this spherical retroreflection member 111 is capable of returning, as reflected light L7, incident light L6 in a direction opposite to the incident direction by refraction of the incident light L6 from a surface of each small glass ball 111*a* to an inner surface, reflection by the reflecting layer 111*b*, and refraction at the surface from the inner surface of the small glass ball 111*a* as shown in part (a) of FIG. 18. Incidentally, the small glass ball 111*a* is capable of being replaced with a transparent resin ball.

<Controller>

A controller will be described using FIG. 19. FIG. 19 is a block diagram showing a part of an electric circuit of the image forming apparatus.

As shown in FIG. 19, in an apparatus main assembly of the image forming apparatus 500, the controller 100 is provided. The controller 100 extracts, as vibration data (vibration amplitude) of the process cartridge 1, data from a change in time difference between a timing when the light is reflected by the retroreflection member 71 and is then received by the inner light receiving element 31*b* and a timing when the light is received by the scanning light detecting member 35. Then, an accommodation amount of the toner in the process cartridge 1 is detected from the vibration data. In the controller 100, a CPU 101 as a detecting means (control means) and a memory 102 as a storing means are provided. Further, to the controller 100, the inner light receiving element 31*b* and the scanning light detecting member 35 which are as the light receiving portions and a liquid crystal panel 103 as a display means are connected. Further, the memory 102 as the storing means may also be provided in the process cartridge 1.

In the memory 102, reference data for detecting an accommodation amount of the toner in the toner accommodating portion depending on the vibration of the cartridge are stored. As the data, it is possible to cite vibration data (output timing difference between the inner light receiving element 31*b* and the scanning light detecting member 35 and signal strength obtained by subjecting the timing difference to the Fourier transformation) and a toner amount (%) for each of pieces of the vibration data, and the like. Further, the vibration of the cartridge is detected by the CPU 101 and the toner accommodation amount is detected from the detected vibration of the cartridge, with the result that the detected toner accommodation amount is displayed on the liquid crystal panel 103. Further, on the liquid crystal panel 103, a message prompting a user (operator) to exchange the cartridge when discrimination that the exchange from the cartridge is needed (for example, in the case where the toner to be supplied is insufficient or used up or in the case where the collected residual toner is in a full-state, or the like case) is made is displayed.

<Vibration Detection and Accommodation Amount Detecting Process>

Next, using parts (a) and (b) of FIG. 16 and FIG. 20, a flow of detecting the toner accommodation amount in the process cartridge 1 in which vibration of the process cartridge 1 is detected and then the toner accommodation amount is detected from the vibration of the process cartridge 1 will be described. The toner accommodation amount is detected from the vibration data of the process cartridge 1 based on a change in time difference between a timing when the scanning light is incident on the scanning light detecting member 35 and a timing when the reflected light from the retroreflection member 71 is incident on the inner light receiving element 31*b*. FIG. 20 is a flowchart relating to a detection process of the contact vibration and the toner accommodation amount.

Incidentally, in this embodiment, as the developer accommodating portion, the toner accommodating portion 11 in the process cartridge is described as an example. That is, the frame of the toner accommodating portion 11 is provided with the retroreflection member 71 and the exposure unit 2 is provided with the light receiving portion (inner light receiving element 31*b*). Further, a constitution in which the toner accommodation amount in the toner accommodating portion 11 is detected is described as an example, but the developer accommodating portion is not limited to the toner accommodating portion 11. As the developer accommodating portion, the residual toner accommodating portion 12 in the process cartridge may also be used. That is, the frame of the residual toner accommodating portion 12 which is a second developer accommodating portion for accommodating residual toner collected from the photosensitive drum 13 may be provided with the retroreflection member 71 and the exposure unit 2 may be provided with the light receiving portion (inner light receiving element 31*b*). That is, a constitution in which the accommodation amount of the residual toner in the residual toner accommodating portion 12 is detected may also be employed.

First, the controller 100 discriminates whether or not a print request (print job) in the image forming apparatus 500 is made (S41). In the case where the controller 100 discriminated that the print request is made (Yes of S41), the process is caused to go to a step S42. On the other hand, in the case where the controller 100 discriminated that the print request is not made (No of S41), the process is caused to stand by in the step S41 until the print request is made. Incidentally, the vibration detection and accommodation amount detection process may also be executed every time when an image forming process in the apparatus main assembly of the image forming apparatus 500 is executed predetermined numbers of times set in advance. Further, the vibration detection and accommodation amount detection process may be executed every lapse of a predetermined period set in advance during execution of continuous printing of images on a plurality of sheets (recording mediums).

Next, the controller 100 starts drive of the process cartridge 1 (S42), and then the laser light emitting element 31*a* of the semiconductor laser 31 of the exposure unit 2 emits the laser light (S43), and thus the image forming operation is started. Simultaneously therewith, the laser light L is emitted from the laser light emitting element 31*a* of the semiconductor laser 31 of the exposure unit 2, the photosensitive drum 3 is scanned with the laser light L in the main scan direction (arrow X direction in part (a) of FIG. 16) by a polygon mirror 32 rotating as shown in part (a) of FIG. 16. At this time, the laser light L is first incident on the scanning light detecting member 35 part (a) of FIG. 16) (S44). The laser light L incident on the scanning light detecting member 35 is converted into an electric signal by the scanning light detecting member 35, and the electric signal is transmitted to the controller 100 (S45).

On the other hand, after the laser light L is incident on the scanning light detecting member 35, the laser light L is reflected by the retroreflection member 71 provided on the frame (or a member connected to the frame) of the toner accommodating portion 11 of the process cartridge 1 at a timing when an optical path is formed in the non-image forming region HG (part (a) of FIG. 16) with respect to the main scan direction (S46). Then, the light reflected by the retroreflection member 71 is incident on the inner light receiving element 31*b* provided in the exposure unit 2 (parts (a) and (b) of FIG. 16) (S47). The laser light L incident on the inner light receiving element 31*b* is converted into an electric signal by the inner light receiving element 31*b*, and then the electric signal is sent to the controller 100 (S48).

Then, the CPU 101 in the controller 100 receives the electric signals and then subjects a change amount of a time difference between the receive two electric signals (incident timings) of the scanning light detecting member 35 and the inner light receiving element 31*b* to the Fourier transformation. Thereafter, the resultant data is extracted as vibration data (voltage amplitude) of the process cartridge 1 (S49).

Next, the CPU 101 compares the value data, extracted from the change amount of the time difference between the two electric signals of the scanning light detecting member 35 and the inner light receiving element 31*b*, with the vibration data stored in the memory 102, and thus detects the developer accommodation amount of the cartridge (S50).

Thus, in this embodiment, a first step (S43) in which the light is emitted from the laser light emitting element 31*a* of the exposure unit 2 provided in the image forming apparatus 500 is included. Further, a second step (S45) in which the light emitted from the laser light emitting element 31*a* of the exposure unit 2 is reflected by the retroreflection member 71 provided on the cartridge is included. Further, a step (S44) in which the light is received by the scanning light detecting member 35 and a third step (S46) in which the light reflected from the retroreflection member 71 is received by the inner light receiving element 31*b* are included. By performing these steps, the vibration of the cartridge is detected from the light reception value of the light received, and the accommodation amount of the toner accommodated in the toner accommodating portion 11 of the cartridge is detected from the vibration of the cartridge (S49).

<Detection of Vibration of Toner Accommodating Portion by Laser Light>

Next, using parts (a) to (c) of FIG. 21 and parts (a) and (b) of FIG. 22, detection of the vibration of the toner accommodating portion 11 by the laser light L will be described.

Parts (a) to (c) of FIG. 21 are graphs each showing an ON/OFF signal of the scanning light detecting member 35 and a waveform of a monitor voltage at which the light reflected from the retroreflection member 71 is detected by being received by the inner light receiving element 31*b*. In the graphs of parts (a) to (c) of FIG. 21, the abscissa represents a time, and the ordinate represents the voltage. In addition, a waveform indicated by a broken line is a waveform 35*a* by the scanning light detecting member 35, and a waveform indicated by a solid line is a waveform 31*b*1 of the inner light receiving element 31*b*.

Incidentally, as described above, detection signals of the scanning light detecting member 35 indicated by the broken lines in parts (a) to (c) of FIG. 21 are the ON/OFF signals as to whether or not the laser light L is received, and the scanning light detecting member 35 does not detect a light quantity of the laser light L as detected in the case of the inner light receiving element 31*b*. For this reason, the voltage of the ordinate shown in each of parts (a) to (c) of FIG. 21 does not relate to the detection signal of the scanning light detecting member 35. Further, the scanning light detecting member 35 is provided in the exposure unit 2, and therefore, the waveforms 35*a* of the scanning light detecting member 35 indicated by the broken lines are the same irrespective of the states of the cartridge shown in parts (a) to (c) of FIG. 21.

Part (a) of FIG. 21 shows the monitor voltage in a normal state (position of a retroreflection member 71*a* of part (a) of FIG. 22). Parts (b) and (c) of FIG. 22 shows the monitor voltages in a vibration state in which the process cartridge 1 vibrates. Part (b) of FIG. 21 shows the monitor voltage in a position of a retroreflection member 71*b* of part (b) of FIG. 22, and part (c) of FIG. 21 shows the monitor voltage in a position of a retroreflection member 71*c* of part (b) of FIG. 22.

In parts (a) to (c) of FIG. 21, a scanning start timing which is a timing when the laser light L is detected by the scanning light detecting member 35 for outputting the reference signal for the scanning start timing of the laser light L refers to as t1. A light receiving start timing which is a timing when the reflected light is detected by the inner light receiving element 31*b* for receiving the reflected light returned from the retroreflection member 71 refers to as t2. A time difference between the scanning start timing t1 and the light receiving start timing t2 refers to as Δt.

Parts (a) and (b) of FIG. 22 schematically show positions of the laser light L reaching the retroreflection member 71 in the normal state (part (a) of FIG. 22) and the vibration state (part (b) of FIG. 22) of the process cartridge 1 which is a vibration detection object. Here, the normal state refers to a state in which there is no vibration of the process cartridge 1 and thus there is no change in position of the retroreflection member 71. Further, the vibration state refers to a state in which the process cartridge 1 vibrates and thus the position of the retroreflection member 71 changes.

First, using part (a) of FIG. 21 and part (a) of FIG. 22, the normal state in which there is no vibration of the process cartridge 1 will be described.

In the normal state in which there is no vibration of the process cartridge 1, the position of the retroreflection member 71 is the position of the retroreflection member 71*a* shown in part (a) of FIG. 22. At this time, the time difference ΔT between the scanning start timing t1 when the laser light L is incident on the scanning light detecting member 35 and the light receiving start timing t2 when the reflected light from the retroreflection member 71*a* is incident on the inner light receiving element 31*b* is a time difference Δt1. Further, when an interval from the incidence of the laser light L on the scanning light detecting member 35 to reflection of the light by the retroreflection member 71 refers to as ΔL, the interval ΔL in the normal state is an interval ΔL1 shown in part (a) of FIG. 22.

On the other hand, using parts (b) and (c) of FIG. 21 and part (b) of FIG. 22, the vibration state in which the process cartridge 1 vibrates will be described.

As shown in part (b) of FIG. 22, the position of the retroreflection member 71 in the vibration state reciprocates between the position of the retroreflection member 71*b* and the position of the retroreflection member 71*c* by vibration of the process cartridge 1. For this reason, the laser light L reciprocates between laser light Lt2*b* and laser light Lt2*c* with respect to laser light Lt2*a* in the normal state.

Further, the interval ΔL from the incidence of the laser light L on the scanning light detecting member 35 to the reflection of the light by the retroreflection member 71 changes between an interval ΔL2 and an interval ΔL3 with respect to the interval ΔL1 in the normal state. Incidentally, a time when the laser light L is reflected by the retroreflection member 71 and a time when the light is received by the inner light receiving element 31*b* are the same. For that reason, the interval ΔL is also an interval (time difference Δt) from the scanning start timing t1 of the laser light L by the scanning light detecting member 35 to the light receiving start timing t2 of the laser light L by the inner light receiving element 31*b*. Accordingly, when the interval ΔL changes as shown in part (b) of FIG. 22, the time difference Δt changes between a time difference Δt2 (part (b) of FIG. 21) and a time difference Δt3 (part (c) of FIG. 21).

Also, in this embodiment, as described above in the embodiment 1 to the embodiment 3, a magnitude of the vibration of the process cartridge 1 changes depending on the toner accommodation amount. Therefore, the toner accommodation amount can be calculated by detecting the time difference Δt which changes with the change in magnitude of the vibration. Further, this time difference is subjected to Fourier analysis, and signal strength of a specific frequency remarkably appearing depending on a change in weight is calculated. Then, the toner accommodation amount can be calculated by comparing the calculated signal strength with the vibration data stored in the memory 102 in advance.

<Slit Member>

Here, a relationship between a structure of the slit member 83 and the detection of the vibration will be described using FIG. 15, part (a) of FIG. 16, and FIGS. 21, 22 and 25. Parts (a) to (d) of FIG. 25 are schematic views each for illustrating a vibration state of the retroreflection member 71 as viewed in an incident surface direction, in which X represents the scan direction (main scan direction) of the laser light L, and Y represents the sub-scan direction perpendicular to the main scan direction X.

The slit member 83 is provided in front of the incident surface of the laser light L on the retroreflection member 71 as shown in FIG. 15 and part (a) of FIG. 16 and is disposed on the frame of the toner accommodating portion 11 directly or through an unshown supporting portion. The slit member 83 which is a shielding member shields the laser light L by covering a part of the retroreflection member 71. By providing the slit member 83, the light receiving start timing t2 can be detected with high accuracy. Incidentally, the slit member 83 is not necessarily required to be provided when a state of high detection accuracy can be ensured.

Here, two kinds of the slit members 83 consisting of a slit member 83*b* shown in parts (a) and (b) of FIG. 25 and a slit member 83*c* shown in parts (c) and (d) of FIG. 25 will be described. The slit members 83*b* and 83*c* are provided with edge portions 83*b*1 and 83*c*1, respectively.

Next, the edge portions 83*b*1 and 83*c*1 will be described. The laser light L travels for scanning in the scan direction X (arrow X direction) in FIG. 25 and further travels through surfaces of the slit member 83*b* or 83*c*, and then is incident on the retroreflection member 71 in a place where the laser light L passed through the edge portion 83*b*1 or 83*c*1. Then, the laser light L is reflected by the retroreflection member 71, and then the timing becomes the light receiving start timing t2 (FIG. 21) at the inner light receiving element 31*b*. That is, as shown in parts (a) to 8*d*) of FIG. 25, a point of intersection 83L where the laser light L crosses the edge portion 83*b*1 or 83*c*1 represents the light receiving start timing t2 (FIG. 21).

Next, a difference in vibration detection due to a difference between the edge portions 83*b*1 and 83*c*1 of the slit members 83*b* and 83*c* will be described.

As regards the slit member 83*b* shown in parts (a) and (b) of FIG. 25, the edge portion 83*b*1 crosses the main scan direction X but extends in the same direction as the sub-scan direction Y. On the other hand, as regards the slit member 83*c* shown in parts (c) and (d) of FIG. 25, the edge portion 83*c*1 provides a crossing angle for both the main scan direction X and the sub-scan direction Y.

As shown in part (b) of FIG. 22, the vibration of the retroreflection member 71 in the main scan direction X is capable of being detected by the slit member 83*b* having a constitution in which the edge portion 83*b*1 shown in parts (a) and (b) of FIG. 25 extends in the sub-scan direction Y. On the other hand, as shown in parts (a) and (b) of FIG. 25, the vibration of the retroreflection member 71 in the sub-scan direction Y cannot be detected by the slit member 83*b* because the vibration direction is the same direction (sub-scan direction Y) as an extension direction. This is because the point of intersection 83L which is the light receiving start timing of the inner light receiving element 31*b* is the same in the main scan direction X.

Therefore, as shown in parts (c) and (d) of FIG. 25, when the edge portion 83*e*1 provides an angle relative to each of the main scan direction X and the sub-scan direction Y, the point of intersection 83L between the edge portion 83*b*1 and the laser light L changes with respect to the main scan direction X, and therefore, the vibration in the sub-scan direction Y is also capable of being detected.

<Vibration of Process Cartridge>

The vibration of the process cartridge will be described using FIGS. 14, 23 and 24. FIG. 14 is a schematic sectional view for illustrating the process cartridge of the embodiment 3. Parts (a) and (b) of FIG. 23 are schematic views for illustrating drive transmission between the driving portion 5 of the apparatus main assembly of the image forming apparatus 500 and the process cartridge 1. Parts (a) and (b) of FIG. 24 are schematic views for illustrating the drive transmission at an inside of the process cartridge 1.

In the above-described embodiment 3, as shown in FIG. 14, the drum cartridge 1A which is the first frame unit mounted in the apparatus main assembly of the image forming apparatus 500 so as not to shake. On the other hand, the developing cartridge 1B which is the second frame unit has a constitution in which the developing cartridge 1B disposed in a state in which the developing cartridge 1B is suspended from the connecting pin P and in which the developing cartridge 1B is swingable by the urging spring T is held so as to be swingable. For that reason, the case where the vibration with a rotation (cyclic) period of the toner feeding member 17 is remarkably received was described as an example, but the driving source is not limited thereto.

As the driving source, the following would be considered. The process cartridge 1 mounted in the apparatus main assembly of the image forming apparatus 500 receives the drive from the driving portion 5 of the apparatus main assembly and rotates a rotatable member inside the process cartridge 1. As a specific constitution, it is possible to cite a constitution in which for example, as shown in part (a) of FIG. 23, the driving portion 5 of the apparatus main assembly engages with the drive input portion 45 of the process cartridge 1 and drives the photosensitive drum 13 which is a rotatable member which is provided coaxially with the drive input portion 45. Here, the drive input portion 45 engages with the driving portion 5 and receives the driving force from the driving portion of the apparatus main assembly. When the process cartridge 1 is mounted in the apparatus main assembly, it is difficult in consideration of a tolerance or the like that rotation axes of the driving portion 5 of the apparatus main assembly, the drive input portion of the process cartridge 1, and the photosensitive drum 13 are caused to completely coincide with each other. Therefore, the driving portion of the apparatus main assembly, the drive input portion of the process cartridge 1, and the photosensitive drum 13 cause rotation axis deviated even in a slight degree.

For this reason, the photosensitive drum 13 constitutes a driving source which periodically fluctuates. Incidentally, as shown in part (b) of FIG. 23, this is true for a constitution in which the driving portion 5 of the apparatus main assembly engages with the drive input portion 45 of the process cartridge 1 and drives the developing roller 14 which is a rotatable member provided coaxially with the drive input portion 45. Further, this is also true for the case where the driving portion 5 of the apparatus main assembly drives another rotatable member, such as an unshown toner supplying roller, included in the process cartridge 1, or for the like case.

Further, as shown in part (a) of FIG. 24, it is possible to cite a constitution in which the drive input portion 45, the drive transmitting portion 46, and the driving roller 14 engage with each other inside the process cartridge 1 and in which the developing roller 14 which is the rotatable member is driven. Here, the drive transmitting portion 46 is for transmitting the driving force from the drive input portion 45 to the developing roller 14 which is the rotatable member provided inside the process cartridge 1. When the process cartridge 1 is mounted in the apparatus main assembly, the drive transmitting portion 46 and the developing roller 14 also cause rotation axis deviation even in a slight degree when a tolerance or the like is taken into consideration. For this reason, when the process cartridge 1 is driven in a state in which the rotation axis deviation is caused, elastic deformation occurs in the drive transmitting portion 46. When the elastic deformation occurs, a storing force thereto occurs, so that vibration generates due to repetition of this. Further, in the case where the drive transmitting portion 46 is a member, such as a helical gear, capable of transmitting the driving force in an axial direction, vibration including an axial direction component generates. That is, vibration of the laser light L, which is a detection object, with respect to the main scan direction X generates with reliability, and therefore, it is desirable that the drive transmitting portion 46 can transmit the driving force also in the axial direction.

Incidentally, the constitution in which the vibration occurs is not limited to the above-described constitutions in which the drive transmitting portion 46 is disposed coaxially with image forming process members such as the photosensitive drum 13 and the developing roller 14 as shown in parts (a) and (b) of FIG. 23. For example, the vibration similarly generates even in a constitution as shown in part (b) of FIG. 24 in which the drive transmitting portion 45 is disposed at a position different in axis from rotatable members as the image forming process members such as the photosensitive drum 13 and the developing roller 14.

As shown in FIG. 14, the process cartridge 1 is held so as to be swingable and is in a swingable state by the urging spring T, and therefore, an urging force of a spacer roller (not shown) provided at an end portion of the developing roller 14 changes depending on a change in toner accommodation amount. With the change in urging force of this spacer roller (not shown), a load on rotation of the developing roller 14 also fluctuates. When the rotation load of the developing roller 14 fluctuates, a fluctuation in load occurs from the driving portion 5 of the apparatus main assembly of the image forming apparatus 500 over an entire driving system for driving the developing roller 14 via the drive input portion 45 and the drive transmitting portion 46 of the process cartridge 1. This load fluctuation changes the above-described vibration of the driving source (FIG. 24).

Then, to the change in toner accommodation amount, change information on signal strength of the specific frequency of a driving system which remarkably relates is stored in the memory 102, and then the toner accommodation amount can be calculated as described above.

As described above, in this embodiment, on an image formation principle, the following constitution is employed. The laser light L emitted from the exposure unit 2 disposed so as to minimize the influence of the vibration of the apparatus main assembly of the image forming apparatus 500 is utilized and received by the scanning light detecting member 35 in the exposure unit 2. Then, the light reflected by the retroreflection member 71 provided in the process cartridge 1 including the toner accommodating portion 11 is received by the inner light receiving element 31*b* in the exposure unit 2. Further, based on the light reception value of the light, minute vibration of the toner accommodating portion 11 from which the main assembly-side vibration of the image forming apparatus 500 capable of constituting the noise component is canceled is detected. Further, signal strength of the specific frequency remarkably appearing depending on a change in weight can be calculated. For that reason, the toner accommodation amount depending on the vibration of the toner accommodating portion 11 can be calculated with high accuracy. Further, in general, the scanning light detecting member 35 and the inner light receiving element 31*b* which are provided in the exposure unit 2 are used, and therefore, it is possible to detect the toner accommodation amount depending on the vibration of the toner accommodating portion 11 by a simple constitution which suppresses an increase in cost.

Incidentally, in this embodiment, data is extracted as vibration data (vibration amplitude) of the process cartridge 1 from the change in time difference between the timing when the light is received by the scanning light detecting member 35 and the timing when the light reflected by the retroreflection member 71 is received by the inner light receiving element 31*b*. Then, from the vibration data, the toner accommodation amount in the process cartridge 1 is detected. Such a constitution was described as an example, but the present invention is not limited thereto. As in the above-described embodiment 2, the vibration data of the process cartridge 1 may also be extracted on the basis of the light reception value of the light reflected by the retroreflection member 71 and then received by the inner light receiving element 31*b*. That is, a constitution in which the toner accommodation amount in the process cartridge 1 is detected from the vibration data may be employed.

Next, an image forming apparatus according to an embodiment 5 and a cartridge detachably mountable to the image forming apparatus will be described. Incidentally, a constitution other than a constitution of a retroreflection member provided in the process cartridge is similar to the constitution of the above-described embodiment 4, and therefore, members having the same functions as the functions of the members in the above-described embodiments are represented by the same reference numerals or symbols and will be omitted from description.

In the following, the retroreflection member 71 in this embodiment will be described. Part (a) of FIG. 26 is a schematic sectional view of the retroreflection member 71. The retroreflection member 71 has a retroreflection shape having the above-described retroreflection property on one of two parallel surfaces of a flat plate. As a material of the retroreflection member 71, a transparent resin material such as an acrylic resin, a polystyrene resin, or a polycarbonate resin is used. Although described later, the retroreflection member 71 is a transparent member having refractive index larger than refractive index of ambient air.

In the retroreflection member 71 in this embodiment, a first side (incident surface) 72 on which the laser light L is incident and a second side 73 opposite from the first side 71 are included. The retroreflection member 71 has the retroreflection shape, formed on an inner surface 73*b* of the second surface 73, such that the light is reflected in a direction opposite to the incident direction. Here, as a supplementary explanation of the retroreflection member 71 described using FIG. 25, an outside surface of the first side (incident surface) 72 is an outer surface 72*a*, an inside surface of the first side 72 of the flat plate is an inner surface 72*b*, an outside surface of the second side 73 is an outer surface 73*a*, and inside surface of the second side 73 of the flat plate is the inner surface 73*b*. That is, on the inner surface 73*b* which is at least one of inner surfaces of the retroreflection member 71, a retroreflection shape 71*d* is formed.

The retroreflection shape 71*d* formed on the inner surface 73*b* of the second side of the retroreflection member 71 shown in part (a) of FIG. 26 has the following constitution. The retroreflection shape 71*d* is constituted by the aggregate 114 in which many shapes which are corner cubes 110 each formed of three flat surface plates (which are three flat surfaces) 110*a* disposed at right angles (angle 110*b* is a right angle) as shown in part (a) of FIG. 17 are arranged.

In the above-described embodiment 4, the example in which the aggregate 114 in which many corner cubes 110 constituting the retroreflection shape 71*d* are arranged on the outside surface of the retroreflection member 71 as shown in part (d) of FIG. 17 was shown. In this embodiment, one feature is such that the retroreflection shape 71*d* is provided on the inner surface 73*b* of the retroreflection member 71 as shown in part (a) of FIG. 26 and the light is reflected by the inner surface 73*b*.

Incidentally, in actuality, the inner surface 73*b* on which the retroreflection shape 71*d* is provided has the constitution in which many triangular-pyramid-shapes (corner cubes 110) each constituted by the three flat surfaces which cross each other at 90° (right angles) as interior angle. For that reason, incident light L12 is reflected in the order of three reflection points RF1, RF2 and RF3 of three surfaces, and becomes reflected light L13 which travels in a direction opposite to the incident direction. That is, a reflection optical path is three-dimensional. However, a principle of the retroreflection is the same as the case of reflection at two surfaces of which interior angle is 90° (right angle). Accordingly, in order to make simple description on a two-dimensional drawing sheet, in the figures of this embodiment, in the following, the retroreflection member 71 and optical paths of the laser light L in this embodiment will be described using a beam emitted from a point source and two surfaces of which interior angle is 90°.

(Total Reflection Phenomenon)

Here, first, a total reflection phenomenon will be described using FIG. 27. A resin material 77 which is a reflection member is a transparent member having a refractive index larger than a refractive index of ambient air 78. In general, in the case where the light enters from the substance (resin material 77) into the substance (air 78), a phenomenon which is called total reflection such that all the light is all reflected when the incident angle exceeds a certain incident angle occurs. As regards angles of the light relative to a normal line NV perpendicular to a boundary surface between the resin material 77 and the ambient air 78, when an incident angle is θa, a refraction angle is θb, a reflection angle is θc, the refractive index of the resin material 77 is n1, and the refractive index of the ambient air 78 is n2, in the case where a relationship in refractive index of n1>n2 holds, the following phenomenon occurs.

(1) First, as shown in part (a) of FIG. 27, incident light La entering at an incident angle θa is divided into refracted light Lb obtained by refracting the incident light La at a refraction angle θb1 and reflected light Lc obtained by reflecting the incident light La at a reflection angle θc1 which is the same angle as the incident angle θa1.

(2) Next, as shown in part (b) of FIG. 27, when the incident light La enters at an incident angle θa2 larger than the above-described incident angle θa1 (θa2>θa1), the incident light La is divided into the refracted light Lb with a refraction angle θb2 of 90° and the reflected light Lc reflected at a reflection angle θc2 which is the same as the incident angle θa2.

(3) Next, as shown in part (c) of FIG. 27, when the incident light La enters at an incident angle θa2 exceeding the incident angle θa2 (θa3>θa2), there is no refracted light and there is only a component (reflected light Lc reflected at a reflection angle θc3 which is the same as the incident angle θa3).

Thus, a state shown in part (c) of FIG. 27 is called a total reflection state. The incident angle θa2 is called a critical angle, and the critical angle can be calculated using the following formula from the refractive indices n1 and n2.

$$\sin \theta a2 = n2/n1$$

For example, in a combination of an acrylic resin material of about 1.5 in refractive index n1 and the air of 1.0 in refractive index n2, the critical angle θa2 is about 42°.

(Explanation 1 of Retroreflection State in this Embodiment: Case of Incident Angle of 0°)

Next, the optical path of the laser light L in the retroreflection member 71 in this embodiment will be described using FIGS. 28 and 29. In this embodiment, the retroreflection member 71 formed of the acrylic resin material will be described as an example.

First, the case where the incident light L11 enters the first side 72 at an incident angle θ (θ=0°) will be described using FIGS. 28 and 29. Parts (a) and (b) of FIG. 28 are schematic views for illustrating the retroreflection member 71 described using parts (a) and (b) of FIG. 26. FIG. 29 is a schematic enlarged view of the retroreflection member 71 shown in part (b) of FIG. 28.

The retroreflection shape (retroreflection surface) 71*d* of the retroreflection member 71 shown in FIG. 29 includes a triangular-pyramid-shape (corner cube shape), but in this embodiment, as described above, description will be made using the two surfaces of which an interior angle is 90°.

As shown in FIG. 29, the incident light L11 entering the outside surface 72*a* of the first side 72 at the incident angle of 0° reaches, as incident light L12, an inner surface 73*b*1 which is one of inner surfaces of the retroreflection member 71 formed on the second side 73 (part (a) of FIG. 26) positioned opposite from the first side 72.

When the incident light L12 is incident on the inner surface 73*b* at the incident angle θ, the incident light L12 is changed to reflected light L12' reflected at a reflection angle θ which is the same as the incident angle θ. When the reflected light L12' is incident on the inner surface 73*b*2 at an incident angle θ, the reflected light L12' is changed to reflected light L13 reflected at a reflection angle θ which is the same angle as the incident angle θ. Thus, the light (reflected light L13) travels in a direction diametrically (180°) opposite to the incident direction of the incident light L12. Then, the reflected light L13 reading the first side 72 passes through the inner surface 72*b* and becomes reflected light L14 reflected in the direction diametrically opposite to the incident direction of the incident light L11. This state is the retroreflection state similarly as in the case of the embodiment 4.

At this time, on the inner surfaces 73*b*1 and 73*b*2, with respect to the normal line NV relative to each of the inner surfaces, each of the incident angles θ of the laser light L is about 45°. Therefore, the incident angle θ at each inner surface exceeds the critical angle of 42°, so that the light is reflected under a total reflection condition. Therefore, there is no light traveling toward the outer surface 73*a* side of the second side 73, so that all the beams of light are reflected.

Although the light is reduced to some degree when the light passes through an inside of the resin material, depending on a degree of transparency of the resin material constituting the reflecting member (transparent member), most of the incident light can be reflected with no transmission. That is, the incident laser light L can be almost returned in the direction opposite to the incident direction. Accordingly, the laser light L emitted from the laser light emitting element 31*a* in the first direction (arrow L3 direction shown in part (b) of FIG. 16) is subjected to retroreflection by the retroreflection member 71 and then can be returned to the inner light receiving element 31*b*. Incidentally, in the above description, the point light source was used, and therefore, the incident light L11 and the reflected light L14 are shown so that there is a positional deviation, but the actual light is light flux (beam), and the light incident as the light flux is returned to an emitted position (light source).

(Explanation 2 of Retroreflection State in this Embodiment: Case of Incident Angle Other than 0°)

The case where the incident light L11 is incident on the first side 72 at an incident angle θ1 (θ1≠0°) will be described using FIGS. 30 and 31. FIG. 30 is a schematic view for illustrating the retroreflection member 71 described using parts (a) and (b) of FIG. 26. Parts (a) and (b) of FIG. 31 are schematic enlarged views of the retroreflection member 71 shown in FIG. 30.

As shown in part (a) of FIG. 31, incident light L11 entering the outer surface 72*a* of the first side 72 at an incident angle θ1 is divided at a point of incidence into incident light 12 refracted at a refraction angle θ2 and reflected light L17 reflected at a reflection angle θ2. Here, when θ1=10° and θ2=5°, the incident light L12 is incident on the inner surface 73*b*1 at an incident angle θ3=50°, and therefore, is totally reflected by the inner surface 73*b*1. Totally reflected light L12' is then incident on the inner surface 73*b*2 at the same incident angle θ3=50°, and therefore, is totally reflected also by the inner surface 73*b*2. The reflected light L13 obtained by the total reflection at the inner surface 73*b*2 enters the inner surface 72*b* of the first side 72 at an angle θ2 which is the same angle as the angle θ2 of the incident light L12 and is changed to reflected light L14 at a refraction angle θ1. Also, in this case, similarly as in the case of the incident angle of 0°, the retroreflection occurs, so that the laser light L emitted from the laser light emitting element 31*a* in the first direction (arrow L3 direction shown in part (b) of FIG. 16) is subjected to the retroreflection by the retroreflection member 71 and can be returned to the inner light receiving element 31*b*.

The retroreflection member 71 in this embodiment has a constitution in which on the inner surface 73*b* of the second side 73 opposite from the first side (incident surface) 72 into which the laser light L enters, the retroreflection shape 71*d* by which the light is reflected in the direction opposite to the incident direction is employed. For that reason, there is no need to perform reflection film processing necessary in the case where the retroreflection shape is provided on the incident surface which is the first side as described above (FIGS. 17 and 18), so that it becomes possible to provide the retroreflection member 71 which realized cost reduction.

(Problem 1 of Inner Surface Reflection)

Here, in the case of incident angle θ1=10° (case of θ1≠0°), as described above, the reflected light L17 exists. The reflected light L17 travels in a direction different from the direction of the reflected light L14 intended to be returned to the inner light receiving element 31*b*. When this reflected light L17 is reflected directly by the photosensitive drum 13 or is reflected by any component part in the image forming apparatus and then indirectly reaches the photosensitive drum 13, an unintended latent image is formed. The unintended latent image is developed with the toner, whereby there is a possibility that a defective image is formed on the recording medium.

(Problem 2 of Inner Surface Reflection)

When the incident angle θ1 becomes larger, for example, in the case of θ1=30°, the optical path in the retroreflection member 71 provides θ1=30°, θ2=25°, θ3=20°, θ4=15°, and θ5=75° as shown in part (b) of FIG. 31. Also, in this case, the reflected light L14 is returned at an angle which is the same as the angle of the incident light L11, so that the retroreflection occurs, so that the laser light L emitted from the laser light emitting element 31*a* in the first direction (arrow L3 direction shown in part (b) of FIG. 16) can be returned to the inner light receiving element 31*b*.

Here, when attention is paid to the inner surface 73*b*2, the incident angle θ3 of the incident light L12 into the inner surface 73*b*2 becomes 20° and is smaller than the critical angle of 42°. For that reason, the total reflection does not occur at the inner surface 73*b*2.

Accordingly, the incident light 12 is divided into reflected light L12' and transmitted light L18.

The reflected light L12' is incident on the inner surface 73*b*1 at an incident angle of 75° (θ5), and therefore, in this case, the total reflection occurs, and the transmitted light does not exist. The reflected light L13 totally reflected by the inner surface 73*b*1 is incident on the inner surface 72*b* and is emitted at the refraction angle θ1 and is retroreflected as the reflected light L14, so that the light can be returned to the inner light receiving element 31*b*.

On the other hand, the transmitted light L18 travels toward an outside (right-hand side of part (b) of FIG. 31) through transmission from the inner surface toward the outer surface of the second side 73. The retroreflection member 71 is disposed in the same position as the retroreflection member 71 shown in part (a) of FIG. 16 in the embodiment 4, and therefore, the photosensitive drum 13 exists behind (in the direction of the outer surface 73*a* of the second side 73) the retroreflection member 71. In this case, when the transmitted light L18 exists, there is a possibility that this transmitted light L18 reaches the photosensitive drum 13 and thus an unintended latent image is formed on the photosensitive drum 13. Incidentally, as shown in part (a) of FIG. 31, similarly as in the case of θ1=10°, the reflected light L17 also exists.

As described above, when the incident angle θ1 is large, the unintended latent image by both of the reflected light L17 and the transmitted light L18 is developed with the toner, whereby there is a possibility that the defective image is formed on the recording medium.

(Summary of Problems)

As described above, in the problems when the retroreflection member 71 is used in the inner surface reflection, in the case where the incident angle of the light incident on the retroreflection member 71 is 0°, most of the light is subjected to the retroreflection.

For that reason, a possibility of an occurrence of inconveniences for image formation and light detection is very low except for an abnormal state such as a contamination of the reflecting surface.

However, it is difficult due to a dimension tolerance, a temperature change or the like that the retroreflection member 71 provided in the process cartridge 1 detachably mountable to the apparatus main assembly of the image forming apparatus 500 is disposed so that the incident angle of the light incident on the retroreflection member 71 becomes 0°. Further, in the image forming process, the toner accommodating portion 11 vibrates due to the drive transmitted for rotating the developing roller 14 or the like. Accordingly, the retroreflection member 71 mounted on the toner accommodating portion 11 also vibrates. Further, a vibration direction thereof is three-dimensional, so that there is substantially no continuous retention of the incident angle at 0°.

That is, in this embodiment, during the image forming operation, the incident angle of the light incident on the retroreflection member 71 continuously changes, and therefore, the reflected light L17 and the transmitted light L18 are generated in some cases. That is, there is a possibility that the unintended latent image is formed and thus image defect occurs.

(Means for Solving Problems of Inner Surface Reflection)

In order to solve the above-described problem, in this embodiment, a shielding member 79 for shielding the reflected light L17 which generates on the outer surface 72*a* of the first side 72 and which is originally unnecessary and for shielding the transmitted light L18 was provided at a periphery of the retroreflection member 71. Here, the reflected light L17 is reflected light reflected by the first side 72 in a direction which is not the incident direction, and the transmitted light L18 is transmitted light transmitted through the second side 73. The shielding member 79 will be specifically described using parts (a) and (b) of FIG. 32. Part (a) of FIG. 32 is a schematic sectional view in which the toner accommodating portion 11 provided with the retroreflection member 71 is viewed in a center axis direction. Part (b) of FIG. 32 is a sectional view of the toner accommodating portion 11 taken along an A-A line shown in part (a) of FIG. 32. In part (a) of FIG. 32, a periphery of the retroreflection member 71 is represented by directions of arrows of +Y, −Y and +Z. In part (b) of FIG. 32, the periphery of the retroreflection member 71 is represented by directions of arrows of +X, −X and +Z. The shielding member may only be required to be a material having a light shielding effect.

Here, X represents the main scan direction of the laser light L and is a direction which substantially coincides with the rotational axis direction of the photosensitive drum 13, in which the arrow of +X represents a rightward direction and the arrow of −X represents a leftward direction. Y represents the sub-scan direction and is a direction which substantially coincides with the vertical direction, in which the arrow of +Y represents an upward direction and the arrow of −Y represents a downward direction. Z represents a direction perpendicular to the main scan direction X and the sub-scan direction Y, in which the arrow of +Z represents a rearward direction and the arrow of −Z represents a frontward direction.

That is, as shown in parts (a) and (b) of FIG. 32, the shielding member 79 opens the retroreflection member 71 only in the arrow −Z direction which is the incident surface side, and covers and shields the entire periphery of the retroreflection member 71 except for the incident surface side. Specifically, the shielding member 79 is constituted by five shielding walls 79*a* to 79*e*, and covers and shields the periphery of the retroreflection member 71 except for the surface of the retroreflection member 71 on the incident surface side. The shielding wall 79*a* covers and shields an upper surface side which is an arrow +Y side of the retroreflection member 71. The shielding wall 79*b* covers and shields a rear surface side which is an arrow +Z side of the retroreflection member 71. The shielding wall 79*c* covers and shields a lower surface side which is an arrow-Y side of the retroreflection member 71. The shielding wall 79*d* covers and shields a right surface side which is an arrow +Y side of the retroreflection member 71. The shielding wall 79*e* covers and shields a left surface side which is an arrow −X side of the retroreflection member 71.

Thus, at the periphery of the retroreflection member 71, by providing the shielding member 79 constituted by the shielding walls 79*a* to 79*e*, as shown in part (b) of FIG. 32, it is possible to prevent that the transmitted light L18 from the second side 73 and the reflected light L18 from the first side 72 reach the photosensitive drum 13. In this embodiment, at the retroreflection member 71 is a square of 5 mm in each side and 1 mm in thickness, and therefore, the shielding member 79 may only be required to have a size such that the shielding member 79 covers the periphery of the retroreflection member 71 while supporting the retroreflection member 71.

Further, as regards the arrow-Z side of part (b) of FIG. 32 which is the incident surface side of the retroreflection member 71, the shielding member 79 may only be required to shield another space while ensuring a space in which the laser light L is incident on the retroreflection member 71.

In this embodiment, an example in which a slit member 84 partially provided with a through hole 84*a* is provided as the shielding member 79 is shown in part (a) of FIG. 33 to FIG. 35. Part (a) of FIG. 33 is a front view of the slit member 84 as viewed in the arrow +Z direction. Part (b) of FIG. 33 is a schematic view in which the slit member 84 is added to the shielding member 79 shown in part (a) of FIG. 32.

Further, parts (a) and (b) of FIG. 34 are sectional views taken along a B-B line shown in part (b) of FIG. 33.

As regards a size of the through hole 84*a* provided in the slit member 84, dimensions of the through hole 84*a* may be set in view of a spot diameter of the laser light L when the laser light L passes through the through hole 84*a*, and a vibration range, a dimension tolerance, and a mounting error of the retroreflection member 71. In this embodiment, a square through hole 84*a* of 3 mm (length)×3 mm (width) was provided, but a shape thereof is not limited thereto. The shape may be a circular shape or a polygonal shape, and may also be shapes as shown in parts (c) and (d) of FIG. 25.

By employing these constitutions, even on the incident surface side of the retroreflection member 71, the reflected light L17 can be shielded in a range other than the through hole 84*a* of the slit member 84. Further, in order to satisfy the function of the slit member 83 (FIG. 25) described in the embodiment 4, the through hole 84*a* may be appropriately defined by an edge portion 84*b*.

Incidentally, as regards the reflected light L17, a reflection angle can be calculated from an angle between the incident light L11 and the first side 72. For that reason, as shown in part (b) of FIG. 34, it is desirable that a mounting angle θs of the retroreflection member 71 is adjusted and set so that the reflected light L17 strikes an inner wall of the shielding member or an inner wall of the slit member 84 except for the through hole 84*a*. Here, the mounting angle θs of the retroreflection member 71 refers to an angle formed between the incident light L11 and the first side 72 as shown in part (b) of FIG. 34.

As described above, in this embodiment, the shielding member 79 which completely prevent light transmission is provided in all the directions except for the direction of the first side 72 in which the light is incident on the retroreflection member 71. Further, on the first side 72 on which the light is incident, the slit member 84 provided with the through hole 84*a* or the slit member 84 provided with the through hole 84*a* defined by the edge portion 84*b* is provided. By this, it is possible to prevent the transmitted light L18 and the reflected light L17 from being reflected by the photosensitive drum 13, so that it is possible to prevent formation of the unintended latent image and the occurrence of the image defect.

As another means, a means for reducing a light quantity of the reflected light L17 to a light quantity having no influence on the latent image formation by subjecting the first side 72 of the retroreflection member 71 to coating for suppressing irregular (diffuse) reflection (not shown) may be used. Further, as another means, a means for setting an angle of the first side 72 of the retroreflection member 71 relative to the incident light L11 in a direction in which a reflection destination of the reflected light L17 does not have the influence on the latent image formation may be employed.

In these cases, for shielding the above-described retroreflection member 71 from the transmitted light, paint for preventing light transmission may be applied onto the second side 72 or the shielding member 79 may be provided in the arrow +Z direction.

Incidentally, the shielding member 79 and the slit member 84 may be formed integrally with the frame of the toner accommodating portion 11. Further, as shown in FIG. 35, a constitution in which a supporting member 81 for supporting the retroreflection member 71 is provided with the shielding walls (79*a* to 79*e*) and the slit member 84 as separate member from the toner accommodating portion 11 and is mounted on the supporting member 81 may also be employed.

Next, an image forming apparatus according to an embodiment 6 and a cartridge detachably mountable to the image forming apparatus will be described. Incidentally, a constitution except that a retroreflection member is supported so as to move relative to the process cartridge is similar to the constitution of the above-described embodiment 4, and therefore, members having the same functions as the functions of the members in the above-described embodiments are represented by the same reference numerals or symbols and will be omitted from description.

In the following, a constitution in which the retroreflection member 71 in this embodiment is supported so as to be movable relative to the process cartridge 1 will be described. Parts (a) and (b) of FIG. 36 are schematic sectional views of the retroreflection member 71 and a supporting portion for supporting the retroreflection member 71. Parts (a) and (b) of FIG. 36 show a state in which the retroreflection member 71 is integrally mounted on the supporting member 81 and is engaged with a guiding portion 41 provided on the toner accommodating portion 11 and in which the retroreflection member 71 is irradiated with the laser light L.

In this embodiment, the retroreflection member 71 is supported by the supporting member 81. The supporting member 81 is engaged with the toner accommodating portion 11 in a state in which a space is ensured in the light scan direction (arrow X direction) by the guiding portion 41. The guiding portion 41 is the supporting portion for supporting the retroreflection member 71 so as to be movable relative to the process cartridge 1 in the light scan direction (arrow X direction). The supporting member 81 supporting the retroreflection member 71 has a width W2 narrower than a width W1 of the guiding portion 41 by the above-described space with respect to the light scan direction. For this reason, the supporting member 81 is held by the guiding portion 41 so as to be movable relative to the process cartridge 1 by the above-described space in the light scan direction. Thus, the supporting member 81 on which the retroreflection member 71 is mounted is held by the guiding portion 41 so as to be movable relative to the process cartridge 1, whereby a movable range of the retroreflection member 71 and the supporting member 81 is broadened. That is, a displacement amount of the retroreflection member 71 due to the vibration of the process cartridge 1 generated when the drive is inputted to the process cartridge 1 is made larger than a displacement amount of the vibrating toner accommodating portion 11.

As described above, with respect to the main scan direction X of the laser light L, the width W1 of the guiding portion 41 and the width W2 of the supporting member 81 satisfy a relationship of W1>W2. That is, with respect to the main scan direction X of the laser light L, the retroreflection member 71 is provided so as to be movable relative to the toner accommodating portion 11. In this state, when the driving force is inputted from the apparatus main assembly to the process cartridge 1 and the toner accommodating portion 11 vibrates, the retroreflection member 71 and the supporting member 81 are capable of changing in state from the state shown in part (a) of FIG. 36 to the state shown in part (b) of FIG. 36 by an inertial force.

Next, an effect by arrangement of the retroreflection member 71 and the supporting member 81 disposed so as to be movable relative to the toner accommodating portion 11 will be described using parts (a) and (b) of FIG. 36. For example, in the case where the retroreflection member 71 is in a position shown in part (a) of FIG. 36, the laser light L and laser light L51 can be reflected, but laser light 50 cannot be reflected. On the other hand, in the case where the retroreflection member 71 is in a position shown in part (b) of FIG. 36, the laser light L and the laser light L50 can be reflected, but the laser light L51 cannot be reflected. That is, when the retroreflection member 71 is movable relative to the toner accommodating portion 11 from the position shown in part (a) of FIG. 36 to the position shown in part (b) of FIG. 36, in addition to the laser light L, the laser light 50 and the laser light 51 can also be reflected. A range of the laser light which can be reflected is enlarged by disposing the retroreflection member 71 and the supporting member 81 so as to be movable relative to the toner accommodating portion 11, so that very slight vibration and strong vibration which cannot be detected in the case where the retroreflection member 71 is fixed to the toner accommodating portion 11 become detectable. For example, the very slight vibration corresponds to a time difference shorter than the time difference Δt2 shown in part (b) of FIG. 21, and the strong vibration corresponds to a time difference longer than the time difference Δt3 shown in part 8*c*) of FIG. 21. Thus, a detectable vibration range is enlarged, and therefore, detection accuracy of the toner accommodation amount can be improved.

Incidentally, in this embodiment, the constitution in which the retroreflection member 71 is fixed to the supporting member 81 was described, but a constitution in which the retroreflection member 71 is directly engaged with the guiding portion 41 may also be employed, so that a similar effect can be obtained.

Next, an image forming apparatus according to an embodiment 6 and a cartridge detachably mountable to the image forming apparatus will be described. Incidentally, a constitution except that a retroreflection member is supported so as to be movable relative to the process cartridge is similar to the constitution of the above-described embodiment 4, and therefore, members having the same functions as the functions of the members in the above-described embodiments are represented by the same reference numerals or symbols and will be omitted from description.

In the following, a constitution in which the retroreflection member 71 in this embodiment is supported so as to be movable relative to the process cartridge 1 will be described. Part (a) of FIG. 37 are schematic sectional views of the retroreflection member 71 and a supporting portion for supporting the retroreflection member 71. Part (a) of FIG. 37 shows a state in which the retroreflection member 71 is integrally mounted on the supporting member 81 and a connecting member 85 (coil spring in this embodiment) is provided between the supporting member 81 and the toner accommodating portion 11 and in which the retroreflection member 71 is irradiated with the laser light L.

The connecting member 85 is for connecting the retroreflection member 71 and the process cartridge 1 and is a supporting portion for supporting the retroreflection member 71 so as to be movable relative to the process cartridge 1 in the light scan direction. The connecting member 85 has a spring property. For that reason, in the main scan direction X of the laser light L, the retroreflection member 71 is movable relative to the toner accommodating portion 11. Further, a reflection member-side connecting portion 85*a* of the connecting member 85 is fixed to the supporting member 81, and a frame-side connecting portion 85*b* of the connecting member 85 is fixed to the toner accommodating portion 11. The toner accommodating portion 11 is restricted as the process cartridge 1 by the image forming apparatus main assembly, but the supporting member 81 is not restricted by another member, and therefore, the reflecting member-side connecting portion 85*a* is larger in movable amount than the frame-side connecting portion 85*b*.

In this state, when the driving force is inputted to the process cartridge 1 and the toner accommodating portion 11 vibrates, the retroreflection member 71 and the supporting member 81 are moved by inertial force. The frame-side connecting portion 85*b* vibrates with the same amplitude as the toner accommodating portion 11, whereas the reflection member-side connecting portion 85*a* can move with an amplitude larger than the amplitude of the frame-side connecting portion 85*b*, and thus makes reciprocating motion relative to the toner accommodating portion 11 from, for example, a static state (state shown in part (a) of FIG. 37) as a starting point.

A displacement amount of the retroreflection member 71 can be made larger than a displacement amount of the toner accommodating portion 11, so that a range in which the laser light can be reflected can be enlarged similarly as in the embodiment 6. Further, the retroreflection member 71 is displaced by the connecting member 85 having the spring property, and therefore, the displacement can be stably repeated by the inertial force and a restoring force. That is, a displacement frequency can be increased with the displacement amount, so that the detection accuracy of the toner accommodation amount can be improved.

Incidentally, in this embodiment, a coil spring is used as an example of the connecting member 85, but the connecting member 85 is not limited to this, and may be a linear or plate-like spring member. Further, in this embodiment, the constitution in which the retroreflection member 71 is fixed to the supporting member 81 and is connected to the connecting member 85 via the supporting member 81 was described, but a constitution in which the retroreflection member 71 is directly connected to the connecting member 85 may also be employed, and a similar effect can be obtained.

Next, an image forming apparatus according to an embodiment 8 and a cartridge detachably mountable to the image forming apparatus will be described. Incidentally, a constitution except that a retroreflection member is supported so as to be movable relative to the process cartridge is similar to the constitution of the above-described embodiment 4, and therefore, members having the same functions as the functions of the members in the above-described embodiments are represented by the same reference numerals or symbols and will be omitted from description.

In the following, a constitution in which the retroreflection member 71 in this embodiment is supported so as to be movable relative to the process cartridge 1 will be described. Part (b) of FIG. 37 are schematic sectional views of the retroreflection member 71 and a supporting portion for supporting the retroreflection member 71. Part (b) of FIG. 37 show a state in which the retroreflection member 71 is integrally mounted on the supporting member 81 and a connecting member 86 is integrally molded with the toner accommodating portion 11 and in which the retroreflection member 71 is irradiated with the laser light L.

The connecting member 86 is for connecting the retroreflection member 71 and the process cartridge 1 and is a supporting portion for supporting the retroreflection member 71 so as to be movable relative to the process cartridge 1 in the light scan direction. The connecting member 86 has a spring property. The connecting member 86 is, for example, a rectangular parallelepiped or a cylinder, and has a shape such that one end portion thereof is integrally formed with the toner accommodating portion 11 and the other end portion thereof is exposed. Further, the other end portion (reflection member-side connecting portion 86*a*) opposite from the one end portion (frame-side connecting portion 86*b*) connected to the toner accommodating portion 11 is connected to the supporting member 81 supporting the retroreflection member 71.

The connecting member 86 has a free end, and therefore, can achieve a spring property and can perform a function similar to the function of the connecting member 85 described in the embodiment 7.

In this state, when the driving force is inputted to the process cartridge 1 and the toner accommodating portion 11 vibrates, similarly as in the embodiment 7, the displacement amount of the retroreflection member 71 can be made larger, so that the time difference Δt described in the embodiment 4 can be made large.

In this embodiment, in comparison with the constitution of the embodiment 7, the connecting member 86 is integrally molded with the toner accommodating portion 11, and therefore, a similar effect to the effect of the embodiment 7 can be obtained while reducing the number of component parts. Further, in this embodiment, the constitution in which the retroreflection member 71 is fixed to the supporting member 81 and is connected to the connecting member 86 via the supporting member 81 was described, but a constitution in which the retroreflection member 71 is directly connected to the connecting member 86 may also be employed, and a similar effect can be obtained.

Next, an image forming apparatus according to an embodiment 9 and a cartridge detachably mountable to the image forming apparatus will be described. Incidentally, a constitution except that a retroreflection member is supported so as to be movable relative to the process cartridge is similar to the constitution of the above-described embodiment 4, and therefore, members having the same functions as the functions of the members in the above-described embodiments are represented by the same reference numerals or symbols and will be omitted from description.

In the following, a constitution in which the retroreflection member 71 in this embodiment is supported so as to be movable relative to the process cartridge 1 will be described. Part (a) of FIG. 38 are schematic sectional views of the retroreflection member 71 and a supporting portion for supporting the retroreflection member 71. Part (a) of FIG. 38 show a state in which in addition to the constitution of the embodiment 6, a connecting member 87 (coil spring) having a spring property is provided between the supporting member 81 supporting the retroreflection member 71 and a guiding portion 41 provided on the toner accommodating portion 11 and in which the retroreflection member 71 is irradiated with the laser light L.

In this embodiment, with respect to the light scan direction (arrow X direction), in a space between the supporting member 81 and the guiding portion 41, the connecting member 87 (the coil spring in this embodiment) having the spring property is provided. In a constitution of this embodiment, compared with the constitution described in the embodiment 6, the connecting member 87 having the spring property is disposed in the above-described space, and therefore, similarly as in the embodiment 7, the displacement amount of the retroreflection member 71 can be made larger than the displacement amount of the toner accommodating portion 11, and the displacement of the retroreflection member 71 can be repeated further stably.

In the constitution of this embodiment, compared with the constitution described in the embodiment 7, the connecting member 87 can be disposed substantially parallel to the toner accommodating portion 11, and therefore, it is possible to avoid an increase in outermost configuration.

Next, an image forming apparatus according to an embodiment 10 and a cartridge detachably mountable to the image forming apparatus will be described. Incidentally, a constitution except that a retroreflection member is supported so as to be movable relative to the process cartridge is similar to the constitution of the above-described embodiment 4, and therefore, members having the same functions as the functions of the members in the above-described embodiments are represented by the same reference numerals or symbols and will be omitted from description.

In the following, a constitution in which the retroreflection member 71 in this embodiment is supported so as to be movable relative to the process cartridge 1 will be described. Part (b) of FIG. 38 are schematic sectional views of the retroreflection member 71 and a supporting portion for supporting the retroreflection member 71. Part (b) of FIG. 38 show a state in which in addition to the constitution of the embodiment 7, a viscosity maintaining member 88 as a second connecting member is provided and in which the retroreflection member 71 is irradiated with the laser light L.

In this embodiment, as a supporting member for connecting the retroreflection member 71 and the process cartridge 1 to each other, in addition to the connecting member 85 described in the embodiment 7, the viscosity maintaining member 88 is further provided. The connecting member 85 is a first supporting member having the spring property, and the viscosity maintaining member 88 is a viscosity maintaining member having viscosity, and in this embodiment, a rubber member is used. By adjusting spring constant of the connecting member, viscosity of the viscosity maintaining member 88, and weights of the retroreflection member 71 and the supporting member 81, setting can be made so that these members function as a dynamic damper.

Here, the dynamic damper suppresses vibration noise of a main system by transferring a vibration phenomenon of the main system to a sub-system at a certain frequency by adding a structure constituting the sub-system to a structure constituting the main system.

For example, when the main system is the process cartridge 1 including the toner accommodating portion 11 and the vibration of the main system is vibration due to a rotatable member included in the process cartridge 1, the vibration which is an object to be suppressed has a rotational frequency of the rotatable member. For this frequency, design is made so that the weights of the retroreflection member 71 and the supporting member 81 which constitute the sub-system, the spring constant of the connecting member 85, and the viscosity of the viscosity maintaining member 82 function as the dynamic damper. The weights of the retroreflection member 71 and the supporting member 81 can be adjusted by sizes and materials of these members, the spring constant of the connecting member 85 can be adjusted by linearity and a length of this member 85, and the viscosity of the viscosity maintaining member 82 can be adjusted by a material of this member 82. By designing these members so as to function as the dynamic damper, while suppressing the vibration of the toner accommodating portion 11, the retroreflection member 71 can be displaced in the form of taking over the vibration.

By this, also, in this embodiment, the detection accuracy of the toner accommodation amount can be improved similarly as in the embodiment 7, and in addition, the vibration of the toner accommodating portion 11 during the image formation is suppressed, so that an image quality can be improved.

Next, an image forming apparatus according to an embodiment 11 and a cartridge detachably mountable to the image forming apparatus will be described. Incidentally, members having the same functions as the functions of the members in the above-described embodiments are represented by the same reference numerals or symbols and will be omitted from description.

A general structure of an image forming apparatus according to this embodiment will be described using FIG. 34 and FIG. 40. FIG. 39 is a schematic sectional view of an image forming apparatus 500. FIG. 40 is a schematic view showing a beam separating (splitting) element 90 which is a beam separating (splitting) means of an exposure unit 2, a light receiving sensor 34 which is a light receiving portion, a scanning light detecting member 35, and a photosensitive drum 13, a retroreflection member 71, and a slit member 83 of a process cartridge 1.

In this embodiment, as shown in FIGS. 39 and 40, the beam separating element 90 is provided between the retroreflection member 71 and the exposure unit 2. The beam separating element 90 is the beam separating means for separating the laser light L reflected by the retroreflection member 71.

The laser light L emitted from the semiconductor laser 31 which is a light emitting source is reflected by the retroreflection member 71 provided on the process cartridge 1 and strikes the beam separating element 90 provided in the exposure unit 2. Further, the light (laser light L) reflected by the retroreflection member 71 is partially reflected by the beam separating element 90 and is partially transmitted through the beam separating element 90. That is, the light (laser light L) reflected by the retroreflection member 71 is separated into the reflected light and the transmitted light by the beam separating element 90. Further, a constitution in which of the laser light L, separated light LB reflected by the beam separating element 90 is received by the light receiving sensor 34 is employed. Here, a system in which an accommodation amount of the toner accommodated in the process cartridge 1 is detected from the vibration of the process cartridge 1 by using the light reflected by the retroreflection member 71 and then by separated by the beam separating element 90 is used. Incidentally, of the laser light, separated light LR (see FIG. 41) partially transmitted through the beam separating element 90 generates, but the beam separating element 90 is optically disposed so that the separated light LR does not reach the image forming region G.

In this embodiment, similarly as in the embodiment 4, the process cartridge 1 is provided with the retroreflection member 71 and the slit member 83, and the exposure unit 2 is provided with the scanning light detecting member 35. Further, in this embodiment, different from the embodiment 4, the exposure unit 2 is provided with the beam separating element 90 described later and the light receiving sensor 34 which is the light receiving portion.

<Scanning Light Detecting Member>

The scanning light detecting member 35 will be described using FIG. 40. The scanning light detecting member 35 is provided on the exposure unit 2. The scanning light detecting member 35 is provided in a predetermined position in order to output a reference signal of a scanning start timing of the laser light L with which the photosensitive drum is scanned by rotation of the polygon mirror 32. When the laser light L is incident on the scanning light detecting member 35, the reference signal of the scanning start timing of the laser light L based on image data is outputted by an unshown circuit.

<Retroreflection Member>

The retroreflection member 71 will be described using FIGS. 39 and 40. In this embodiment, the process cartridge 1 includes the retroreflection member 71 which is a reflecting member for reflecting the laser light L emitted from the semiconductor laser 31 of the exposure unit 2. The retroreflection member 71 has a property of retroreflection such that the laser light L emitted from the exposure unit 2 is reflected in the same direction as a direction of incidence on a reflecting surface by a reflection structure described in the embodiment 4. As in this embodiment, for an object (the process cartridge in this embodiment) subjected to detection of vibration, by using the retroreflection member 71, even when a position and an angle of the retroreflection member 71 are changed, the light can be returned in the direction opposite to the direction of the incident light.

Further, the retroreflection member 71 is provided in the non-image forming region HG which is an outside of the image forming region G in which the photosensitive drum is scanned with the laser light L during the image formation as shown in FIG. 40. The retroreflection member 71 is provided directly or through an unshown supporting member on the toner accommodating portion 11 disposed on a drive input side of the cartridge which is also one side with respect to the light scan direction (main scan direction X) of the exposure unit 2 (see FIG. 39).

Further, the retroreflection member 71 in this embodiment is such that one of two parallel surfaces of the flat plate is provided with the above-described retroreflection shape having the retroreflection property. That is, [as regards] details of the retroreflection member 71 is are similar to those described in the embodiment 5 with reference to FIGS. 26 to 31, and therefore, in this embodiment, description thereof will be omitted by invoking the description mentioned above.

Incidentally, when the incident angle θ1 of the incident light L11 on the retroreflection member 71 is large, the unintended latent image due to both of the reflected light L17 and the transmitted light L18 is developed with the developer, whereby there is a possibility that the defective image is formed on the recording medium (see parts (a) and (b) of FIG. 31).

For that reason, there is a need that the above-described incident angle θ1 is made small. Or, as described in the embodiment 5, the shielding member may be provided.

<Slit Member>

The slit member 83 is provided in front of the incident surface of the laser light L on the retroreflection member 71 and is provided on the frame of the toner accommodating portion 11 (see FIG. 39) directly or via an unshown supporting member. The slit member 83 is provided so as to cover a part of the incident surface of the retroreflection member 71 as shown in part (a) of FIG. 25. For this reason, the slit member 83 shields the part of the incident surface of the retroreflection member 71 from the laser light L. The slit member 83 is provided with the edge portion **83*b*1**.

The edge portion **83*b*1 will be described. The photosensitive drum 13 is scanned with the laser light L in the scan direction X (arrow X direction of FIG. 25), and the light travels the surface of the slit member 83*b* and is incident on the retroreflection member 71 in a place where the light passes through the edge portion 83*b*1**.

When the accommodation amount of the toner accommodated in the toner accommodating portion 11 included in the process cartridge 1 changes, a load on a driving gear (not shown) of the process cartridge 1 changes. When the load changes, the driving force necessary for the drive also changes. As a result, a drive state of the driving gear changes. This change in drive state is detected, so that the accommodation amount of the toner accommodated in the toner accommodating portion 11 is estimated.

The retroreflection member 71 and the slit member 83 are provided on the drive input side of the cartridge, which is one side with respect to the light scan direction (the main scan direction X) of the exposure unit 2. By disposing the slit member 83 on the drive input side, a distance between the driving gear of the cartridge and the slit member 83 becomes short. For that reason, the vibration generated in the drive gear is liable to be transmitted, so that a change in laser light L entering the light receiving sensor 34 via the beam separating element 90 described later is easily grasped, so that accuracy of the vibration detection of the cartridge is improved.

<Beam Separating Element>

The laser light L reflected by the retroreflection member 71 is separated (split) by the beam separating element 90 (beam splitter).

In this embodiment, a half mirror 91 is used as the beam separating element 90. The half mirror 91 partially transmits the laser light L and partially reflects the laser light L. For that reason, as shown in FIG. 41, the half mirror 91 not only generates reflected light (separated light LB) but also generates transmitted light (separated light LR). In this embodiment, the beam separating element 90 (half mirror 91) is optically disposed so that the separated light LR generated by the beam separating element 90 does not reach the image forming region G.

<Light Receiving Sensor>

As shown in FIG. 41, the separated light LB separated by the beam separating element 90 is incident on the light receiving sensor 34 which is the light receiving portion. A time from the incidence of the laser light L on the scanning light detecting member 35 to the incidence of the separated light LB on the light receiving sensor 34 is measured. Here, vibration data of the slit member 83 is calculated from the measured time, and the vibration state of the slit member 83 is predicted.

The light receiving sensor 34 in this embodiment is integrally provided on a side surface of the exposure unit 2. Further, the light receiving sensor 34 is provided on the same side as the retroreflection member 71 (i.e., on the drive input side which is one side) with respect to the light scan direction (the main scan direction X) of the exposure unit 2. Accordingly, the laser light L emitted from the exposure unit 2 toward the non-image forming region HG is reflected by the retroreflection member 71 provided on the frame of the process cartridge 1 and then is reflected by the beam separating element 90, and is incident on the light receiving sensor 34. By this, in the case where the vibration generated from the image forming apparatus main assembly is included in the laser light L emitted from the exposure unit 2, the light receiving sensor 34 provided in the exposure unit 2 receives the light, so than an effect of canceling the vibration noise generated by the image forming apparatus main assembly is achieved.

That is, detection accuracy of natural vibration of the process cartridge is enhanced, with the result that this enhancement leads the enhancement in detection accuracy of the toner accommodation amount.

The light receiving sensor 34 in this embodiment may preferably be one capable of detecting the laser light by converting a laser light quantity into an electric signal, and is a photodiode, for example. Further, the light receiving sensor 34 in this embodiment includes a light receiving surface of φ1.0 (mm) in size, and thus is preferred for the purpose of realizing downsizing and cost reduction of the image forming apparatus or the process cartridge. Then, the received laser light L is converted into the electric signal and is sent to a controller 100 shown in FIG. 42.

Incidentally, the constitution in which the light receiving sensor 34 is provided in the exposure unit 2 was described, but the present invention is not limited thereto. The light receiving sensor 34 may be provided at any position in the image forming apparatus main assembly, but may preferably be provided in the neighborhood of the exposure unit 2 in order to avoid detection of ambient vibration as noise when the vibration of the toner accommodating portion is detected, and may more preferably be provided integrally with the exposure unit 2. Further, the slit member may also be provided in front of the light receiving sensor 34. By providing the slit member in front of the light receiving sensor 34, the light receiving timing can be detected with high accuracy.

<Controller>

A controller 100 will be described using FIG. 42. FIG. 42 is a block diagram showing a part of an electric circuit of the image forming apparatus.

As shown in FIG. 42, in an apparatus main assembly of the image forming apparatus 500, the controller 100 is provided. The controller 100 extracts, as vibration data (vibration amplitude) of the process cartridge 1, data from a change in time difference between a timing when the light is reflected by the retroreflection member 71 and is then received by the light receiving sensor 34 via the beam separating element 90 and a timing when the light is received by the scanning light detecting member 35. Then, an accommodation amount of the toner in the process cartridge 1 is detected from the vibration data. In the controller 100, a CPU 101 as a detecting means (control means) and a memory 102 as a storing means are provided. Further, to the controller 100, the light receiving sensor 34 and the scanning light detecting member 35 which are as the light receiving portions and a liquid crystal panel 103 as a display means are connected. Further, the memory 102 as the storing means may also be provided in the process cartridge 1.

In the memory 102, reference data for detecting an accommodation amount of the toner in the toner accommodating portion depending on the vibration of the cartridge are stored. As the data, it is possible to cite vibration data (output timing difference between the light receiving sensor 34 and the scanning light detecting member 35 and signal strength obtained by subjecting the timing difference to the Fourier transformation) and a toner amount (%) for each of pieces of the vibration data, and the like. Further, the vibration of the cartridge is detected by the CPU 101 and the toner accommodation amount is detected from the detected vibration of the cartridge, with the result that the detected toner accommodation amount is displayed on the liquid crystal panel 103. Further, on the liquid crystal panel 103, a message prompting a user (operator) to exchange the cartridge when discrimination that the exchange from the cartridge is needed (for example, in the case where the toner to be supplied is insufficient or used up or in the case where the collected residual toner is in a full-state, or the like case) is made is displayed.

<Vibration Detection and Accommodation Amount Detecting Process>

Next, using FIG. 40 and FIG. 43, a flow of detecting the toner accommodation amount in the process cartridge 1 in which vibration of the process cartridge 1 is detected and then the toner accommodation amount is detected from the vibration of the process cartridge 1 will be described. The toner accommodation amount is detected from the vibration data of the process cartridge 1 based on a change in time difference between a timing when the scanning light is incident on the scanning light detecting member 35 and a timing when the reflected light from the retroreflection member 71 is incident on the light receiving sensor 34 via the beam separating element 90. FIG. 43 is a flowchart relating to a detection process of the contact vibration and the toner accommodation amount.

Incidentally, in this embodiment, as the developer accommodating portion, the toner accommodating portion 11 in the process cartridge is described as an example. That is, the frame of the toner accommodating portion 11 is provided with the retroreflection member 71 and the exposure unit 2 is provided with the beam separating element 90 and the light receiving portion (light receiving sensor 34). Further, a constitution in which the toner accommodation amount in the toner accommodating portion 11 is detected is described as an example, but the developer accommodating portion is not limited to the toner accommodating portion 11. As the developer accommodating portion, the residual toner accommodating portion 12 in the process cartridge may also be used. That is, the frame of the residual toner accommodating portion 12 which is a second developer accommodating portion for accommodating residual toner collected from the photosensitive drum 13 may be provided with the retroreflection member 71 and the exposure unit 2 may be provided with the beam separating element 90 and the light receiving portion (light receiving sensor 34). That is, a constitution in which the accommodation amount of the residual toner in the residual toner accommodating portion 12 is detected may also be employed.

First, the controller 100 discriminates whether or not a print request (print job) in the image forming apparatus 500 is made (S61). In the case where the controller 100 discriminated that the print request is made (Yes of S61), the process is caused to go to a step S62. On the other hand, in the case where the controller 100 discriminated that the print request is not made (No of S61), the process is caused to stand by in the step S61 until the print request is made. Incidentally, the vibration detection and accommodation amount detection process may also be executed every time when an image forming process in the apparatus main assembly of the image forming apparatus 500 is executed predetermined numbers of times set in advance. Further, the vibration detection and accommodation amount detection process may be executed every lapse of a predetermined period set in advance during execution of continuous printing of images on a plurality of sheets (recording mediums).

Next, the controller 100 starts drive of the process cartridge 1 (S62), and then the semiconductor laser 31 of the exposure unit 2 emits the laser light (S63), and thus the image forming operation is started. Simultaneously therewith, the laser light L is emitted from the semiconductor laser 31 of the exposure unit 2, the photosensitive drum 3 is scanned with the laser light L in the main scan direction (arrow X direction in FIG. 40) by a polygon mirror 32 rotating as shown in FIG. 40. At this time, the laser light L is first incident on the scanning light detecting member 35 (FIG. 40) (S64). The laser light L incident on the scanning light detecting member 35 is converted into an electric signal by the scanning light detecting member 35, and the electric signal is transmitted to the controller 100 (S65).

On the other hand, after the laser light L is incident on the scanning light detecting member 35, the laser light L is reflected by the retroreflection member 71 provided on the frame (or a member connected to the frame) of the toner accommodating portion 11 of the process cartridge 1 at a timing when an optical path is formed in the non-image forming region HG (FIG. 40) with respect to the main scan direction. Then, the light reflected by the retroreflection member 71 is separated by the beam separating element 90 provided in the exposure unit 2. Of the laser light L, the separated light LB reflected by the beam separating element 90 is incident on the light receiving sensor 34 provided in the exposure unit 2 (FIGS. 40 and 41) (S66).

The laser light L incident on the light receiving sensor 34 is converted into an electric signal by the light receiving sensor 34, and then the electric signal is sent to the controller 100 (S67).

Then, the CPU 101 in the controller 100 receives the electric signals. The CPU 101 subjects a change amount of a time difference between the received two electric signals (incident timings) of the scanning light detecting member 35 and the light receiving element sensor 34 to the Fourier transformation, and then the resultant data is extracted as vibration data (voltage amplitude) of the process cartridge 1 (S68).

Next, the CPU 101 compares the value data, extracted from the change amount of the time difference between the two electric signals of the scanning light detecting member 35 and the inner light receiving sensor 34, with the vibration data stored in the memory 102, and thus detects the developer accommodation amount of the cartridge (S69).

Thus, in this embodiment, a first step (S63) in which the light is emitted from the semiconductor laser 31 of the exposure unit 2 provided in the image forming apparatus 500 is included. Further, a second step (S66) in which the light emitted from the semiconductor laser 31 of the exposure unit 2 is reflected by the retroreflection member 71 provided on the cartridge is included. Further, a step (S64) in which the light is received by the scanning light detecting member 35 and a third step (S68) in which the light reflected from the retroreflection member 71 is received by the light receiving sensor 34 via the beam separating element 90 are included. By performing these steps, the vibration of the cartridge is detected from the light reception value of the light received by the light receiving sensor 34, and the accommodation amount of the toner accommodated in the toner accommodating portion 11 of the cartridge is detected from the vibration of the cartridge (S69).

As described above, in this embodiment, on an image formation principle, the following constitution is employed. The laser light L emitted from the exposure unit 2 disposed so as to minimize the influence of the vibration of the apparatus main assembly of the image forming apparatus 500 is utilized and received by the scanning light detecting member 35 in the exposure unit 2. Then, the light reflected by the retroreflection member 71 provided in the process cartridge 1 including the toner accommodating portion 11 is received by the light receiving sensor 34 via the beam separating element 90 in the exposure unit 2. Further, based on the light reception value of the light, minute vibration of the toner accommodating portion 11 from which the main assembly-side vibration of the image forming apparatus 500 capable of constituting the noise component is canceled is detected. Further, signal strength of the specific frequency remarkably appearing depending on a change in weight can be calculated. For that reason, the toner accommodation amount depending on the vibration of the toner accommodating portion 11 can be calculated with high accuracy.

Incidentally, in this embodiment, as shown in FIG. 40, the constitution in which the light receiving sensor 34 which is the light receiving portion is provided in the exposure unit 2 and in which the light receiving sensor 34 is provided separately from the scanning light detecting member 34 provided in the exposure unit 2 was described as an example, but the present invention is not limited thereto. For example, as shown in FIG. 44, a constitution in which the scanning light detecting member 34 provided in the exposure unit 2 is caused to also function as the light receiving sensor which is the light receiving portion may be employed. FIG. 44 is a schematic view showing an arrangement of the exposure unit 2 in which the scanning light detecting member 34 also functions as the light receiving sensor. Further, in front of the scanning light detecting member 35, the slit member may be provided. By this, the light receiving timing can be detected with high accuracy.

As in the constitutions of this embodiment, by disposing the beam separating element 90 and by causing the separated light LB separated by the beam separating element 90 to be incident on the beam separating element 90, without adding the light receiving element, the toner accommodation amount depending on the vibration of the toner accommodating portion can be detected by a simple constitution in which cost is reduced.

Next, an image forming apparatus according to an embodiment 12 and a cartridge detachably mountable to the image forming apparatus will be described. Incidentally, members having the same functions as the functions of the members in the above-described embodiments are represented by the same reference numerals or symbols and will be omitted from description.

A general structure of an exposure unit in an image forming apparatus, which is a characteristic portion of this embodiment will be described using FIG. 45. Incidentally, a constitution of the image forming apparatus except for the exposure unit and a constitution in which the retroreflection member 71 and the slit member 83 are disposed in the process cartridge 1 are similar to those in the above-described embodiments, and therefore, members having equivalent functions are represented by the same reference numerals or symbols, and will be omitted from description.

In the above-described embodiment 11, the half mirror 91 is used as the beam separating element 90, whereas in this embodiment, a polarization beam splitter 92 is used as the beam separating element 90. FIG. 45 shows an optical arrangement in the case where the polarization beam splitter 92 is used as the beam separating element 90 of the exposure unit 2.

FIG. 46 is a schematic view showing a polarization state of a beam for performing beam separation. A beam separating method in this embodiment will be specifically described using FIG. 46.

Laser light Lp entering the polarization beam splitter 92 is p-polarized light. The polarization beam splitter 92 divides incident light into two beams. Here, polarization by the polarization beam splitter 92 is distinguished by a vibration direction of an electric field, and is divided into p-polarization in which the vibration direction of the electric field is parallel to the incident side and s-polarization in which the vibration direction of the electric field is perpendicular to the incident surface. To the polarization beam splitter 92, a polarization characteristic such that the splitter 92 transmits the p-polarized light is imparted. Between the splitter 92 and the retroreflection member 71, a ¼λ-wave plate 93 is provided. The light with which the photosensitive drum 13 is scanned by the exposure unit 2 is linearly polarized light, and the laser light Lp transmitted through the splitter 92 is converted into circularly polarized light Lc by the ¼λ 93 and is incident on the retroreflection member 71. The laser light Lc reflected by the retroreflection member 71 enters the ¼λ-wave plate 93 again and becomes laser light Ls. The laser light Ls is polarized light and is reflected by the polarization beam splitter 92 and then is incident on the light receiving sensor 34. As the light receiving sensor 34, a photodiode of φ1.0 (mm) in size of the light receiving surface similarly as in the embodiment 1 is used. In this embodiment, as the beam separating element 90, the polarization beam splitter 92 is used, so that unnecessary reflected light and unnecessary transmitted light do not generate. For that reason, it becomes possible to enhance a degree of freedom of the arrangement of the beam separating element 90.

Incidentally, the constitution in which the light receiving sensor 34 is provided in the exposure unit 2 was described as an example, but the present invention is not limited to this. The light receiving sensor 34 may be provided at any position of the image forming apparatus main assembly, but may preferably be provided in the neighborhood of the exposure unit 2 in order to avoid detection of the ambient vibration as noise when the vibration of the toner accommodating portion is detected, and may more preferably be provided integrally with the exposure unit 2.

Further, similarly as in the embodiment 11, as shown in FIG. 47, by causing the laser light Ls separated by the polarization beam splitter 92 to be incident on the scanning light detecting member 35, it becomes possible to detect vibration of a reflecting mirror without adding the light receiving element. Further, in front of the light receiving sensor 34 and the scanning light detecting member 34, the slit member may be provided. By this, the light receiving timing can be detected further accurately.

In both of the embodiments 11 and 12, the retroreflection member is used as the reflection member for reflecting the laser light, but a normal reflecting mirror made of glass or metal may be used.

Next, an image forming apparatus according to an embodiment 13 and a cartridge detachably mountable to the image forming apparatus will be described. Incidentally, members having the same functions as the functions of the members in the above-described embodiments are represented by the same reference numerals or symbols and will be omitted from description.

In the above-described embodiments 11 and 12, as the reflection member, the retroreflection member 71 constituted so that the laser light L emitted from the exposure unit 2 is reflected in the direction opposite to the incident direction was used. On the other hand, in the embodiment 13, a reflection member 70 constituted so that the laser light L emitted from the exposure unit 2 is reflected in a direction different from the direction opposite to the incident direction was used. That is, in this embodiment, the light receiving sensor 34 is disposed at a position different from the exposure unit 2.

<Reflection Member>

As shown in FIG. 48, in this embodiment, the process cartridge 1 includes the reflection member for reflecting the laser light L emitted from the semiconductor laser 31 of the exposure unit 2.

The reflection member 70 is a reflection member having no retroreflection property, and reflects the laser light L emitted from the exposure unit 2 in the direction different from the direction opposite to the incident direction on the reflecting surface. Further, the reflection member 70 is provided in the non-image forming region HG outside the image forming region R in which the photosensitive drum 13 is scanned with the laser light L during the image formation.

When the accommodation amount of the toner accommodated in the toner accommodating portion included in the process cartridge 1 changes, a load on the driving gear (not shown) for the process cartridge 1 changes. The vibration becomes small in the case where the load is low, and becomes large in the case where the load is high, so that the vibration state changes. This vibration is transmitted to the process cartridge 1 and then is transmitted to the reflection member 70 provided in the process cartridge 1. Thus, the change in vibration state due to the change in load on the driving gear is detected, so that the accommodation amount of the toner accommodated in the toner accommodating portion is estimated. A vibration detecting method will be described later.

The reflection member 70 is provided directly or via an unshown supporting member on the toner accommodating portion on the drive input side of the process cartridge 1 which is also one side with respect to the light scan direction (main scan direction X) of the exposure unit 2. By disposing the reflection member 70 on the drive input side, a distance between the driving gear for the process cartridge 1 and the reflection member 70 becomes short. For that reason, the vibration generated in the driving gear is easily transmitted, and the change in laser light which is incident on the light receiving sensor 34 is easily grasped, so that accuracy of the vibration detection of the process cartridge 1 is improved.

<Light Receiving Sensor>

As shown in FIG. 48, the reflected light (laser light L) reflected by the reflection member 70 is incident on the light receiving sensor 34 which is the light receiving portion. A time from incidence of the laser light L on the scanning light detecting member 35 to incidence of the reflected light on the light receiving sensor 34 is measured. From the measured time, vibration data of the reflection member 70 is calculated, so that a vibration state of the reflection member 70 is predicted.

Parts (a) and (b) of FIG. 49 are schematic views for illustrating a detecting method of the vibration state. Part (a) of FIG. 49 shows a reflection state of beams (laser light) in the case where the reflection member 70 vibrates during reflection. When the reflection member 70 vibrates, the reflection member 70 changes in position thereof. For example, as shown in part (a) of FIG. 49, the reflection member 70 changes in position between the case where the reflection member 70 is in one position 70A and the case where reflection member 70 is in the other position 70B, at opposite end portions of the amplitude of the vibration of the reflection member 70. The laser light L which is incident on the light receiving sensor 34 changes between the case where the laser light L is represented by laser light LA when the reflection member 70 is in the one position 70A and the case where the laser light L is represented by laser light LB when the reflection member 70 is in the other position 70B.

Part (b) of FIG. 49 is a graph showing times from detection of the laser light L by the scanning light detecting member 35 until the light receiving sensor 34 receives the laser light LA and the laser light LB. When the laser light L is incident on the scanning light detecting member 35, an output voltage from the scanning light detecting member 35 changes. Further, when the laser light LA from the reflection member 70 changes in position to the one position 70A is incident on the light receiving sensor 34, an output voltage from the light receiving sensor 34 also changes. Or, when the laser light LB from the reflection member 70 changed in position to the other position 70B is incident on the light receiving sensor 34, the output voltage from the light receiving sensor 34 also changes. From this output change, a timing when the laser light is incident on the scanning light detecting member 35 or the light receiving sensor 34 is detected. In part (b) of FIG. 49, the output voltage from the scanning light detecting member 35 is represented by P35, the output voltage from the light receiving sensor 34 when the reflection member 70 is in the one position 70A is represented by P34A, and the output voltage from the light receiving sensor 34 when the reflection member 70 is in the other position 70B is represented by P34B. A time from detection of the laser light by the scanning light detecting member 35 to detection of the laser light by the light receiving sensor 34 in the case where the reflection member 70 is in the one position 70A is represented by $\Delta t1$. A time from the detection of the laser light by the scanning light detecting member 35 to detection of the laser light by the light receiving sensor 34 in the case where the reflection member 70 is in the other position 70B is represented by $\Delta t2$. Thus, when the position of the reflection member 70 is changed by the vibration of the cartridge, a difference between the time $\Delta t1$ and the time $\Delta t2$ (i.e., $\Delta t2-\Delta t1$) also changes. By measuring this change in time, the amplitude of the vibration of the reflection member 70 is estimated, so that the toner accommodation amount of the cartridge is estimated.

As described above, estimating the amplitude of the vibration of the reflection member 70, also in this embodiment, similarly as in the above-described embodiments, minute vibration of the toner accommodating portion 11 from which the main assembly-side vibration of the image forming apparatus 500 which can be a noise component is canceled can be detected. In addition, signal strength of a specific frequency remarkably appearing depending on a change in weight can be calculated. For that reason, the toner accommodation amount depending on the vibration of the toner accommodating portion 11 of the cartridge can be calculated with high accuracy.

Next, an image forming apparatus according to an embodiment 14 and a cartridge detachably mountable to the image forming apparatus will be described. Incidentally, members having the same functions as the functions of the members in the above-described embodiments are represented by the same reference numerals or symbols and will be omitted from description.

A general structure of an exposure unit in an image forming apparatus, which is a characteristic portion of this embodiment will be described using FIG. 50. Incidentally, a constitution of the image forming apparatus except for the exposure unit and a constitution in which the reflection member 70 is disposed in the process cartridge 1 are similar to those in the above-described embodiments, and therefore, members having equivalent functions are represented by the same reference numerals or symbols, and will be omitted from description.

In the above-described embodiment 13, the laser light L reflected by the reflection member 70 is directly incident on the light receiving sensor 34, whereas in this embodiment, the laser light L reflected by the reflection member 70 enters a condenser lens 36 and then is incident on the light receiving sensor 34. FIG. 50 shows an optical arrangement in the case where the condenser lens 36 is provided between the reflection member 70 and the light receiving sensor 34.

As shown in FIG. 50, the condenser lens 36 is an imaging means for imaging the laser light L reflected by the reflection member 70 on the light receiving sensor 34. Thus, by using the condenser lens 36, even when the reflection member 70 is inclined from a reflect angle and the laser light is reflected in the sub-scan direction in a deviation manner, a traveling direction of the laser light deviated in the sub-scan direction is corrected by the condenser lens 36 and can be caused to be incident on the light receiving sensor 34. Further, in front of the reflection member 70 and the light receiving sensor 34, a slit member may be provided. By this, it becomes possible to accurately detect the light receiving timing.

Next, an image forming apparatus according to an embodiment 15 and a cartridge detachably mountable to the image forming apparatus will be described. Incidentally, members having the same functions as the functions of the members in the above-described embodiments are represented by the same reference numerals or symbols and will be omitted from description.

A general structure of an exposure unit in an image forming apparatus, which is a characteristic portion of this embodiment will be described using FIG. 51. Incidentally, a constitution of the image forming apparatus except for the exposure unit and a constitution in which reflection member 70 is disposed in the process cartridge 1 are similar to those in the above-described embodiments, and therefore, members having equivalent functions are represented by the same reference numerals or symbols, and will be omitted from description.

FIG. 51 shows an optical arrangement in the case where the reflection member 70 described in the embodiment 13 is changed to the retroreflection member 71. FIG. 52 is a sectional view for illustrating a state of a reflecting surface of the retroreflection member 71 with respect to the sub-scan direction.

The retroreflection member 71 includes a reflecting portion such that the laser light is not subjected to retroreflection in the main scan direction but is subjected to retroreflection only in the sub-scan direction. That is, the retroreflection member 71 as the reflection member in this embodiment has a retroreflection property such that the laser light L emitted from the exposure unit 2 is reflected only in the sub-scan direction, i.e., in the direction opposite to the incident direction thereof on the reflecting surface. Accordingly, as shown in FIG. 51, the retroreflection member 71 in this embodiment reflects the laser light L emitted from the exposure unit 2 in the direction different from the direction opposite to the incident direction of the laser light L on the reflecting surface with respect to the main scan direction similarly as in the case of the reflection member 70 described in the embodiment 13.

The retroreflection member 71 as the reflection member in this embodiment includes a first side (incident surface) 74 on which the laser light L is incident and a second side 75 opposite from the first side 74. The retroreflection member 71 is provided with a reflecting portion formed on the first side 74 so as to subject the laser light to the retroreflection only in the sub-scan direction. In the reflecting portion of the retroreflection member 71, minute reflecting surfaces such that an interior angle of adjacent reflecting surfaces **74*b*1 and 74*b*2 is 90° are formed. A base material of the retroreflection member 71** is molded with a resin material in consideration of a molding property, and on the reflecting surface, a reflecting film is formed with metal such as aluminum.

FIG. 53 is a schematic sectional view of the retroreflection member 71 with respect to the sub-scan direction, showing a state in which the laser light is reflected by the retroreflection member 71. In the reflecting portion of the retroreflection member 71, the adjacent reflecting surfaces **74*b*1 and 74*b*2 are disposed so that the interior angle therebetween is 90°. The laser light L12 is incident on the reflecting surface 74*b*2 at an incident angle θ3 and becomes laser light L12' reflected at a reflection angle θ3 which is the same as the incident angle θ3. Thereafter, the laser light L12' is incident on the reflecting surface 74*b*1 at an incident angle θ5 and becomes the laser light L13 reflected at a reflection angle θ5 which is the same as the incident angle θ5. In FIG. 53**, NV represents a normal line perpendicular to the associated reflecting surface, and angles relative to this normal line is defined as the incident angle and the reflection angle.

Here, the angle formed between the adjacent reflecting surfaces **74*b*1 and 74*b*2 is 90°, and therefore, the laser light L12 and the laser light L13 are parallel to each other with respect to the sub-scan direction. On the other hand, with respect to the main scan direction, the laser light changes in reflection angle depending on the incident angle similarly as in the case of a normal reflecting mirror and is incident on the light receiving sensor 34**.

As described above, as the reflection member, by using the retroreflection member for subjecting the laser light to the retroreflection only in the sub-scan direction, even when the reflection member is inclined in the sub-scan direction relative to the laser light, the laser light can be caused to be incident on the light receiving sensor if the inclination is not more than an angle at which the retroreflection occurs. In addition, also in this embodiment, similarly as the above-described embodiments, minute vibration of the toner accommodating portion 11 from which the main assembly-side vibration of the image forming apparatus 500 which can be a noise component is canceled can be detected. For that reason, the toner accommodation amount depending on the vibration of the toner accommodating portion 11 of the cartridge can be calculated with high accuracy.

Next, an image forming apparatus according to an embodiment 16 and a cartridge detachably mountable to the image forming apparatus will be described. Incidentally, members having the same functions as the functions of the members in the above-described embodiments are represented by the same reference numerals or symbols and will be omitted from description.

A retroreflection member which is a characteristic portion of this embodiment will be described using part (a) of FIG. 26. Incidentally, another constitution of the image forming apparatus except for the retroreflection member is similar to those in the above-described embodiments, and therefore, members having equivalent functions are represented by the same reference numerals or symbols, and will be omitted from description.

In the above-described embodiment 15, the retroreflection member 71, for reflecting the laser light by forming the reflecting film on the reflecting surface is used, whereas in this embodiment, the retroreflection member 71 for reflecting the laser light by utilizing total reflection on the reflecting surface is used. That is, the retroreflection member 71 in this embodiment satisfies a total reflection condition such that the incident light does not pass through the reflecting surface but is completely reflected by the reflecting surface. The retroreflection member 71 in this embodiment includes the reflecting surface which subjects the laser light to the retroreflection only in the sub-scan direction. The retroreflection member 71 is prepared by providing the surface having the above-described retroreflection performance on a parallel flat plate, and as a material thereof, a transparent resin material such as acrylic resin, polystyrene resin, polycarbonate resin, or the like is used.

In the retroreflection member 71 in this embodiment, on an inner surface 73*b* of a second side 73 opposite from an incident surface (first side 72) on which the laser light is incident, a surface having the retroreflection shape such that the laser light is subjected to the retroreflection only in the sub-scan direction is provided. Here, a surface outside the first side 72 which is the incident surface is an outer surface 72*a*, an inside surface of the first side 72 of the flat plate is an inner surface 72*b*, a surface outside the second side 73 is an outer surface 73*a*, and an inside surface of the second side 73 of the flat plate is the inner surface 73*b*. That is, the retroreflection shape is formed on the inner surface 73*b* of the second side 73 opposite from the first side 72.

In the retroreflection shape, the interior angle between the adjacent flat surfaces is 90°. In this embodiment, one feature is such that the retroreflection shape is provided on the surface inside the reflection member and the laser light is reflected by the inner surface.

Thus, by disposing the retroreflection member 71, even when the retroreflection member 71 is inclined in the sub-scan direction relative to the laser light, if the inclination is not more than an angle at which the retroreflection occurs, the laser light (reflected light) can be caused to be incident on the light receiving sensor 34. The retroreflection member is made of the resin material, and therefore, may only be required to be prepared by a general injection molding or the like, so that a cost can be suppressed compared with formation of the reflecting film on a resin component part described in the embodiment 15. Further, the slit member may be provided in front of the retroreflection member 71 and the light receiving sensor. By this, it becomes possible to detect the light receiving timing further accurately.

Next, an image forming apparatus according to an embodiment 17 and a cartridge detachably mountable to the image forming apparatus will be described. Incidentally, members having the same functions as the functions of the members in the above-described embodiments are represented by the same reference numerals or symbols and will be omitted from description.

In the above-described embodiments, a system in which the vibration of the process cartridge 1 is detected using the laser light L and then from the vibration, the accommodation amount of the toner accommodated in the process cartridge 1 is detected was described.

In this embodiment, the vibration of the image forming apparatus 500 or the process cartridge 1 is detected using the laser light L and then whether or not the vibration is abnormal vibration is discriminated. Then, suppression of a lateral stripe image (banding image) generated by the abnormal vibration and the case where a message prompting a user to exchange the process cartridge 1 is displayed on the liquid crystal panel 103 will be described. Incidentally, in this embodiment, as a constitution for detecting the vibration of the process cartridge 1, a constitution which is the same as the constitution shown in parts (a) and (b) of FIG. 16 described in the embodiment 4 is used. Further, as the retroreflection member 71, a retroreflection member which is the same as the retroreflection member 71 shown in FIG. 26 described in the embodiment 5 is used.

First, the abnormal vibration of the process cartridge 1 will be described using parts (a) and (b) of FIG. 23, parts (a) and (b) of FIG. 24, and FIG. 54.

The process cartridge 1 mounted in the apparatus main assembly of the image forming apparatus 500 receives drive from the driving portion 5 of the apparatus main assembly and drives respective rotatable members (the photosensitive drum 13, the developing roller 14, the toner supplying roller, and the like) inside the process cartridge 1. A specific constitution thereof was described using parts (a) and (b) of FIG. 23 and parts (a) and (b) of FIG. 24 in the above-described embodiments. In the constitution, the vibration generates by slight deviation of the rotation shaft. Further, the image forming apparatus 500 and the process cartridge 1 include bearing portions for supporting the respective rotatable members. In addition, many large and small gears for drive transmission are used. With long-term use of the image forming apparatus 500, in these bearing portions and gears, abrasion due to repetitive friction occurs in some cases.

As regards this abrasion, the influence of the above-described slight deviation of the rotation shaft is one of factors thereof. When this abrasion progresses, vibration in rotation (cyclic) period of the gears and the rotatable members occurs, with the result that the bearing portions and the residual toner accommodating portion 12 cause abnormal vibration.

The process cartridge 1 of the image forming apparatus 500 is provided with a residual toner feeding member 19*a* in the residual toner accommodating portion 12. The residual toner feeding member 19*a* is a member for feeding the toner removed from the photosensitive drum 13 by a cleaning blade 19, toward a rear side (right-hand side of FIG. 54) of the residual toner accommodating portion 12. With use of the image forming apparatus 500, when the residual toner accommodating portion 12 is filled with the residual toner, motion of the residual toner feeding member 19*a* becomes dull in some instances. By this, a torque necessary to rotate gears for driving the residual toner feeding member 19*a* becomes high, and driving gears (not shown) for the residual toner feeding member 19*a* cause tooth skipping, so that noise occurs and vibration occurs in some instances. In this case, the residual toner accommodating portion 12 abnormally vibrates in rotation period.

The process cartridge 1 of the image forming apparatus 500 is provided with the toner feeding member 17 in the toner accommodating portion 11 as shown in FIG. 54. With use of the image forming apparatus 500, when a remaining toner amount in the toner accommodating portion 11 becomes small, rotation power of the toner feeding member 17 becomes strong. For that reason, a free end portion of the toner feeding member 17 vigorously contacts an inner wall 11*a* of the toner accommodating portion 11, so that a sound is generated as noise of the rotation period of the toner feeding member 17 in some instances. In this case, the toner accommodating portion 11 abnormally vibrates in the rotation period of the toner feeding member 17.

As described in this embodiment, the process cartridge 1 can cause the abnormal vibration due to various factors. These abnormal vibrations occur in rotation periods of the driving gears and the rotatable members. When such an abnormal vibration occurs, on an outputted image, latent stripe non-uniformity (difference in density on the image, banding image) in the rotation period is liable to occur as an image defect. Therefore, in this embodiment, the vibration detected using the laser light L is subjected to the Fourier transformation (decomposition into respective frequencies), and vibration data (vibration amplitudes) for each of frequencies of the driving gears and the rotatable members are extracted. Then, the extracted vibration amplitudes are compared with the reference value stored in advance, and in the case where the vibration amplitude exceeds the reference value, the controller 100 executes control such that the influence of the vibration is suppressed. Specifically, a change in electrostatic latent image by the exposure unit 2 and a change in bias by a bias power source (described later) for applying the bias to the developing roller 14 or the like are made. Further, prompting of the exchange of the process cartridge 1 is also performed.

<Controller>

A controller will be described using FIG. 55. FIG. 55 is a block diagram showing a part of an electric circuit of the image forming apparatus.

As shown in FIG. 55, in an apparatus main assembly of the image forming apparatus 500, the controller 100 is provided. The controller 100 extracts, as vibration data (vibration amplitude) of the process cartridge 1, data from a change in time difference between a timing when the light is reflected by the retroreflection member 71 and is then received by the inner light receiving element 31*b* and a timing when the light is received by the scanning light detecting member 35. Then, whether or not the vibration of the process cartridge 1 is abnormal is discriminated by analyzing the vibration data. In the controller 100, a CPU 101 as a detecting means (control means) and a memory 102 as a storing means are provided. Further, to the controller 100, the inner light receiving element 31*b* and the scanning light detecting member 35 which are as the light receiving portions, a liquid crystal panel 103 as a display means the bias power source 20 for applying the biases to the respective rotatable members, and the exposure unit 2 are connected.

In the memory 102, reference data for discriminating whether or not the vibration of the process cartridge 1 is abnormal are stored. As the data, thresholds M (member amplitudes) of respective frequencies of driving gears and rotatable members for vibration data (output timing difference between the inner light receiving element 31*b* and the scanning light detecting member 35 and signal strength obtained by subjecting the timing difference to the Fourier transformation) and stored in advance. In the case where the CPU 101 discriminated that the vibration of the process cartridge 1 is abnormal, the bias power source 20 and the exposure unit 2 are controlled so as to suppress the influence of the vibration. Specifically, at a frequency at which the vibration amplitude exceeding the threshold is detected, an applied bias and the electrostatic latent image are changed so as to cancel the influence of the vibration. In the case where the CPU 101 discriminated that the vibration of the process cartridge 1 is abnormal and that the process cartridge 1 is in a state in which there is a possibility of an occurrence of noise or breakage, the CPU 101 discriminates that there is a need to exchange the process cartridge 1 and causes the liquid crystal panel 103 to display a message for prompting the user (or an operator) to exchange the process cartridge 1.

<Flow of Vibration Detection of Cartridge>

Next, using FIG. 56, a flow of discriminating the vibration state of the process cartridge 1 by comparing a light reception value (vibration data of the process cartridge 1) of the light received by the inner receiving element 31*b* with the reference value (threshold M) stored in the memory 102 will be described. The vibration state of the process cartridge 1 is detected from the vibration data of the process cartridge 1 based on a change in time difference between a timing when the scanning light is incident on the scanning light detecting member 35 and a timing when the reflected light from the retroreflection member 71 is incident on the light receiving sensor 34. FIG. 56 is a flowchart showing the flow of the vibration detection of the process cartridge 1.

In this embodiment, the frame of the toner accommodating portion 11 is provided with the retroreflection member 71 and the exposure unit 2 is provided with the light receiving portion (inner light receiving element 31*b*). Further, a constitution in which the abnormal vibration of the toner accommodating portion 11 is detected is described as an example, but the developer accommodating portion is not limited to the toner accommodating portion 11. As the developer accommodating portion, the residual toner accommodating portion 12 in the process cartridge may also be used. That is, the frame of the residual toner accommodating portion 12 which is a second developer accommodating portion for accommodating residual toner collected from the photosensitive drum 13 may be provided with the retroreflection member 71 and the exposure unit 2 may be provided with the light receiving to portion (inner light receiving element 31*b*). That is, a constitution in which the abnormal vibration of the residual toner accommodating portion 12 is detected may also be employed.

First, the controller 100 discriminates whether or not a print request (print job) in the image forming apparatus 500 is made (S81). In the case where the controller 100 discriminated that the print request is made (Yes of S71), the process is caused to go to a step S82. On the other hand, in the case where the controller 100 discriminated that the print request is not made (No of S81), the process is caused to stand by in the step S81 until the print request is made. Incidentally, the abnormal vibration detection may also be executed every time when an image forming process in the apparatus main assembly of the image forming apparatus 500 is executed predetermined numbers of times set in advance. Further, the vibration detection and accommodation amount detection process may be executed every lapse of a predetermined period set in advance during execution of continuous printing of images on a plurality of sheets (recording mediums).

Next, the controller 100 starts drive of the process cartridge 1 (S82), and then the laser light emitting element 31*a* of the semiconductor laser 31 of the exposure unit 2 emits the laser light (S83), and thus the image forming operation is started. Simultaneously therewith, the laser light L is emitted from the laser light emitting element 31*a* of the semiconductor laser 31 of the exposure unit 2, the photosensitive drum 3 is scanned with the laser light L in the main scan direction (arrow X direction in part (a) of FIG. 16) by a polygon mirror 32 rotating as shown in part (a) of FIG. 16. At this time, the laser light L is first incident on the scanning light detecting member 35 part (a) of FIG. 16) (S84). The laser light L incident on the scanning light detecting member 35 is converted into an electric signal by the scanning light detecting member 35, and the electric signal is transmitted to the controller 100 (S85).

On the other hand, after the laser light L is incident on the scanning light detecting member 35, the laser light L is reflected by the retroreflection member 71 provided on the frame (or a member connected to the frame) of the toner accommodating portion 11 of the process cartridge 1 at a timing when an optical path is formed in the non-image forming region HG (part (a) of FIG. 16) with respect to the main scan direction (S86). Then, the light reflected by the retroreflection member 71 is incident on the inner light receiving element 31*b* provided in the exposure unit 2 (parts (a) and (b) of FIG. 16) (S87). The laser light L incident on the inner light receiving element 31*b* is converted into an electric signal by the inner light receiving element 31*b*, and then the electric signal is sent to the controller 100 (S88).

Then, the CPU 101 in the controller 100 receives the electric signals and then subjects a change amount of a time difference between the received two electric signals (incident timings) of the scanning light detecting member 35 and the inner light receiving element 31*b* to the Fourier transformation. Thereafter, the resultant data is extracted as vibration data (voltage amplitude) of the process cartridge 1 (S89).

Next, the CPU 101 compares, for each frequency, the value data, extracted from the change amount of the time difference between the two electric signals of the scanning light detecting member 35 and the inner light receiving element 31*b*, with the reference value (threshold M1 and M2) stored in the memory 102 (S90). As a result of comparison, the CPU 101 discriminates whether or not the vibration of the process cartridge 1 is abnormal. In this embodiment, (threshold M1)<(threshold M2) held.

The vibration data is compared with the threshold M1 (S91), and when the vibration data exceeded the threshold M1 (Yes of S91), the process goes to a step S92. When the vibration data does not exceed the threshold M1 (No of S91), the process is ended.

Then, the vibration data is compared with the threshold M2 (S92), and when the vibration data exceeded the threshold M2 (Yes of S92), the CPU 101 causes the liquid crystal panel 103 to display the message prompting the user to exchange the process cartridge 1. When the vibration data does not exceed the threshold M2 (No of S92), a change in bias applied to each of the respective rotatable members by the bias power source and a change in electrostatic latent image by the exposure unit 2 are made.

Thus, in this embodiment, a first step (S83) in which the light is emitted from the laser light emitting element 31*a* of the exposure unit 2 provided in the image forming apparatus 500 is included. Further, a second step (S86) in which the light emitted from the laser light emitting element 31*a* of the exposure unit 2 is reflected by the retroreflection member 71 provided on the cartridge is included. Further, a step (S84) in which the light is received by the scanning light detecting member 35 and a third step (S87) in which the light reflected from the retroreflection member 71 is received by the inner light receiving element 31*b* are included. By performing these steps, the vibration data of the process cartridge 1 is compared with the reference value (the threshold M1 and the threshold M2), so that whether or not the abnormal vibration occurs in the process cartridge 1 can be discriminated. By this, in the case where discrimination that the abnormal vibration occurs is made, control such that the influence of the abnormal vibration is suppressed by operating the bias power source 20 and the exposure unit 2 is executed. By doing so, it becomes possible to suppress the defective image such as the lateral stripe image (banding image) occurring due to the abnormal vibration. Further, in the case where discrimination that a larger abnormal vibration occurs, a message prompting the user to exchange the process cartridge 1 is displayed on the liquid crystal panel 103. By doing so, in the case where there is a possibility that the noise or the breakage occurs, it becomes possible to prompt the use to exchange the process cartridge 1.

In this embodiment, the case where the retroreflection member 71 is provided on the frame of the toner accommodating portion 11 and the frame of the residual toner accommodating portion 12 was described. However, the present invention is not limited thereto, and the retroreflection member 71 may also be provided in a place where the abnormal vibration is more easily detected. For example, the retroreflection member 71 may be provided on the bearing portions for supporting the respective rotatable members (developing roller 14 and the like) or on the driving gear side.

In this embodiment, as described above, as the constitution for detecting the vibration of the process cartridge 1, the same constitution as those described in the embodiment 4 with reference to parts (a) and (b) of FIG. 16 was used. Further, as the retroreflection member 71, the retroreflection member 71 which is the same as those described in the embodiment 5 with reference to FIG. 26 was used. However, the present invention is not limited thereto. The constitution of the embodiment 1 in which the process cartridge 1 is provided with the light receiving sensor 34 and the constitution of the embodiment 2 in which the process cartridge 1 is provided with the reflection plate R may be employed. Further, for example, the holding constitutions of the retroreflection members 71 described in the embodiments 6 to 10 and the constitutions using the beam separating element 90 in the embodiments 11 and 12 may be employed. That is, even any constitution described in the embodiments 1 to 16 can be replaced with the constitution of this embodiment.

In this embodiment, the case where the memory 102 mounted in the controller 100 of the image forming apparatus 500 is used was described. However, as shown in FIG. 55, the process cartridge 1 is provided with a memory 104 and then may be used.

In this embodiment, the constitution in which the message prompting the user to exchange the process cartridge 1 is displayed on the liquid crystal panel 103 provided in the image forming apparatus 500 was described. However, the present invention is not limited to this, and for example, a constitution in which the message is displayed on a monitor connected to a personal computer to which the image forming apparatus 500 is connected may be employed.

According to the present invention, the vibration which occurs in the toner accommodating portion can be detected accurately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-183382 filed on Oct. 4, 2019, 2020-025851 filed on Feb. 19, 2020, and 2020-105813 filed on Jun. 19, 2020, which are hereby incorporated by reference herein in their entirety.

What is claimed is:

1. An image forming apparatus to which a cartridge including a developer accommodating portion for accommodating a developer is detachably mountable, said image forming apparatus comprising:

a frame;

an image bearing member;

an exposure unit configured to expose a surface of said image bearing member to light to form an electrostatic latent image on the surface of said image bearing member;

a light receiving sensor provided in the exposure unit and configured to receive the light emitted from said exposure unit;

a controller configured to detect vibration of the frame from a light reception value of the light received by said light receiving sensor; and a memory configured to store an accommodation amount of the developer, accommodated in the developer accommodating portion, depending on the detected vibration of the frame, wherein the controller detects the vibration of the frame by detecting an average value of an output voltage extracted from a light reception value received by the light receiving sensor, and determines that the larger the average value, the greater an amount of developer is accommodated in the developer accommodating portion.

2. An image forming apparatus according to claim 1, wherein said light receiving sensor is provided in a non image forming region outside an image forming region in which an image is formed, with respect to a scan direction in which said exposure unit scans said image bearing member with the light.

3. An image forming apparatus according to claim 1, wherein said light receiving sensor is provided on a frame of said developer accommodating portion or a member connected to the frame.

4. An image forming apparatus according to claim 3, wherein the developer accommodating portion is a first developer accommodating portion configured to accommodate the developer supplied to said image bearing member.

5. An image forming apparatus according to claim 3, wherein the developer accommodating portion is a second developer accommodating portion configured to accommodate developer collected from said image bearing member.

6. An image forming apparatus according to claim 1, wherein said light receiving sensor is provided on a drive input side of the frame.

* * * * *